(12) United States Patent
Kwak et al.

(10) Patent No.: US 11,990,070 B2
(45) Date of Patent: May 21, 2024

(54) ELECTRONIC DEVICE INCLUDING FLEXIBLE DISPLAY AND METHOD FOR OPERATING THE SAME

(71) Applicant: Samsung Electronics Co., Ltd., Suwon-si (KR)

(72) Inventors: Myunghoon Kwak, Suwon-si (KR); Bohyeon Kim, Suwon-si (KR); Baekeun Cho, Suwon-si (KR); Yangwook Kim, Suwon-si (KR); Jihea Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/715,522

(22) Filed: Apr. 7, 2022

(65) Prior Publication Data

US 2023/0055031 A1 Feb. 23, 2023

Related U.S. Application Data

(63) Continuation of application No. PCT/KR2022/003272, filed on Mar. 8, 2022.

(30) Foreign Application Priority Data

Aug. 11, 2021 (KR) .................. 10-2021-0106259

(51) Int. Cl.
*H02J 7/00* (2006.01)
*G09G 3/00* (2006.01)
*H02P 29/00* (2016.01)

(52) U.S. Cl.
CPC .......... *G09G 3/035* (2020.08); *H02J 7/0047* (2013.01); *H02J 7/0063* (2013.01); *H02P 29/00* (2013.01);

(Continued)

(58) Field of Classification Search
CPC .......... G09G 3/035; G09G 2320/0626; G09G 2320/08; G09G 2320/0606;
(Continued)

(56) References Cited

U.S. PATENT DOCUMENTS

2002/0114448 A1 8/2002 Kim et al.
2007/0216639 A1 9/2007 LaFarre et al.
(Continued)

FOREIGN PATENT DOCUMENTS

CN 110209240 B 2/2021
CN 113012568 A 6/2021
(Continued)

OTHER PUBLICATIONS

International Search Report and Written Opinion dated Jun. 16, 2022, issued in International Patent Application No. PCT/KR2022/003272.

*Primary Examiner* — Towfiq Elahi
(74) *Attorney, Agent, or Firm* — Jefferson IP Law, LLP

(57) ABSTRACT

According to various embodiments, an electronic device may comprise a housing, a plate coupled to the housing to reciprocate, a flexible display including a first portion disposed on the plate and a second portion extending from the first portion and exposed to an outside or retracted into an inside of the housing as the plate reciprocates, a motor configured to move the plate, at least one electronic component, a battery, and at least one processor. The at least one processor may be configured to identify an event for triggering a movement of the plate, identify a first power of the battery and a second power for controlling the flexible display and the at least one electronic component, based on the event, identify a third power for controlling the motor, based on the first power and the second power, and provide the motor with a signal corresponding to the third power.

20 Claims, 37 Drawing Sheets

(52) U.S. Cl.
CPC ........... *G09G 2320/0606* (2013.01); *G09G 2320/0626* (2013.01); *G09G 2320/08* (2013.01); *G09G 2330/021* (2013.01); *G09G 2352/00* (2013.01)

(58) Field of Classification Search
CPC ......... G09G 2330/021; G09G 2352/00; H02J 7/0047; H02J 7/0063; H02P 29/00
See application file for complete search history.

(56) References Cited

U.S. PATENT DOCUMENTS

| | | | |
|---|---|---|---|
| 2011/0232513 | A1 | 9/2011 | Bosga |
| 2011/0241998 | A1 | 10/2011 | McKinney et al. |
| 2014/0118271 | A1 | 5/2014 | Lee et al. |
| 2016/0306534 | A1 | 10/2016 | Woo et al. |
| 2017/0031387 | A1* | 2/2017 | Kim .............. G06F 1/1652 |
| 2017/0168638 | A1* | 6/2017 | Shi ............... G06F 3/147 |
| 2019/0261519 | A1 | 8/2019 | Park et al. |
| 2019/0317556 | A1 | 10/2019 | Zhang et al. |
| 2021/0103314 | A1 | 4/2021 | Ko et al. |
| 2021/0227708 | A1 | 7/2021 | Zhu et al. |
| 2022/0215815 | A1 | 7/2022 | Kim et al. |

FOREIGN PATENT DOCUMENTS

| | | |
|---|---|---|
| JP | 2002-271458 A | 9/2002 |
| JP | 2008-500593 A | 1/2008 |
| JP | 2011-135366 A | 7/2011 |
| KR | 10-2004-0085816 A | 10/2004 |
| KR | 10-2011-0096029 A | 8/2011 |
| KR | 10-2013-0123212 A | 11/2013 |
| KR | 10-2014-0054746 A | 5/2014 |
| KR | 10-2019-0101184 A | 8/2019 |
| KR | 10-2020-0075809 A | 6/2020 |
| KR | 10-2020-0096548 A | 8/2020 |
| KR | 10-2021-0031348 A | 3/2021 |
| KR | 10-2021-0035447 A | 4/2021 |
| KR | 10-2021-0041380 A | 4/2021 |
| WO | 2018-119858 A1 | 7/2018 |
| WO | 2019/062891 A1 | 4/2019 |

* cited by examiner

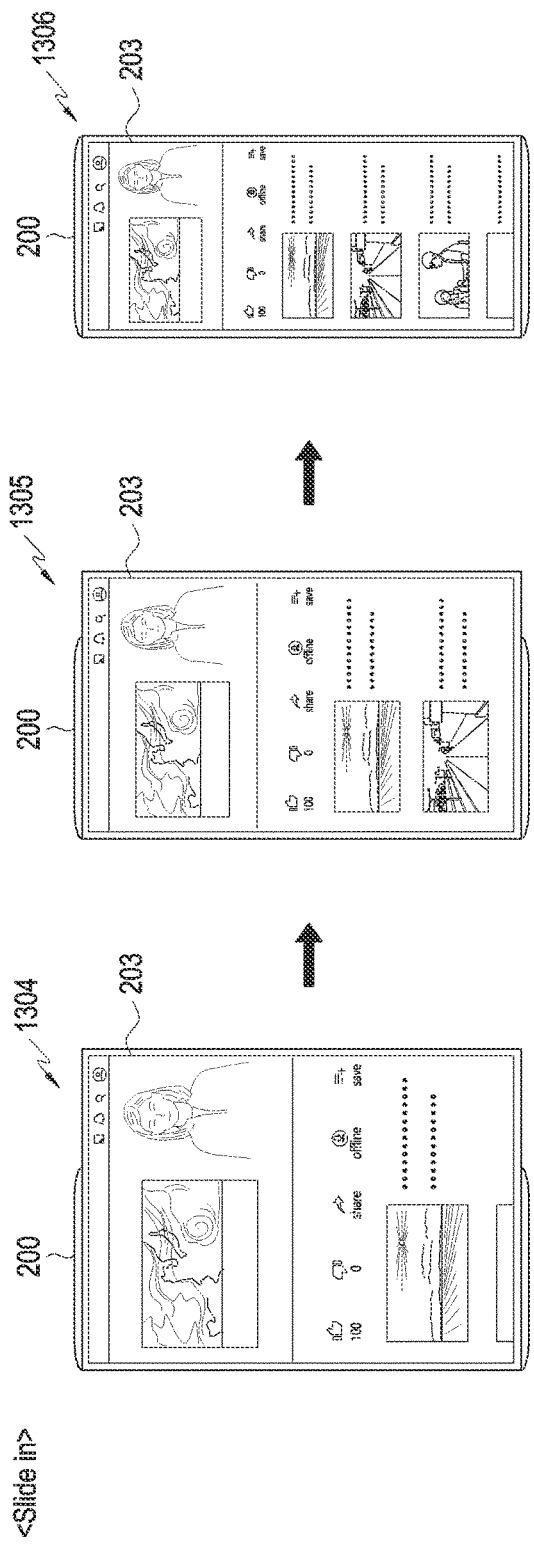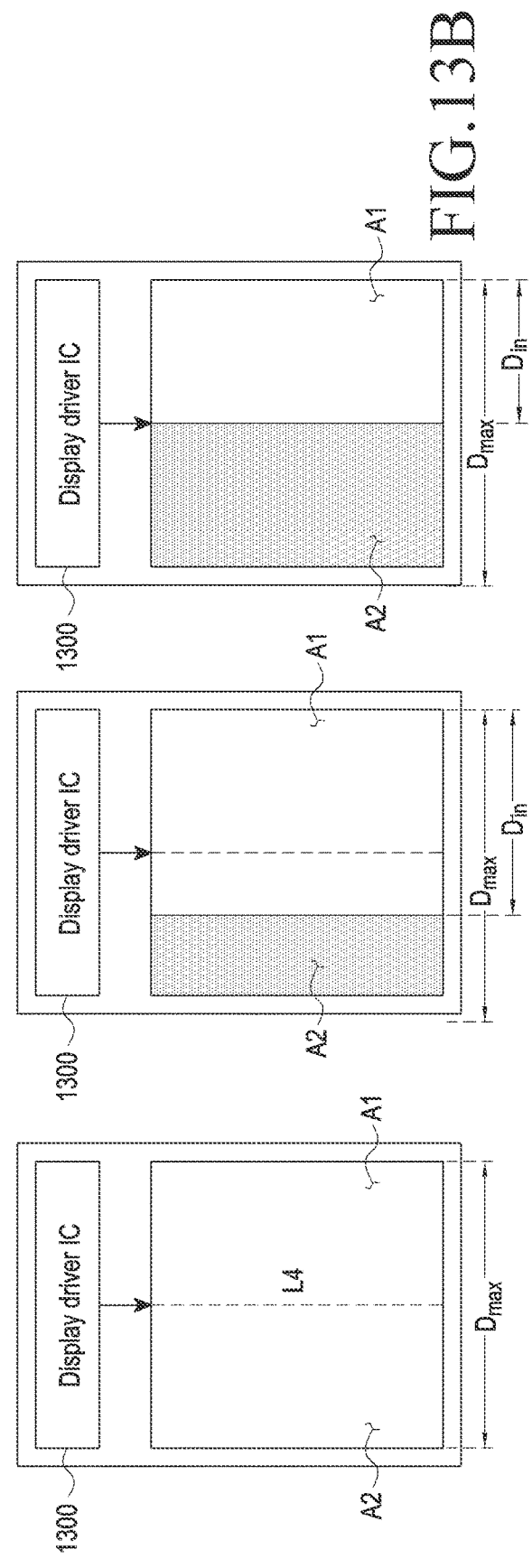
FIG.13B

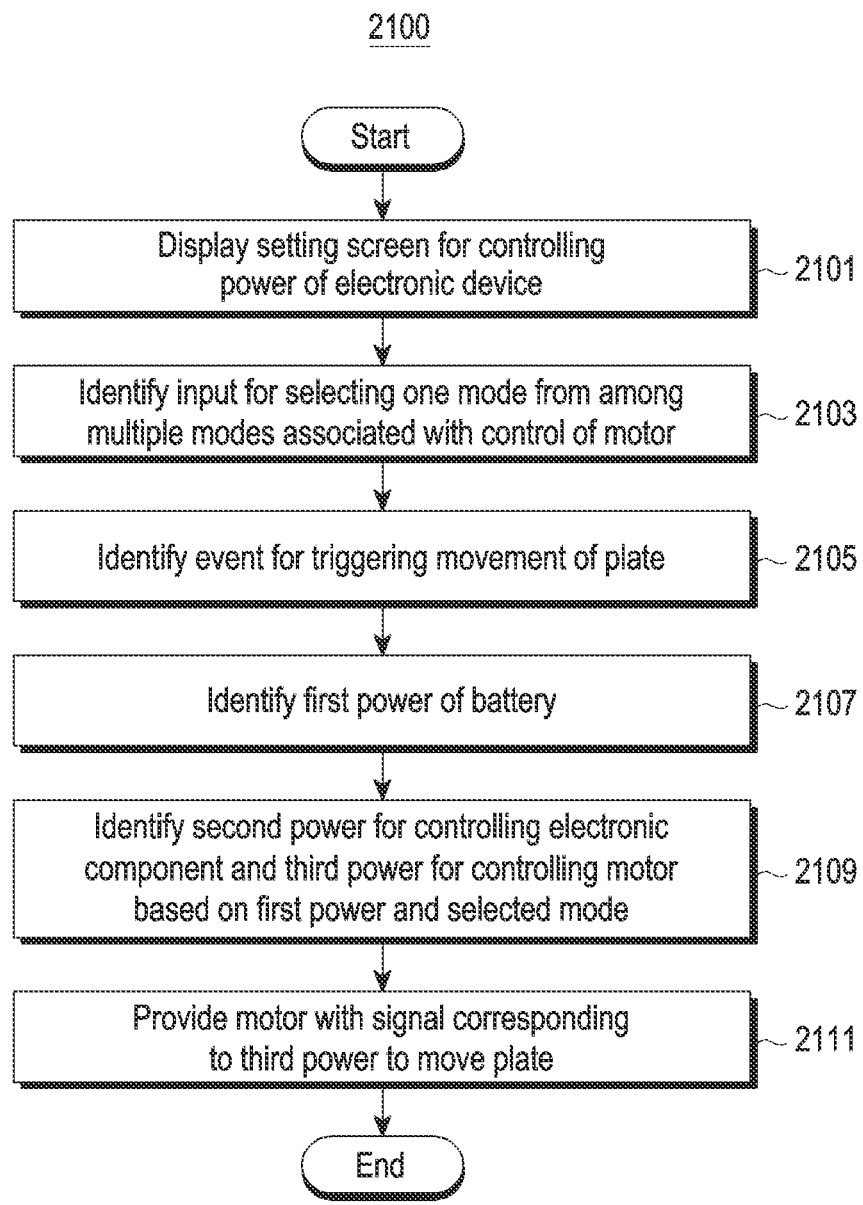

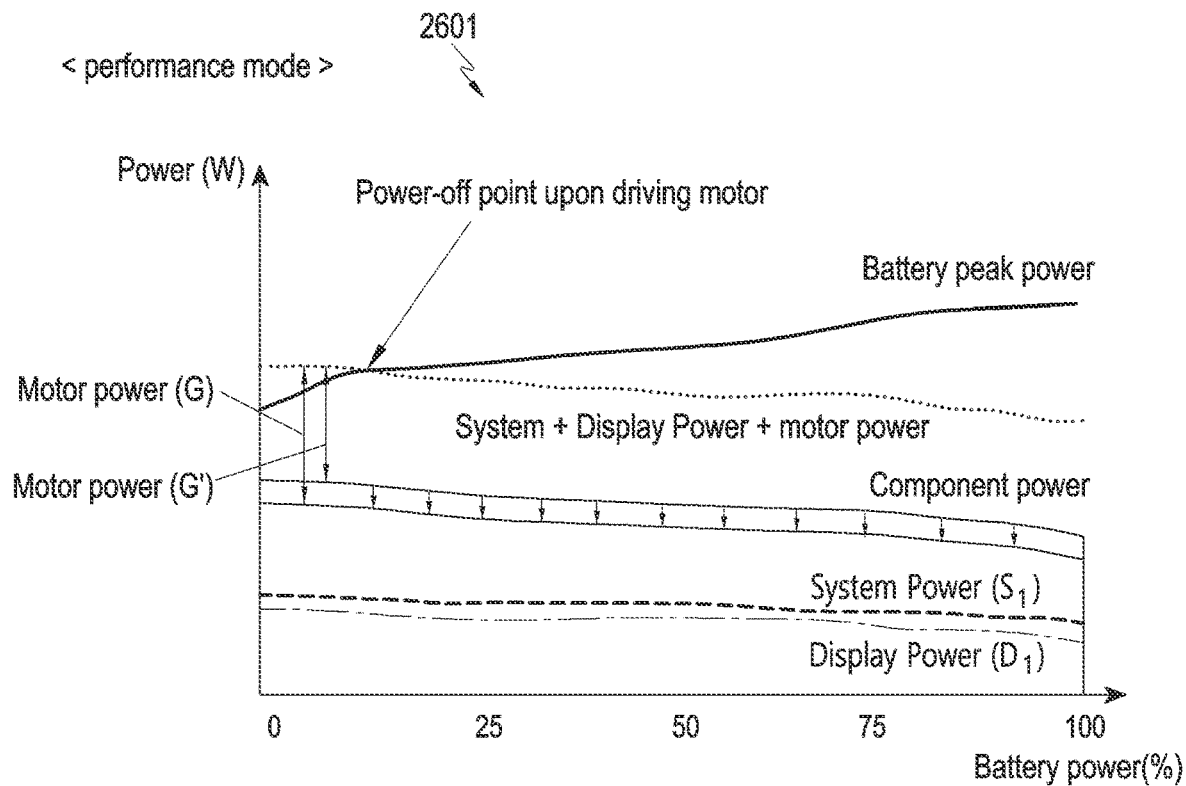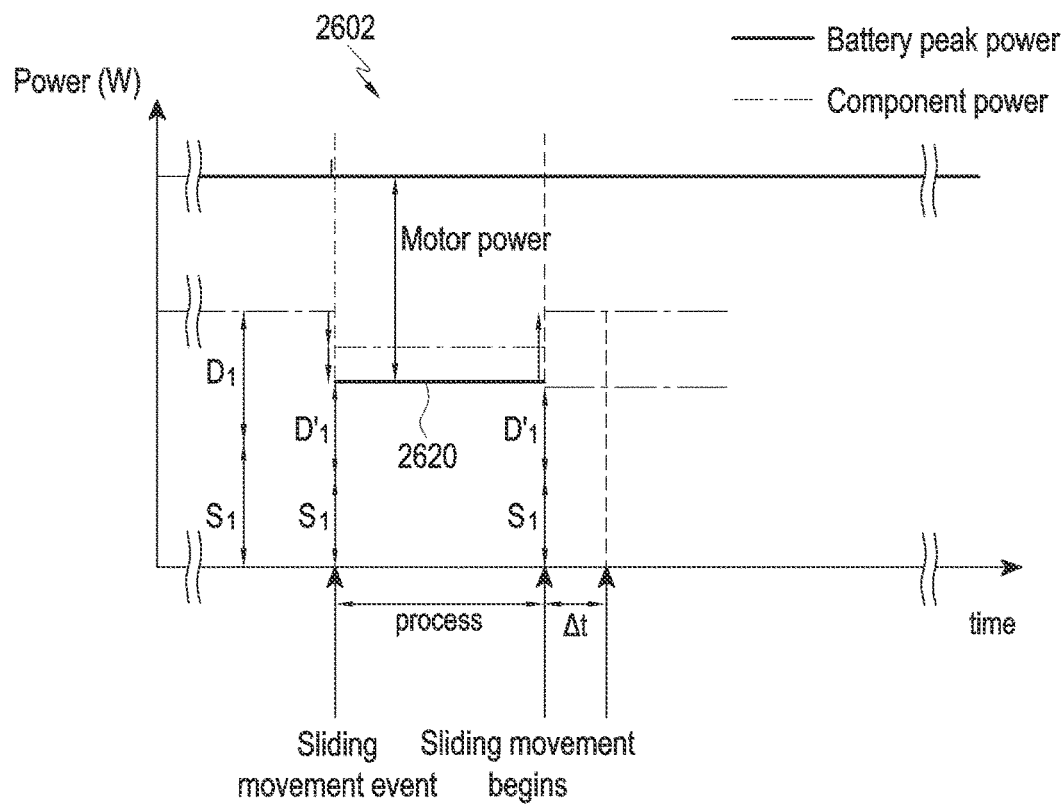
FIG.26A

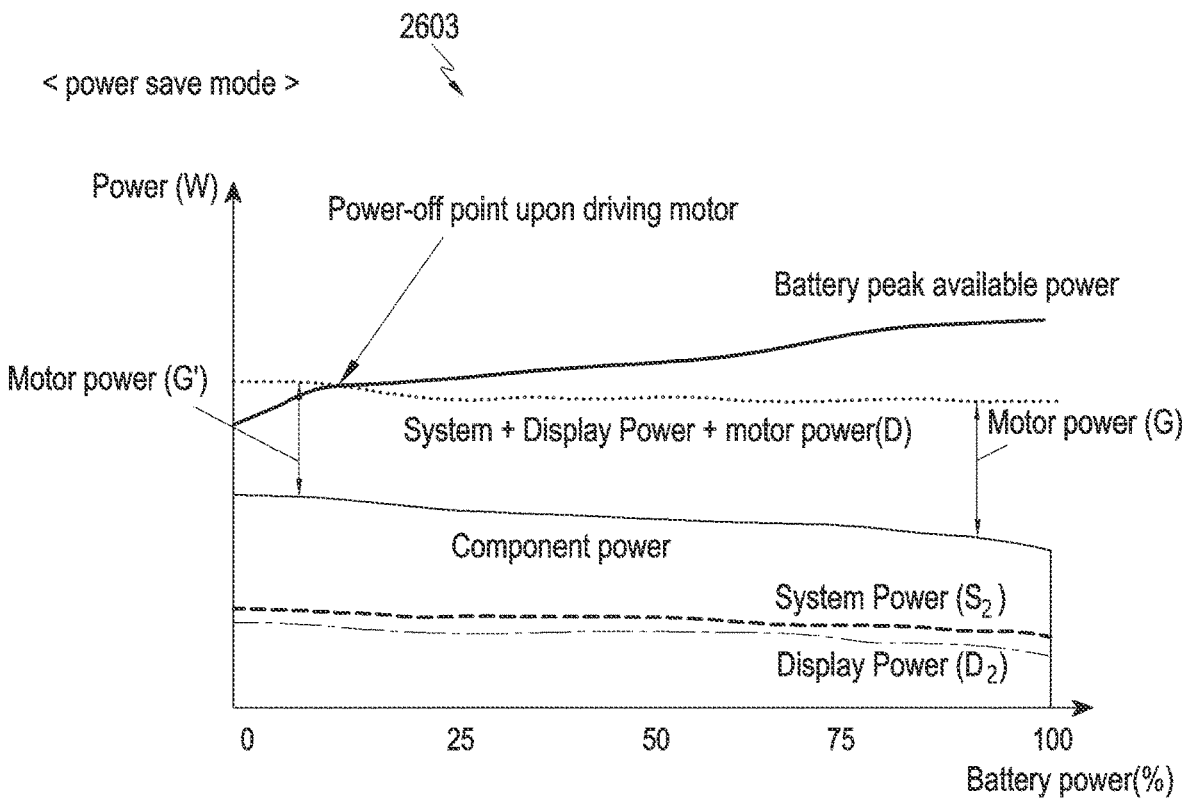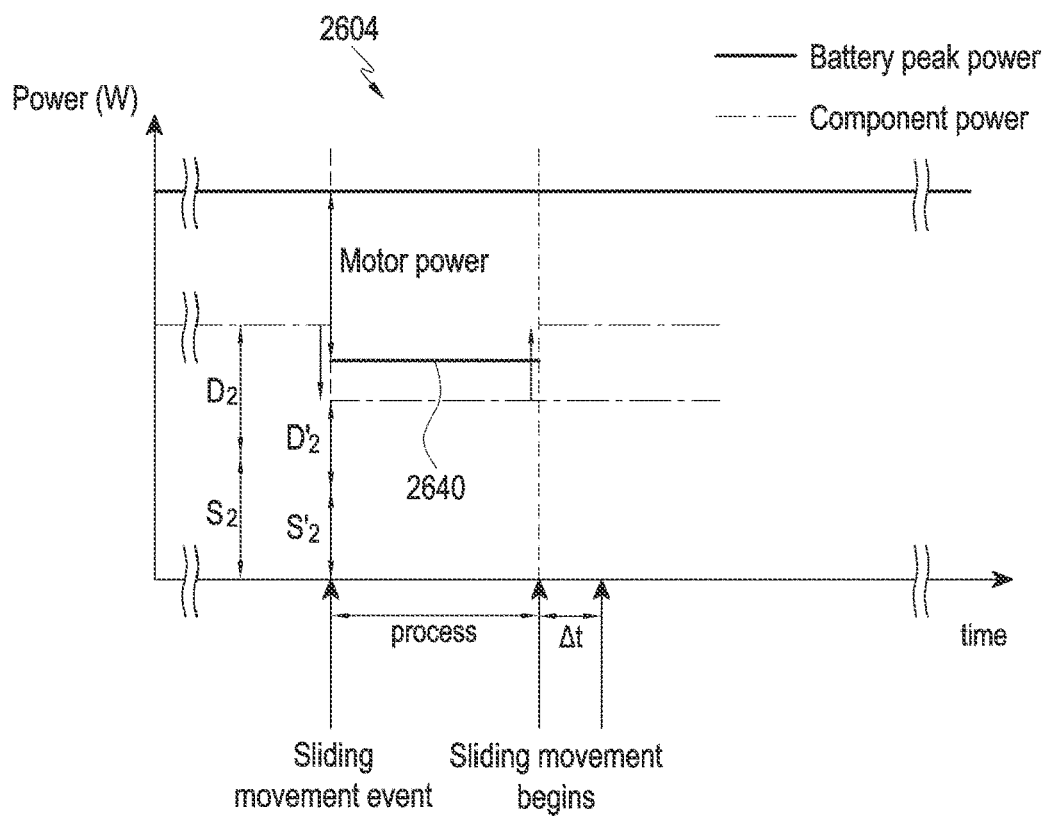
FIG.26B

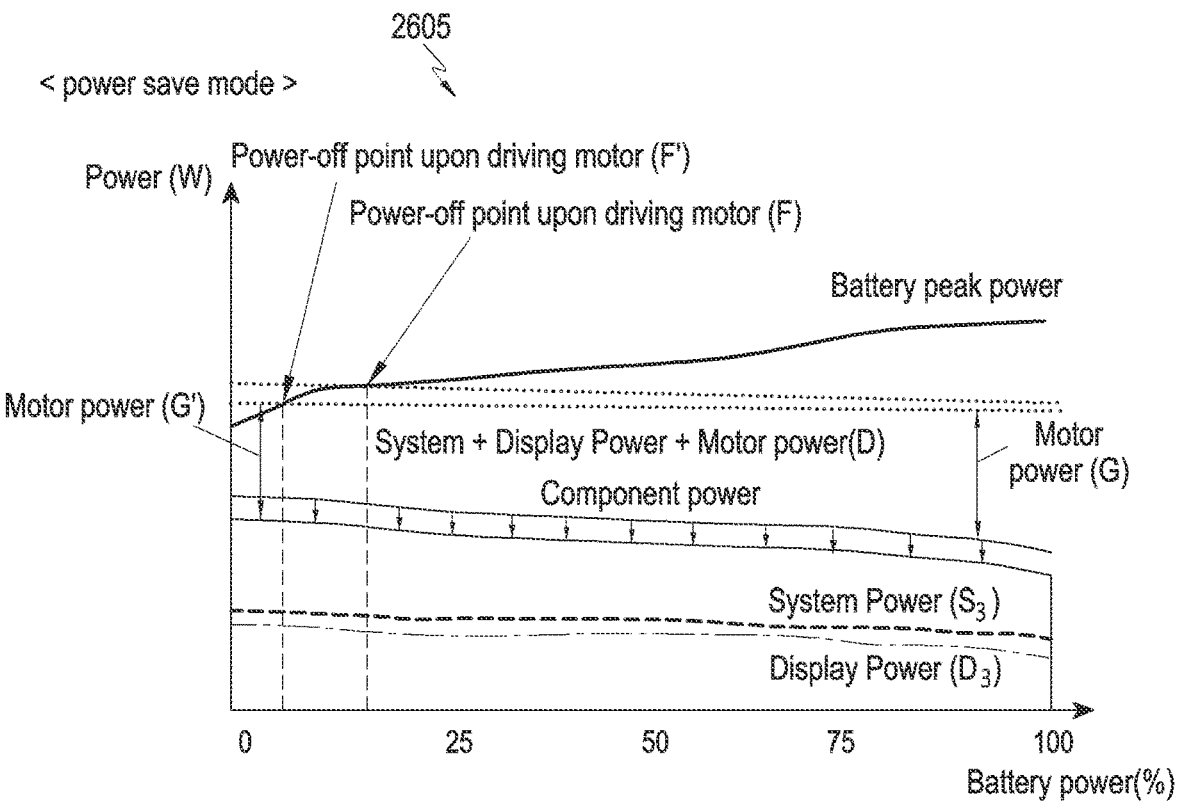
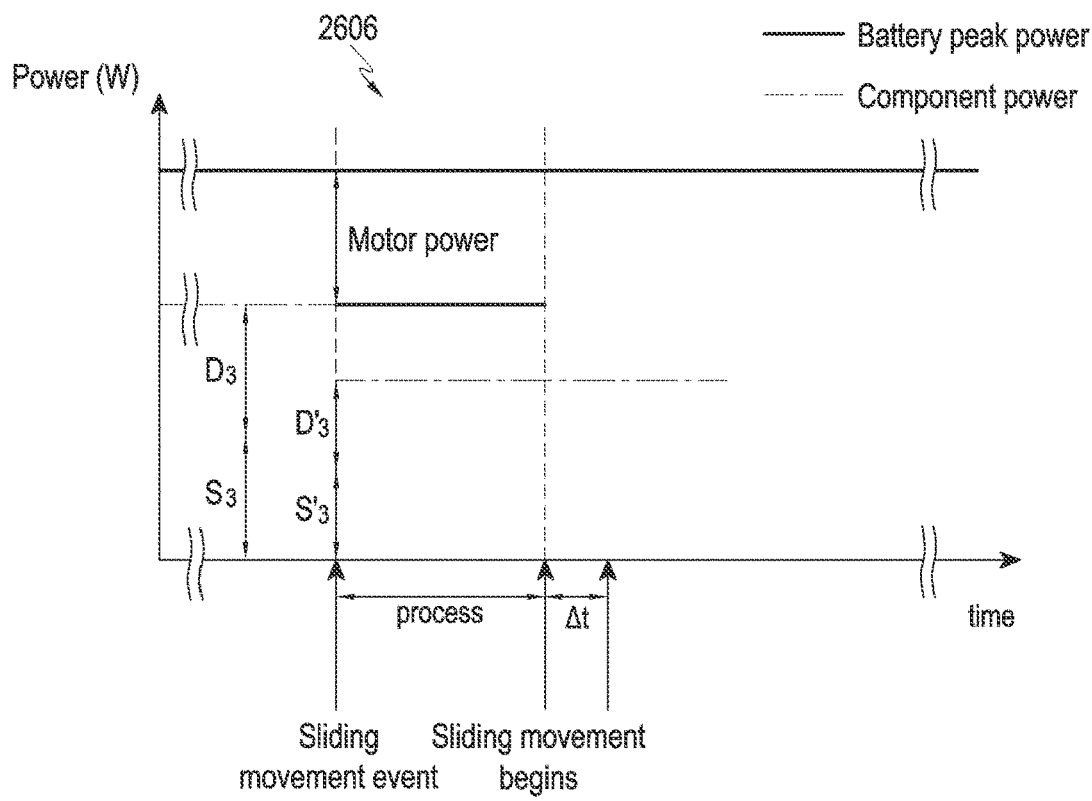
FIG.26C

ELECTRONIC DEVICE INCLUDING FLEXIBLE DISPLAY AND METHOD FOR OPERATING THE SAME

CROSS-REFERENCE TO RELATED APPLICATION(S)

This application is a continuation application, claiming priority under § 365(c), of an International application No. PCT/KR2022/003272, filed on Mar. 8, 2022, which is based on and claims the benefit of a Korean patent application number 10-2021-0106259, filed on Aug. 11, 2021, in the Korean Intellectual Property Office, the disclosure of each of which is incorporated by reference herein in its entirety.

TECHNICAL FIELD

Various embodiments of the disclosure relate to an electronic device including a flexible display and a method for operating the same.

BACKGROUND ART

As the demand for mobile communication increases, or as the degree of integration of electronic devices increases, the portability of electronic devices such as mobile communication terminals may be increased, and better convenience may be provided in use of multimedia functions. For example, as touchscreen-integrated displays replace traditional mechanical (button-type) keypads, electronic devices may come more compact while functioning as an input device. For example, as the mechanical keypad may be omitted from the electronic device, portability of the electronic device may be improved. As the display area may be expanded to the area which used to be occupied by the mechanical keypad, the electronic device may provide a larger screen while remaining in the same size and weight as when it has the mechanical keypad.

Use of an electronic device with a larger screen may give more convenience in, e.g., web browsing or multimedia playing. A larger display may be adopted to output a larger screen. However, this way may be limited by the portability of the electronic device. According to an embodiment, a display using organic light emitting diodes may secure the portability of the electronic device while providing a larger screen. For example, a display using, or equipped with, organic light emitting diodes may implement a stable operation even if it is made quite thin, so that the display may be applied to an electronic device in a foldable, bendable or rollable form.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

An electronic device (e.g., a rollable electronic device) may include a plurality of electronic components that are controlled (or driven) by receiving power and may provide stored power of the battery to the plurality of electronic components using a charging circuit (e.g., a charger). In this case, if the peak power (or peak current or peak voltage) output from the battery exceeds an outputable upper limit, the electronic device may power off. When the rollable electronic device controls a motor for drawing out and/or drawing in the flexible display, since the peak power for driving the motor is relatively high as compared to other electronic components, the peak power output from the battery according to the control of the motor may suddenly increase so that the electronic device may be powered off.

Aspects of the disclosure are to address at least the above-mentioned problems and/or disadvantages and to provide at least the advantages described below. According to various embodiments, an electronic device and an operation method thereof may determine power for controlling the motor to slide the flexible display based on the power available from the battery and the power for controlling electronic components other than the motor, preventing the electronic device from abruptly powering off.

According to various embodiments, an electronic device and an operation method thereof may dynamically adjust the power for controlling electronic components other than the motor and the power for controlling the motor, preventing the electronic device from abruptly powering off.

According to various embodiments, an electronic device and an operation method thereof may enhance the user's power management convenience by dynamically adjusting the power for controlling electronic components other than the motor and the power for controlling the motor.

Additional aspects will be set forth in part in the description which follows and, in part, will be apparent from the description, or may be learned by practice of the presented embodiments.

Technical Solution

According to various embodiments, an electronic device may comprise a housing, a plate coupled to the housing to reciprocate, a flexible display including a first portion disposed on the plate and a second portion extending from the first portion and exposed to an outside or retracted into an inside of the housing as the plate reciprocates, a motor configured to move the plate, at least one electronic component, a battery, and at least one processor. The at least one processor may be configured to identify an event for triggering a movement of the plate, identify a first power of the battery and a second power for controlling the flexible display and the at least one electronic component, based on the identification of the event, identify a third power for controlling the motor, based on the first power and the second power, and provide the motor with a signal corresponding to the third power to move the plate.

According to various embodiments, a method for operating an electronic device may comprise identifying an event for triggering a movement of a plate reciprocally coupled to a housing of the electronic device, a first portion of a flexible display of the electronic device disposed on the plate, and a second portion extending from the first portion of the flexible display being exposed to an outside or retracted into an inside of the housing as the plate reciprocates, identifying a first power of the battery and a second power for controlling the flexible display and the at least one electronic component, based on the identification of the event, identifying a third power for controlling the motor, based on the first power and the second power, and providing the motor with a signal corresponding to the third power to move the plate.

According to various embodiments, an electronic device may comprise a housing, a plate coupled to the housing to reciprocate, a flexible display including a first portion disposed on the plate and a second portion extending from the first portion and exposed to an outside or retracted into an inside of the housing as the plate reciprocates, a motor configured to move the plate, at least one electronic component, a memory, and at least one processor. The at least one processor may be configured to display an execution screen including information for a plurality of modes associated with control of the motor, identify an input for selecting a first mode from among the plurality of modes, the plurality of modes being associated with a magnitude of power of the motor, identify an event for triggering a movement of the plate, identify a power for controlling the motor having a magnitude corresponding to the first mode, and provide the motor with a signal corresponding to the identified power to move the plate.

Embodiments of the disclosure are not limited to the foregoing objectives, and other objectives would readily be appreciated by a skilled artisan from the following detailed description taken in conjunction with the accompanying drawings.

Advantageous Effects

According to various embodiments, there may be provided an electronic device and an operation method thereof that may determine power for controlling the motor to slide the flexible display based on the power available from the battery and the power for controlling electronic components other than the motor, preventing the electronic device from abruptly powering off According to various embodiments, there may be provided an electronic device and an operation method thereof that may dynamically adjust the power for controlling electronic components other than the motor and the power for controlling the motor, preventing the electronic device from abruptly powering off According to various embodiments, there may be provided an electronic device and an operation method thereof that may enhance the user's power management convenience by dynamically adjusting the power for controlling electronic components other than the motor and the power for controlling the motor.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which:

FIG. 13B is a view illustrating an example of an operation for controlling the power of a display of an electronic device while a display slides in, according to various embodiments of the disclosure;

FIG. 21 is a flowchart illustrating an example of an operation of an electronic device according to various embodiments of the disclosure;

FIG. 26A is a view illustrating an example of an operation for setting power based on a performance mode of an electronic device according to various embodiments of the disclosure;

FIG. 26B is a view illustrating an example of an operation for setting power based on a power save mode of an electronic device according to various embodiments of the disclosure;

FIG. 26C is a view illustrating an example of an operation for setting power based on a super power save mode of an electronic device according to various embodiments of the disclosure;

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
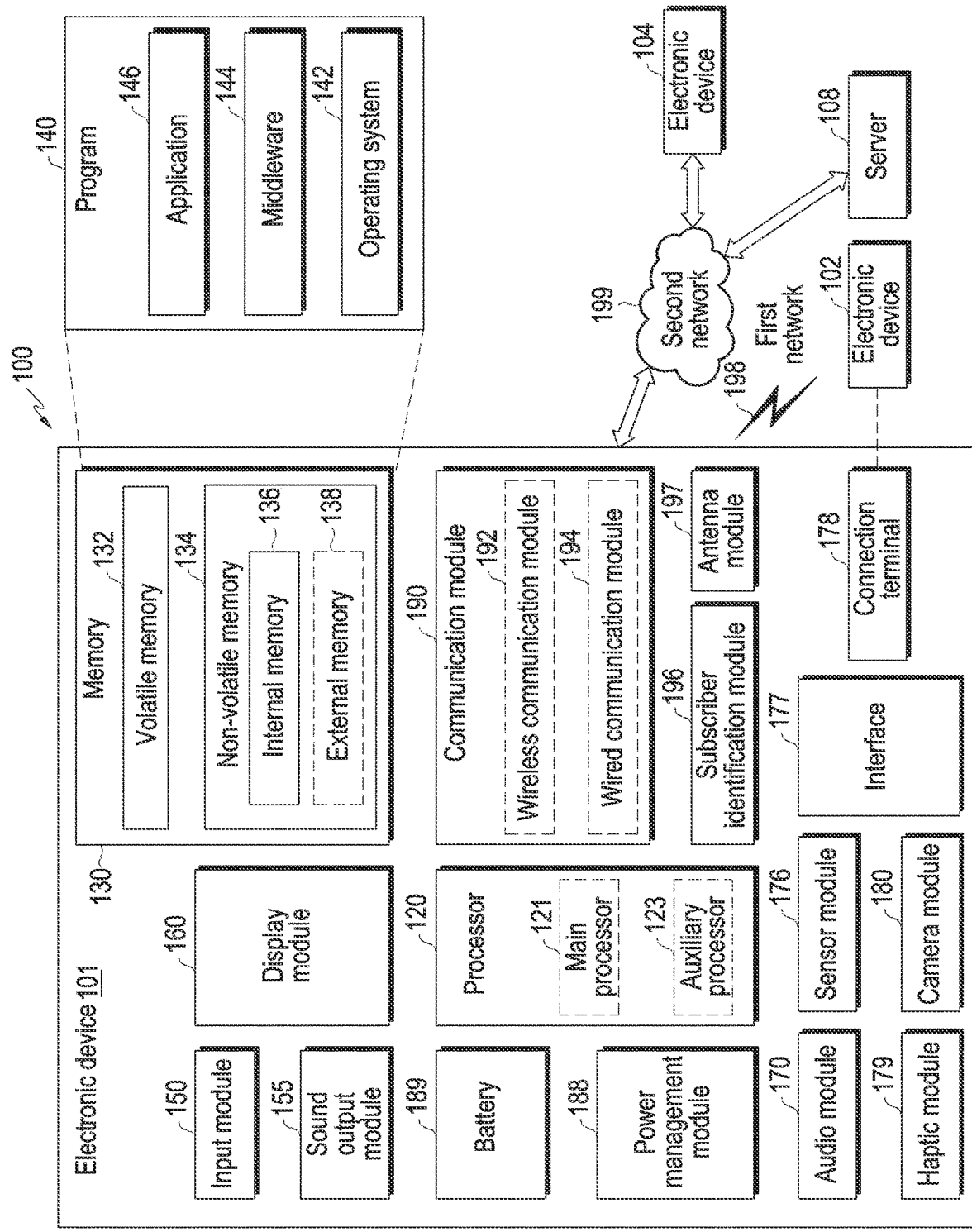
FIG. 1 is a block diagram illustrating an electronic device in a network environment according to various embodiments of the disclosure.

FIG. 1 is a block diagram illustrating an electronic device 101 in a network environment 100 according to various embodiments of the disclosure.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, an electronic device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments of the disclosure herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, various embodiments of an electronic device (e.g., the electronic device 101 of FIG. 1) of the disclosure are described. In the disclosure, an electronic device including a structure in which a flexible display is expandable may be defined as a rollable electronic device.

Figure 2A:
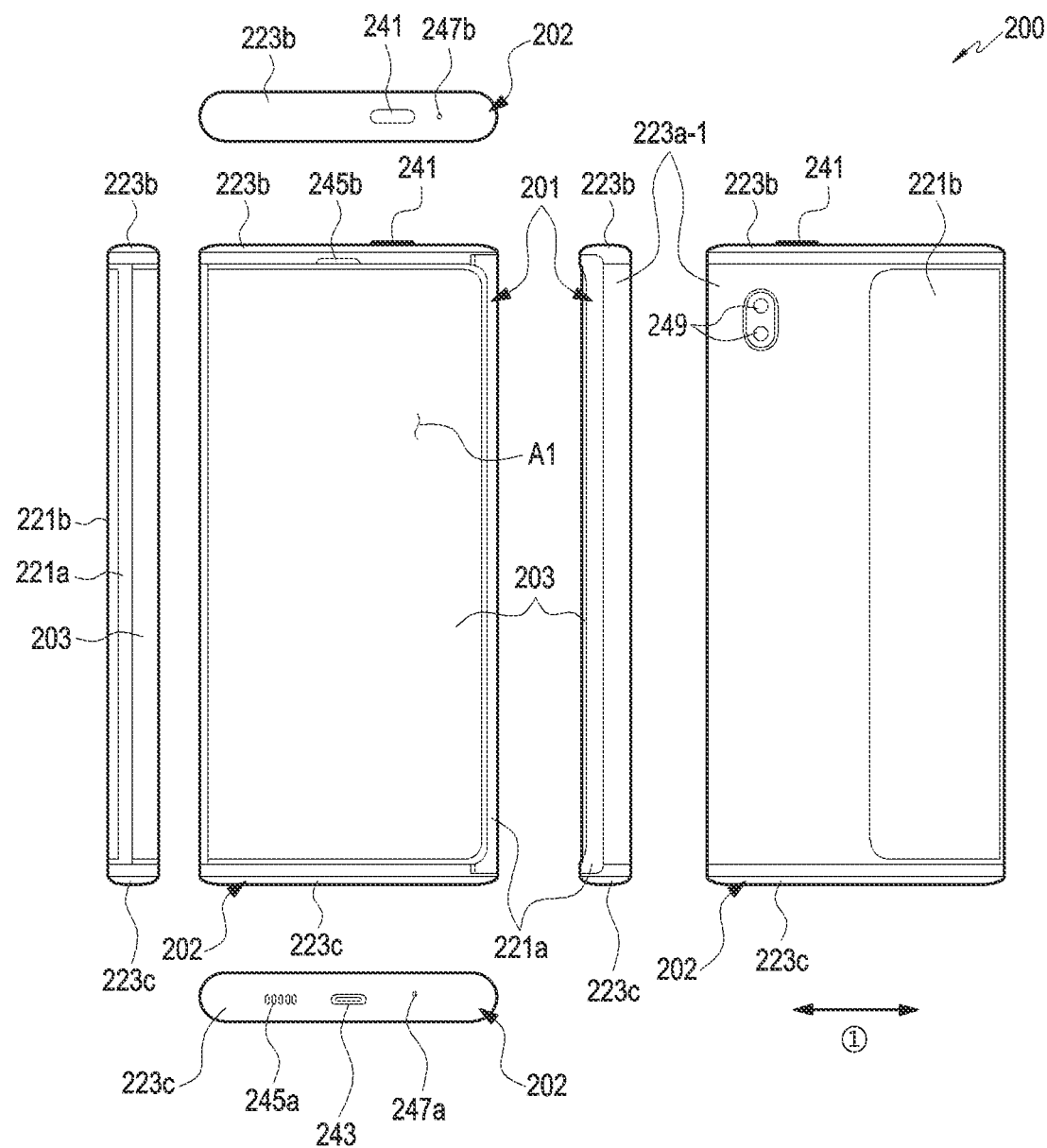
FIG. 2A is a view illustrating an electronic device, wherein a portion (e.g., a portion of a second area) of a flexible display is received in a second structure according to various embodiments of the disclosure.
Figure 2B:
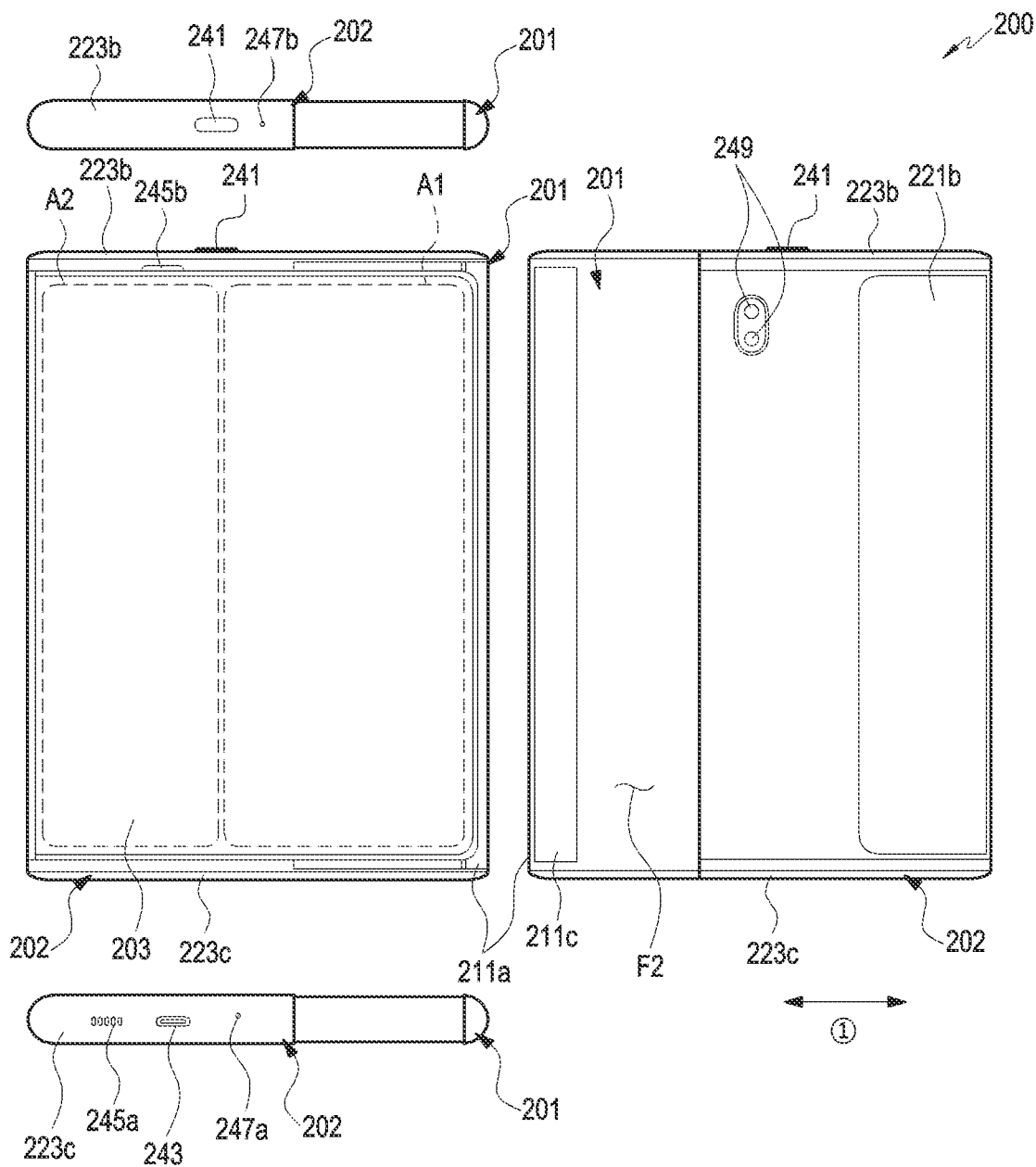
FIG. 2B is a view illustrating an electronic device, wherein most of a flexible display is visually exposed to the outside of a second structure according to various embodiments of the disclosure.

FIG. 2A is a view illustrating an electronic device 200, wherein a portion (e.g., a portion of a second area A2) of a flexible display 203 is received in a second structure 202 according to various embodiments of the disclosure. FIG. 2B is a view illustrating an electronic device, wherein most of a flexible display is visually exposed to the outside of a second structure according to various embodiments of the disclosure.

The state shown in FIG. 2A may be defined as a first structure 201 being closed with respect to a second structure 202, and the state shown in FIG. 2B may be defined as the first structure 201 being opened with respect to the second structure 202. According to an embodiment, the "closed state" or "open state" may be defined as a closed or open state of the electronic device. The electronic device 200 may include a first structure 201 and a second structure 202 movably disposed in the first structure 201. According to an embodiment, the electronic device 200 may be interpreted as having a structure in which the first structure 201 is slidably disposed on the second structure 202. According to an embodiment, the first structure 201 may be disposed to perform reciprocating motion between the closed state and the open state in the shown direction with respect to the second structure 202, for example, a direction indicated by an arrow ①.

According to various embodiments, the first structure 201 may be referred to as, for example, a first housing, a slide unit, a slide housing, or a slide plate, and may be disposed to reciprocate on the second structure 202. According to an embodiment, the second structure 202 may be referred to as, e.g., a second housing, a main unit, or a main housing, and may receive various electrical and electronic components, such as a circuit board (e.g., the printed circuit board 225 of FIG. 2C) or a battery (e.g., the battery 227 of FIG. 2C). A portion (e.g., the first area A1) of the flexible display 203 may be seated on the first structure 201. According to an embodiment, another portion (e.g., the second area A2) of the flexible display 203 may be received (e.g., slide-in) into the inside of the second structure 202 or exposed (e.g., slide-out) to the outside of the second structure 202 as the first structure 201 moves (e.g., slides) relative to the second structure 202.

According to various embodiments, the first structure 201 may include a first plate 211a (e.g., a slide plate), and the first structure 201 may include a first surface F1 (refer to FIG. 2C) formed to at least a portion of the first plate 211a and a second surface F2 facing away from the first surface F1. According to an embodiment, the second structure 202 may include a second plate 221a (refer to FIG. 2C) (e.g., a rear case), a first sidewall 223a extending from the second plate 221a, a second sidewall 223b extending from the first sidewall 223a and the second plate 221a, a third sidewall 223c extending from the first sidewall 223a and the second plate 221a and parallel to the second sidewall 223b, and/or a rear plate 221b (e.g., a rear window). According to an embodiment, the second sidewall 223b and the third sidewall 223c may be formed to be substantially perpendicular to the first sidewall 223a. According to an embodiment, the second plate 221a, the first sidewall 223a, the second sidewall 223b, and the third sidewall 223c may be formed to have an opening (e.g., in the front face) to receive (or surround) at least a portion of the first structure 201. For example, the first structure 201 may be coupled to the second structure 202 in a state in which it is at least partially surrounded, and the first structure 201 may be slide in a direction parallel to the first surface F1 or the second surface F2, for example, direction ① indicated with the arrow.

According to various embodiments, the second sidewall 223b or the third sidewall 223c may be omitted. According to an embodiment, the second plate 221a, the first sidewall 223a, the second sidewall 223b, and/or the third sidewall 223c may be formed as separate structures and may be combined or assembled. The rear plate 221b may be coupled to surround at least a portion of the second plate 221a. In some embodiments, the rear plate 221b may be formed substantially integrally with the second plate 221a. According to an embodiment, the second plate 221a or the rear plate 221b may cover at least a portion of the flexible display 203. For example, the flexible display 203 may be at least partially received inside the second structure 202, and the second plate 221a or the rear plate 221b may cover a portion (e.g., a portion A2 of the second area) of the flexible display received inside the second structure 202.

According to various embodiments, the first structure 201 may be moved to the open state or closed state with respect to the second structure 202 in a first direction (e.g., direction ①) parallel with the second plate 221a (e.g., the rear case) and the second sidewall 223b to be positioned a first distance away from the first sidewall 223a (e.g., a first sidewall portion 223a-1) in the closed state and be positioned a second distance away from the first sidewall 223a (e.g., a first sidewall portion 223a-1) in the open state, wherein the second distance is larger than the first distance. In some embodiments, when in the closed state, the first structure 201 may be positioned to surround a portion of the first sidewall 223a (e.g., the first sidewall portion 223a-1).

According to various embodiments, the electronic device 200 may include a flexible display 203, a key input device 241, a connector hole 243, audio modules 245a, 245b, 247a, and 247b, or a camera module 249. Although not shown, the electronic device 200 may further include an indicator (e.g., a light emitting diode (LED) device) or various sensor modules.

According to various embodiments, the flexible display 203 may include a first area A1 and a portion A2 of a second area. In one embodiment, the first area A1 may extend substantially across at least a portion of the first surface F1 and may be disposed on the first surface F1. The second area A2 may extend from the first area A1 and, as the first structure 201 slides, a portion of the second area A2 may be inserted (or drawn in) or received into the inside of the second structure 202 (e.g., housing) or be visually exposed to the outside of the second structure 202. As is described below, at least a portion of the second area A2 may be substantially moved while being guided by a roller 251 (refer to FIG. 2C) mounted on the second structure 202 to be received in the second structure 202 or visually exposed to the outside. For example, while the first structure 201 slides, a portion of the second area A2 may be deformed into a curved shape in a position corresponding to the roller 251.

According to various embodiments, when viewed from the top of the first plate 211a (e.g., slide plate), when the first structure 201 moves from the closed state to the open state, the second area A2 may be gradually visually exposed to the outside of the second structure 202 to be substantially coplanar with the first area A1. The flexible display 203 may be disposed to be coupled with, or adjacent, a touch detecting circuit, a pressure sensor capable of measuring the strength (pressure) of touches, and/or a digitizer for detecting a magnetic field-type stylus pen. In one embodiment, the second area A2 may be at least partially received inside the second structure 202, and a portion of the second area A2 may be visually exposed to the outside even in the state shown in FIG. 1 (e.g., the closed state). In some embodiments, irrespective of the closed state or the open state, the visually exposed portion of the second area A2 may be positioned on the roller 251 and, in a position corresponding to the roller 251, a portion of the second area A2 may maintain the curved shape. For example, as is described below, in the closed state of the electronic device 200, a portion of the second area A2 that is not covered by the back cover (e.g., the back cover 401 of FIGS. 4A and 4B to be described below) may be exposed to the outside and may have a curvature corresponding to the roller 251.

The key input device 241 may be disposed on the second sidewall 223b or the third sidewall 223c of the second structure 202. Considering the appearance and the state of use, the electronic device 200 may be manufactured to omit the illustrated key input device 241 or to include additional key input device(s). According to an embodiment, the electronic device 200 may include a key input device (not shown), e.g., a home key button or a touchpad disposed around the home key button. According to an embodiment, at least a portion of the key input device 241 may be positioned on an area of the first structure 201.

According to various embodiments, the connector hole 243 may be omitted or may receive a connector (e.g., a universal serial bus (USB) connector) for transmitting and receiving power and/or data with an external electronic device. Although not shown, the electronic device 200 may include a plurality of connector holes 243, and some of the plurality of connector holes 243 may function as connector holes for transmitting/receiving audio signals with an external electronic device. It should be noted that in the illustrated embodiment, the connector hole 243 is disposed in the third sidewall 223*c*, but the disclosure is not limited thereto. For example, the connector hole 243 or an additional connector hole not shown may be disposed in the first sidewall 223*a* or the second sidewall 223*b*.

According to various embodiments, the audio modules 245*a*, 245*b*, 247*a*, and 247*b* may include speaker holes 245*a* and 245*b* or microphone holes 247*a* and 247*b*. One of the speaker holes 245*a* and 245*b* may be provided as a receiver hole for voice calls, and the other may be provided as an external speaker hole. The microphone holes 247*a* and 247*b* may have a microphone inside to obtain external sounds. According to an embodiment, there may be a plurality of microphones to be able to detect the direction of a sound. In some embodiments, the speaker holes 245*a* and 245*b* and the microphone holes 247*a* and 247*b* may be implemented as one hole, or a speaker may be included without the speaker holes 245*a* and 245*b* (e.g., a piezo speaker). According to, the speaker hole indicated by the reference number "245*b*" may be disposed in the first structure 201 and used as a receiver hole for voice calls, and the speaker hole indicated by the reference number "245*a*" (e.g., an external speaker hole) or the microphone holes 247*a* and 247*b* may be disposed in the second structure 202 (e.g., one of the sidewalls 223*a*, 223*b*, and 223*c*).

The camera module 249 may be provided on the second structure 202 and may capture a subject in a direction opposite to the first area A1 of the flexible display 203. The electronic device 200 may include a plurality of camera modules 249. For example, the electronic device 200 may include a wide-angle camera, a telephoto camera, or a close-up camera, and according to an embodiment, by including an infrared projector and/or an infrared receiver, the electronic device 200 may measure the distance to the subject. The camera module 249 may include one or more lenses, an image sensor, and/or an image signal processor. Although not shown, the electronic device 200 may further include a camera module (e.g., a front camera) that captures the subject in the same direction as the first area A1 of the flexible display 203. For example, the front camera may be disposed around the first area A1 or in an area overlapping the flexible display 203 and, when disposed in the area overlapping the flexible display 203, the front camera may capture the subject through the flexible display 203.

According to various embodiments, an indicator (not shown) of the electronic device 200 may be disposed on the first structure 201 or the second structure 202, and the indicator may include a light emitting diode to provide state information about the electronic device 200 as a visual signal. The sensor module (not shown) of the electronic device 200 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). According to another embodiment, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 2C:
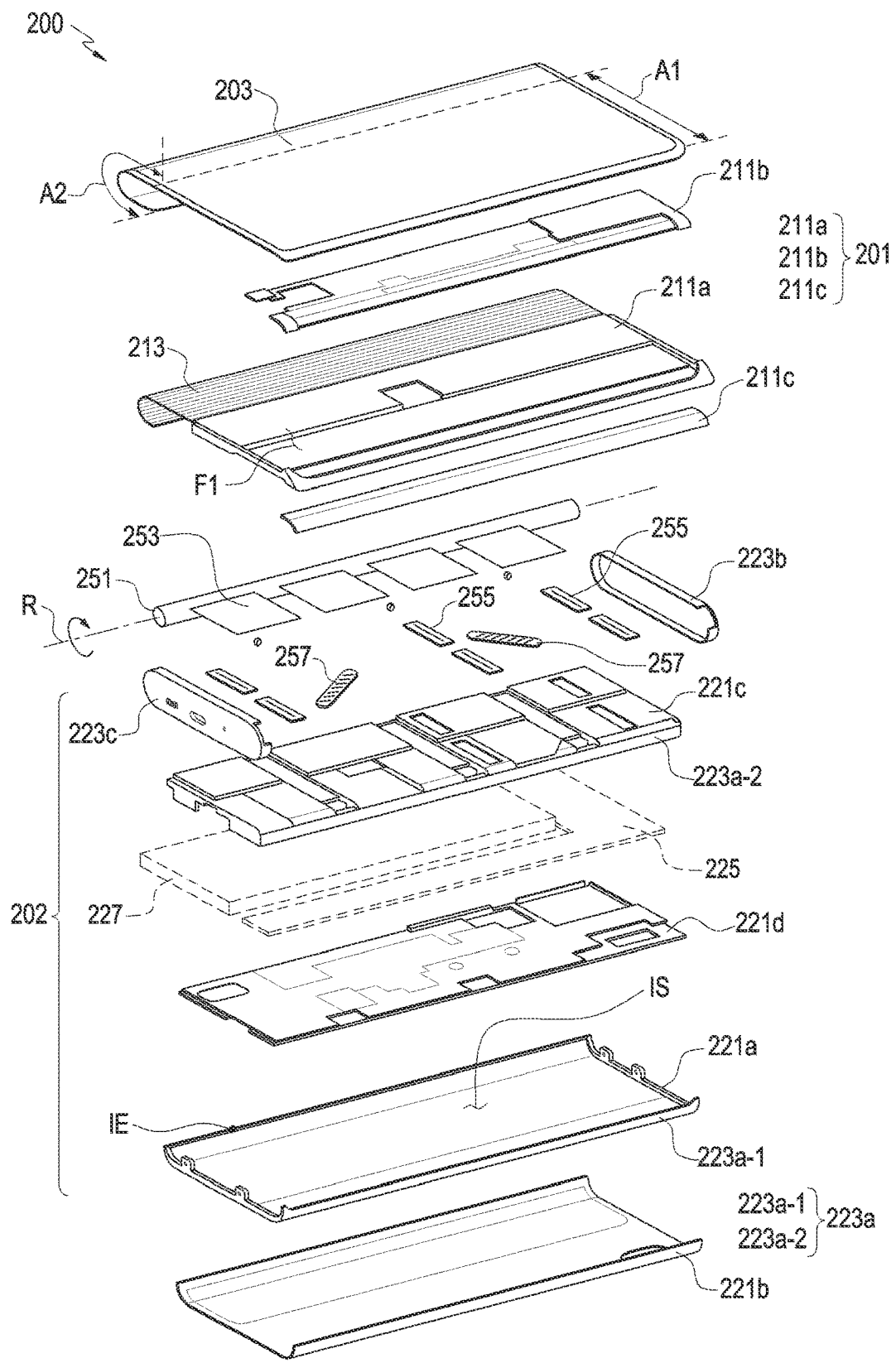
FIG. 2C is an exploded perspective view illustrating an electronic device (e.g., the electronic device of FIG. 2A or 2B) according to various embodiments of the disclosure.

FIG. 2C is an exploded perspective view illustrating an electronic device (e.g., the electronic device 200 of FIG. 2A or 2B) according to various embodiments of the disclosure.

Referring to FIG. 2C, an electronic device 200 may include a first structure 201, a second structure 202 (e.g., a housing), a flexible display 203 (e.g., a flexible display), a guide member (e.g., the roller 251), an articulated hinge structure 213, and/or at least one antenna structure 161. A portion (e.g., the second area A2) of the flexible display 203 may be received into the inside (e.g., a gap or space indicated by 'IS') of the second structure 202 while being guided by the roller 251.

According to various embodiments, the first structure 201 may include a first plate 211*a* (e.g., a slide plate), a first bracket 211*b* and/or a second bracket 211*c* mounted on the first plate 211*a*. The first structure 201, for example, the first plate 211*a*, the first bracket 211*b*, and/or the second bracket 211*c* may be formed of a metallic material and/or a non-metallic (e.g., polymer) material. The first plate 211*a* may be mounted on the second structure 202 (e.g., the housing) and may be linearly reciprocated in one direction (e.g., in the direction indicated with the arrow in FIG. 1) while being guided by the second structure 202. In an embodiment, the first bracket 211*b* may be coupled with the first plate 211*a* to, together with the first plate 211*a*, form the first surface F1 of the first structure 201. The first area A1 of the flexible display 203 may be substantially mounted on the first surface F1 and remain in a flat plate shape. The second bracket 211*c* may be coupled to the first plate 211*a* to, together with the first plate 211*a*, form the second surface F2 of the first structure 201. According to an embodiment, the first bracket 211*b* and/or the second bracket 211*c* may be integrally formed with the first plate 211*a*. This may be appropriately designed in consideration of the assembly structure or manufacturing process of the product to be manufactured. The first structure 201 or the first plate 211*a* may be coupled with the second structure 202 and slide with respect to the second structure 202.

According to various embodiments, the articulated hinge structure 213 may include a plurality of bars or rods extending in a straight line and disposed parallel to the rotation axis R of the roller 251. The plurality of rods may be arranged along a direction perpendicular to the rotation axis R, e.g., along a direction in which the first structure 201 slides. In an embodiment, the articulated hinge structure 213 is connected with one end of the first structure 201 to be able to move with respect to the second structure 202 according to the slide of the first structure 201. For example, in the closed state (e.g., the state illustrated in FIG. 1), the articulated hinge structure 213 may be substantially received (or drawn in) into the inside of the second structure 202 and, in the open state (e.g., the state illustrated in FIGS. 2A to 2C), the articulated hinge structure may be extracted (or drawn out) to the outside of the second structure 202. In some embodiments, even in the closed state, a portion of the articulated hinge structure 213 may not be received inside the second structure 202. For example, even in the closed state, a portion of the articulated hinge structure 213 may be positioned to correspond to the roller 251 outside the second structure 202. According to an embodiment, the plurality of rods may extend in a straight line and be disposed substantially parallel to the rotational axis R of the roller 251, and the plurality of rods 114 may be arranged along a direction substantially perpendicular to the rotational axis R, e.g., the direction along which the first structure 201 slides.

According to various embodiments, the rods of the articulated hinge structure 213 may orbit around other adjacent rods while remaining parallel to the other adjacent rods. Thus, as the first structure 201 slides, a portion of the articulated hinge structure 213, which faces the roller 251, may form a curved surface, and another portion of the articulated hinge structure 213, which does not face the roller 251, may form a flat surface. In one embodiment, the second area A2 of the flexible display 203 may be mounted or supported on the articulated hinge structure 213 and, in the open state (e.g., the state shown in FIGS. 2A to 2C), the second area A2, along with the first area A1, may be visually exposed to the outside of the second structure 202. In the state in which the second area A2 is visually exposed to the outside of the second structure 202, the articulated hinge structure 213 may substantially form a flat surface, thereby supporting or maintaining the second area A2 in the flat state.

According to various embodiments, the second structure 202 (e.g., the housing) may include a second plate 221a (e.g., the rear case), a rear plate 221b, a third plate 221c (e.g., the front case), and a supporting member 221d. In some embodiments, the electronic device 200 may further include a supporting member (not shown). The supporting member may, e.g., separate a gap or space in which a portion of the flexible display 203 is received from a space in which the printed circuit board 225 is disposed. The second plate 221a, e.g., the rear case, may be disposed to face in a direction opposite to the first surface F1 of the first plate 211a, and the second plate 221a may substantially form the external shape of the second structure 202 or the electronic device 200. In one embodiment, the second structure 202 may include a first sidewall 223a extending from the second plate 221a, a second sidewall 223b extending from the second plate 221a and formed to be substantially perpendicular to the first sidewall 223a, and a third sidewall 223c extending from the second plate 221a, substantially perpendicular to the first sidewall 223a, and parallel to the second sidewall 223b. In the illustrated embodiment, the second sidewall 223b and the third sidewall 123c are manufactured as separate components from the second plate 221a and are mounted or assembled on the second plate 221a. However, the second sidewall 223b and the third sidewall 223c may alternatively be integrally formed with the second plate 221a. According to an embodiment, the second structure 202 may receive an antenna for proximity wireless communication, an antenna for wireless charging, or an antenna for magnetic secure transmission (MST) in a space that does not overlap the articulated hinge structure 213.

According to various embodiments, the rear plate 221b may be coupled to the outer surface of the second plate 221a and, according to an embodiment, the rear plate 221b may be manufactured integrally with the second plate 221a. In one embodiment, the second plate 221a may be formed of a metal or polymer, and the rear plate 221b may be formed of a material such as metal, glass, synthetic resin, or ceramic to decorate the exterior of the electronic device 200. According to an embodiment, the second plate 221a and/or the rear plate 221b may be formed of a material that transmits light at least partially. In an embodiment, in a state in which a portion (e.g., the second area A2) of the flexible display 203 is received into the inside of the second structure 202, at least a portion of the second area A2 may be positioned corresponding to at least a portion, formed of the light transmitting material, of the second plate 221a and/or the rear plate 221b. For example, in a state of being received inside the second structure 202, the flexible display 203 may output a screen using at least a portion of the second area A2, and the user may recognize the screen output through at least a portion, formed of the light transmitting material, of the second plate 221a and/or the rear plate 221b.

According to various embodiments, the third plate 221c may be formed of a metal or polymer, and the third plate 221c may be coupled with the second plate 221a (e.g., rear case), the first sidewall 223a, the second sidewall 223b, and/or the third sidewall 223c to form an internal space of the second structure 202. According to an embodiment, the third plate 221c may be referred to as a "front case," and the first structure 201, e.g., the first plate 211a, may be slid while substantially facing the third plate 221c. In some embodiments, the first sidewall 223a may be formed of a combination of a first sidewall portion 223a-1 extending from the second plate 221a and a second sidewall portion 223a-2 formed at an edge of the third plate 221c. According to another embodiment, the first sidewall portion 223a-1 may be coupled to surround an edge of the third plate 221c, e.g., the second sidewall portion 223a-2. In this case, the first sidewall portion 223a-1 itself may form the first sidewall 223a.

According to various embodiments, the supporting member 221d not shown may be disposed in a space between the second plate 221a and the third plate 221c, and may have a flat plate shape formed of a metal or polymer. The supporting member 221d may provide an electromagnetic shielding structure in the internal space of the second structure 202 or may increase mechanical rigidity of the second structure 202. In one embodiment, when received into the inside of the second structure 202, a partial area (e.g., the second area A2) of the articulated hinge structure 213 and/or the flexible display 203 may be positioned in a space between the second plate 221a and the supporting member.

According to various embodiments, the printed circuit board 225 may be disposed in a space between the third plate 221c and the supporting member 221d. For example, the printed circuit board 225 may be received in a space separated, by the supporting member 221d, from the space in which a partial area of the articulated hinge structure 213 and/or the display 203 is received inside the second structure 202. A processor, memory, and/or interface may be mounted on the printed circuit board 225. The processor may include one or more of, e.g., a central processing unit, an application processor, a graphic processing device, an image signal processing, a sensor hub processor, or a communication processor.

According to various embodiments, the battery 227 may be disposed in a space between the third plate 221c and the supporting member 221d. Like the above-described printed circuit board 225, the battery 227 may be received in a space separated, by the supporting member 221d, from the space in which a partial area of the articulated hinge structure 213 and/or the display 203 is received inside the second structure 202.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 200 with an external electronic device and may include a USB connector, an SD card/multimedia card (MMC) connector, or an audio connector.

According to various embodiments, the flexible display 203 may be an organic light emitting diode-based flexible display, and the flexible display 203 may normally remain in the flat shape and may be at least partially deformed into a curved shape. In one embodiment, the first area A1 of the flexible display 203 may be mounted or attached to the first surface F1 of the first structure 201 and maintained in a substantially flat shape. The second area A2 may extend from the first area A1 and may be supported or attached to the articulated hinge structure 213. For example, the second area A2 may extend (or drawn out) along the sliding direction of the first structure 201 and, along with the articulated hinge structure, may be received (or drawn in) into the inside of the second structure 202. As the articulated hinge structure 213 is deformed, the second area A2 may be at least partially deformed into a curved shape.

According to various embodiments, as the first structure 201 slides on the second structure 202, the area of the flexible display 203 visually exposed to the outside may vary. The electronic device 200 (e.g., the processor) may change the area of the display 203 that is activated based on the area of the flexible display 203 that is visually exposed to the outside. For example, in the open state or in an intermediate position between the closed state and the open state, the electronic device 200 may activate a partial area visually exposed to the outside of the second structure 202 of the entire area of the flexible display 203. In the closed state, the electronic device 200 may activate the first area A 1 of the flexible display 203 and deactivate the second area A2. In the closed state, when there is no user input for a certain period of time (e.g., 30 seconds or 2 minutes), the electronic device 200 may deactivate the entire area of the flexible display 203. In some embodiments, in the state in which the entire area of the flexible display 203 is deactivated, the electronic device 200 may activate a partial area of the flexible display 203 as necessary (e.g., a notification according to user settings, missing call/received message notification) and provide visual information through the at least one portion, formed of a light transmitting material, of the second plate 221a and/or the rear plate 221b.

According to various embodiments, in the open state (e.g., the state shown in FIG. 2B), the entire area (e.g., the first area A1 and the second area A2) of the flexible display 203 may be visually exposed to the outside, and the first area A1 and the second area A2 may be arranged to form a plane. In one embodiment, even in the open state, a portion (e.g., one end) of the second area A2 may be positioned corresponding to the roller 251, and the portion of the second area A2, which corresponds to the roller 251 may remain in the curved shape. For example, according to an embodiment, despite the phrase "the second area A2 is disposed to form a plane in the open state," a portion of the second area A2 may remain in the curved shape. Likewise, although it is stated that "in the closed state, the articulated hinge structure 213 and/or the second area A2 are received inside the second structure 202," a portion of the second area A2 of the articulated hinge structure 213 may be positioned outside the second structure 202.

According to various embodiments, the guide member, e.g., the roller 251, may be rotatably mounted on the second structure 202 in a position adjacent to an edge of the second structure 202 (e.g., the second plate 221a). For example, the roller 251 may be disposed adjacent to an edge (e.g., the portion indicated with reference denotation 'IE') of the second plate 221a parallel to the first sidewall 223a. Although no reference denotation is assigned in the drawings, another sidewall may extend from the edge of the second plate 221a, and the sidewall adjacent to the roller 251 may be substantially parallel to the first sidewall 223a. According to an embodiment, the sidewall of the second structure 202 adjacent to the roller 251 may be formed of a material that transmits light, and a portion of the second area A2 may provide visual information via the portion of the second structure 202 while being received in the second structure 202. "May be arranged adjacent" may mean that they are spaced apart from each other by 5 mm or less. For example, the roller 251 may be disposed 5 mm or less apart from an edge (e.g., the portion indicated with reference denotation 'IE') of the second plate 221a parallel to the first sidewall 223a.

According to various embodiments, an end of the roller 251 may be rotatably coupled to the second sidewall 223b, and the other end thereof may be rotatably coupled to the third sidewall 223c. For example, the roller 251 may be mounted on the second structure 202, rotating about the rotation axis R substantially perpendicular to the sliding direction (e.g., direction ① indicated with the arrow in FIG. 1 or FIGS. 2A to 2C) of the first structure 201. The rotation axis R may be disposed substantially parallel to the first sidewall 223a, and may be positioned away from the first sidewall 223a, for example, at one edge of the second plate 221a. In one embodiment, the gap formed between the outer circumferential surface of the roller 251 and the inner surface of the edge of the second plate 221a may form an entrance through which the articulated hinge structure 213 or flexible display 203 enters the second structure 202.

Meanwhile, without being limited thereto, the electronic device 200 does not include the roller 251 and, instead of the roller 251, may include a guide member and/or a guide structure for guiding the flexible display 203. In an embodiment, as the guide member and/or the guide structure, the electronic device 200 may include a member (not shown) (hereinafter, a fixing member) having a first end fixed to the second sidewall 223b and a second end fixed to the third sidewall 223c. The fixing member may include an outer circumstantial surface having a predetermined curvature. The second area A2 of the flexible display 203 may be drawn out or in while being supported and guided by the outer circumferential surface of the fixing member. Hereinafter, for convenience of description, a case in which the roller 251 is provided in the electronic device 200 is described as an example.

According to various embodiments, when the flexible display 203 is deformed into a curved shape, the roller 251 may maintain a radius of curvature of the flexible display 203 to a certain degree, thereby suppressing excessive deformation of the flexible display 203. The term "excessive deformation" may mean that the flexible display 203 is deformed to have a radius of curvature that is too small to damage pixels or signal lines included in the flexible display 203. For example, the flexible display 203 may be moved or deformed while being guided by the roller 251 and may be protected from damage due to excessive deformation. In some embodiments, the roller 251 may rotate while the articulated hinge structure 213 or the flexible display 203 is inserted into or extracted from the second structure 202. For example, as the roller 251 rotates, the friction between the articulated hinge structure 213 (or flexible display 203) and the second structure 202 may be suppressed or prevented, allowing the articulated hinge structure 213 (or display 203) to smooth the insertion/extraction of the second structure 202.

According to various embodiments, the electronic device 200 may include a plurality of support sheets 253. For example, each support sheet 253 may be formed of a material having flexibility and a certain degree of elasticity, for example, a material including an elastic body such as silicone or rubber. As the roller 251 rotates, with the support sheet 253 mounted or attached to the roller 251, the support sheet 253 may be selectively wound around the roller 251. In an embodiment, a plurality of (e.g., four) support sheets 253 may be arranged along the direction of the rotation axis R of the roller 251. For example, the plurality of support sheets may be mounted on the roller 251 with them a predetermined distance spaced apart from other adjacent support sheets, and the support sheets may extend along a direction perpendicular to the rotation axis R. In another embodiment, one support sheet may be mounted or attached to the roller 251, and the number, size or shape of the support sheets 253 may be appropriately changed according to the product to be actually manufactured. In some embodiments, as the roller 251 rotates, the support sheet 253 may be rolled up on the outer circumferential surface of the roller 251 or may depart from the roller 251 and unfold in a flat plate shape between the display 203 and the third plate 221c. According to another embodiment, the support sheet 253 may be referred to as a "support belt," "auxiliary belt," "support film" or "auxiliary film "

According to various embodiments, the electronic device 200 may further include a guide rail(s) 255 and/or an actuating member(s) 257. The guide rail(s) 255 may be mounted on the second structure 202, e.g., the third plate 121c to guide a sliding of the first structure 201 (e.g., the first plate 111a or the slide plate). The driving member(s) (actuating member(s) 257) may include a spring or a spring module that provides an elastic force in a direction along which two opposite ends thereof move away from each other, and a first end of the driving member(s) (actuating member(s) 257) may be rotatably supported on the second structure 202, and a second end may be rotatably supported on the first structure 201.

According to various embodiments, when the first structure 201 slides, both the ends of the actuating member(s) 257 may be positioned closest to each other (hereinafter, a 'nearest point') at any one point between the closed state and the open state. For example, in the interval between the nearest point and the closed state, the actuating member(s) 257 may provide an elastic force to the first structure 201 in a direction moving toward the closed state and, in the interval between the nearest point and the open state, the actuating member(s) 257 may provide an elastic force to the first structure 201 in a direction moving toward the open state.

Hereinafter, various examples of the electronic device 200 described above with reference to FIGS. 2A to 2C are described.

Figure 3:
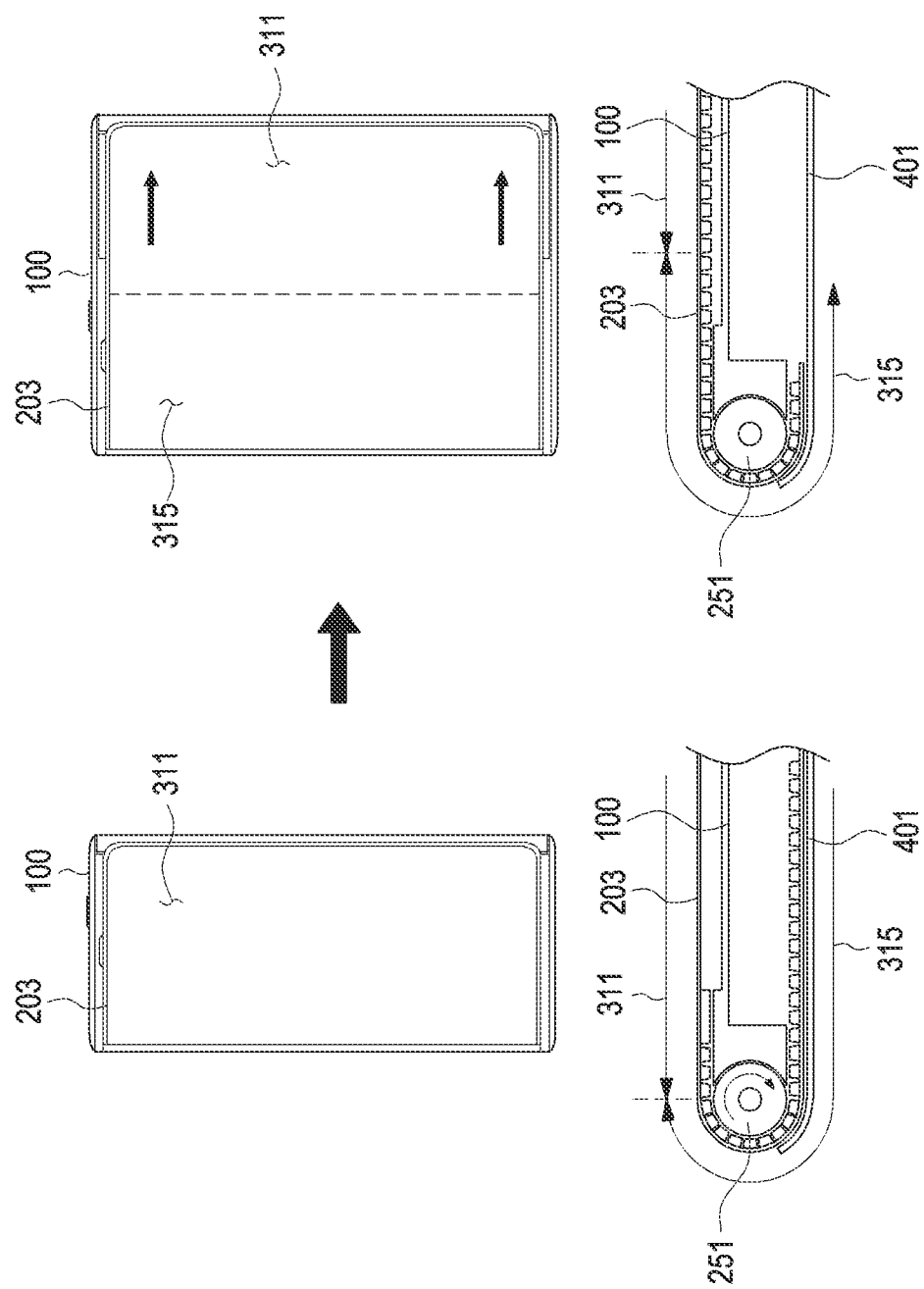
FIG. 3 is a view illustrating an example of a structure in which a flexible display of an electronic device may be drawn in or out according to various embodiments of the disclosure.
Figure 4A:
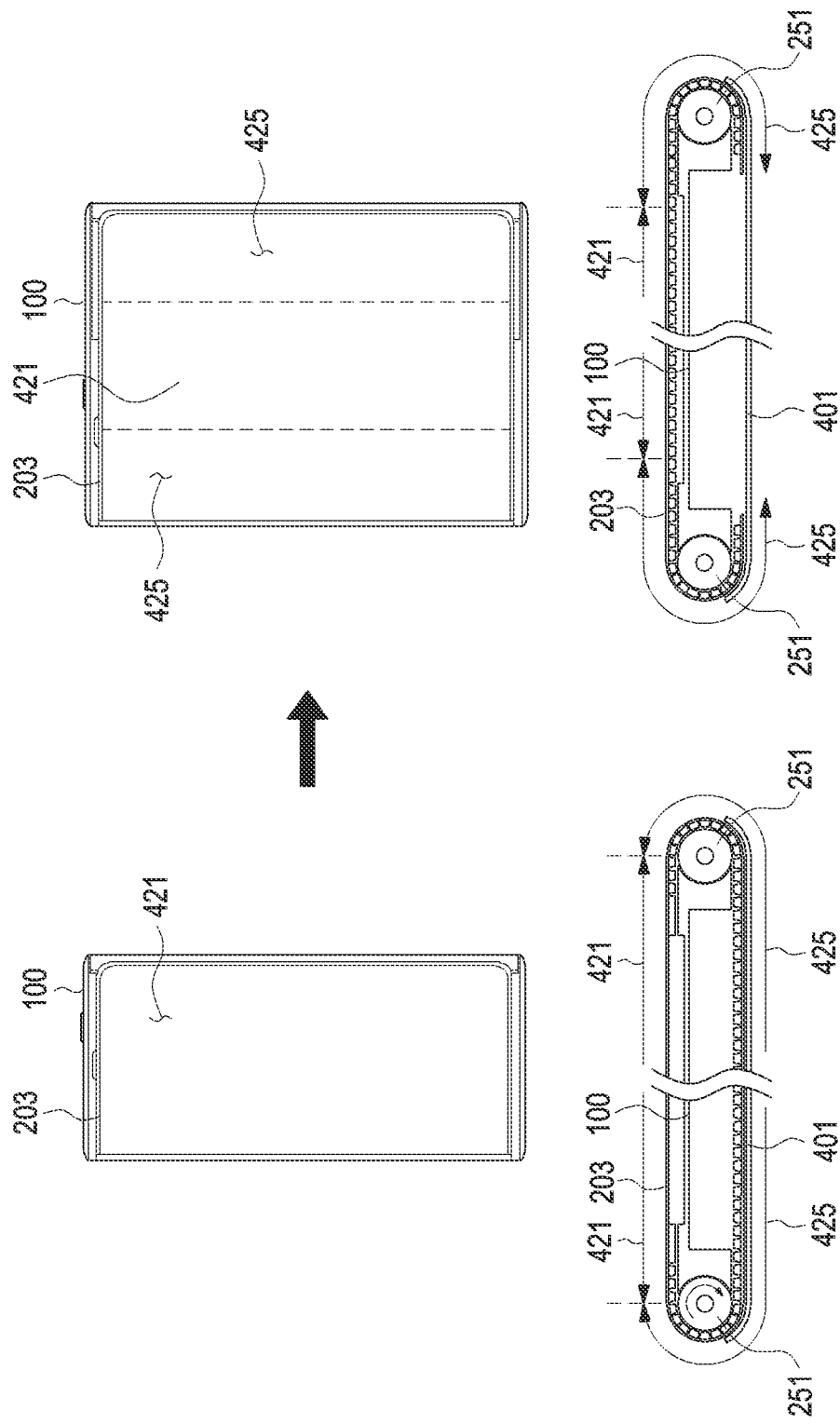
FIG. 4A is a view illustrating another example of a structure in which a flexible display of an electronic device may be retracted or drawn out according to various embodiments of the disclosure.
Figure 4B:
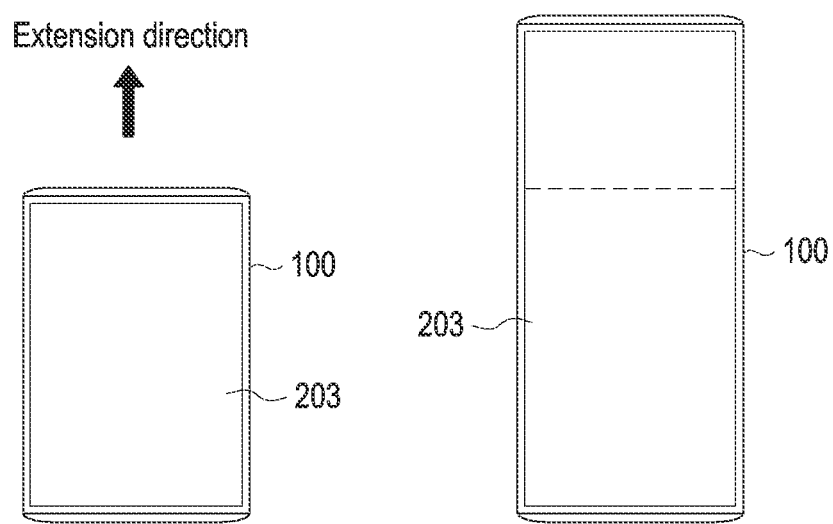
FIG. 4B is a view illustrating still another example of a structure in which a flexible display of an electronic device may be retracted or drawn out according to various embodiments of the disclosure.

FIG. 3 is a view illustrating an example of a structure in which a flexible display 203 of an electronic device 200 may be drawn in or out according to various embodiments of the disclosure. FIG. 4A is a view illustrating another example of a structure in which a flexible display 203 of an electronic device 200 may be retracted or drawn out according to various embodiments of the disclosure. FIG. 4B is a view illustrating still another example of a structure in which a flexible display 203 of an electronic device 200 may be retracted or drawn out according to various embodiments of the disclosure.

According to various embodiments, the electronic device 200 may include a structure that enables the flexible display 203 to be drawn in or out in at least one direction. For example, the electronic device 200 may include at least one roller (e.g., the roller 251 described in connection with FIGS. 2A to 2C) provided in a portion corresponding to at least one direction and at least one structure (e.g., the first structure 201 described in connection with FIGS. 2A to 2C) which may be reciprocated by the rotation of at least one roller and where a portion (e.g., the first area A1 described in connection with FIGS. 2A to 2C) of the flexible display 203 is disposed. As is described below, the rotation of the roller 251 may be performed by a moving device (e.g., the moving device 510 of FIG. 5). As a portion of a specific area (e.g., the second area A2 described above in connection with FIGS. 2A to 2C) of the flexible display 203 is received or exposed according to the reciprocation of the at least one structure, the area of the flexible display 203 may be expanded or contracted, at, at least one side portion, in at least one direction. Alternatively, without being limited thereto, as described above, the structure of the electronic device 200 may include a fixing member that enables the display 203 to be drawn in or out, instead of the roller 251.

Hereinafter, examples of the structure of the electronic device 200 are described.

For example, the electronic device 200 may include a structure that allows the flexible display 203 to be drawn in or out in one direction. As an example, referring to FIG. 3, as described above with reference to FIGS. 2A to 2C, in the electronic device 200, as the first structure 201 is reciprocated using the roller 251 provided on a first side (e.g., the left side or right side (not shown)) (e.g., to a second side or to the first side), the flexible display 203 may be drawn out to the second side (e.g., the right side) or drawn in to the first side (e.g., the left side). Referring to FIG. 4B, as the first structure 201 is reciprocated (e.g., to an upper side or lower side) using the roller 251 provided on a first side (e.g., the lower side or upper side), the flexible display 203 may be drawn out to a second side (e.g., the upper side) or drawn in to the first side (e.g., the lower side). As the flexible display 203 is drawn out, at least a portion of the exposed area 311 and the received area 315 before the flexible display 203 is drawn out may be exposed to the outside (e.g., an outside not blocked by the back cover 401 and/or the second structure 202).

As another example, the electronic device 200 may include a structure that allows the flexible display 203 to be drawn in or out in at least two or more directions. Referring to FIG. 4A, in the electronic device 200, as the structures where the flexible display 203 is seated are reciprocated (e.g., to a first side or a second side) using a roller provided on the first side and rollers 251 provided on the second side, the flexible display 203 may be extended from the first side in a first direction and from the second side in a second direction. As the flexible display 203 is drawn out, at least a portion of the exposed area 421 and the received area 425 before the flexible display 203 is drawn out may be exposed to the outside (e.g., an outside not blocked by the back cover 401 and/or the second structure 202).

Without being limited to those shown, a structure (e.g., the first structure 201 or the roller 251) for expanding or shrinking the area of the flexible display 203 may be provided at a plurality of portions of the electronic device 200 to allow the flexible display 203 to be expanded and contracted in directions corresponding to the plurality of portions.

In addition to the described examples, the control operations of the electronic device 200 described below may be applied to various types of electronic devices having various types of structures that enable the display to be drawn in and/or out.

Examples of configurations of the electronic device 200 are described below according to various embodiments. Meanwhile, since the description of the electronic device 200 described in connection with FIG. 1 may be applied to the following description of the electronic device 200, no duplicate description is given below.

Figure 5:
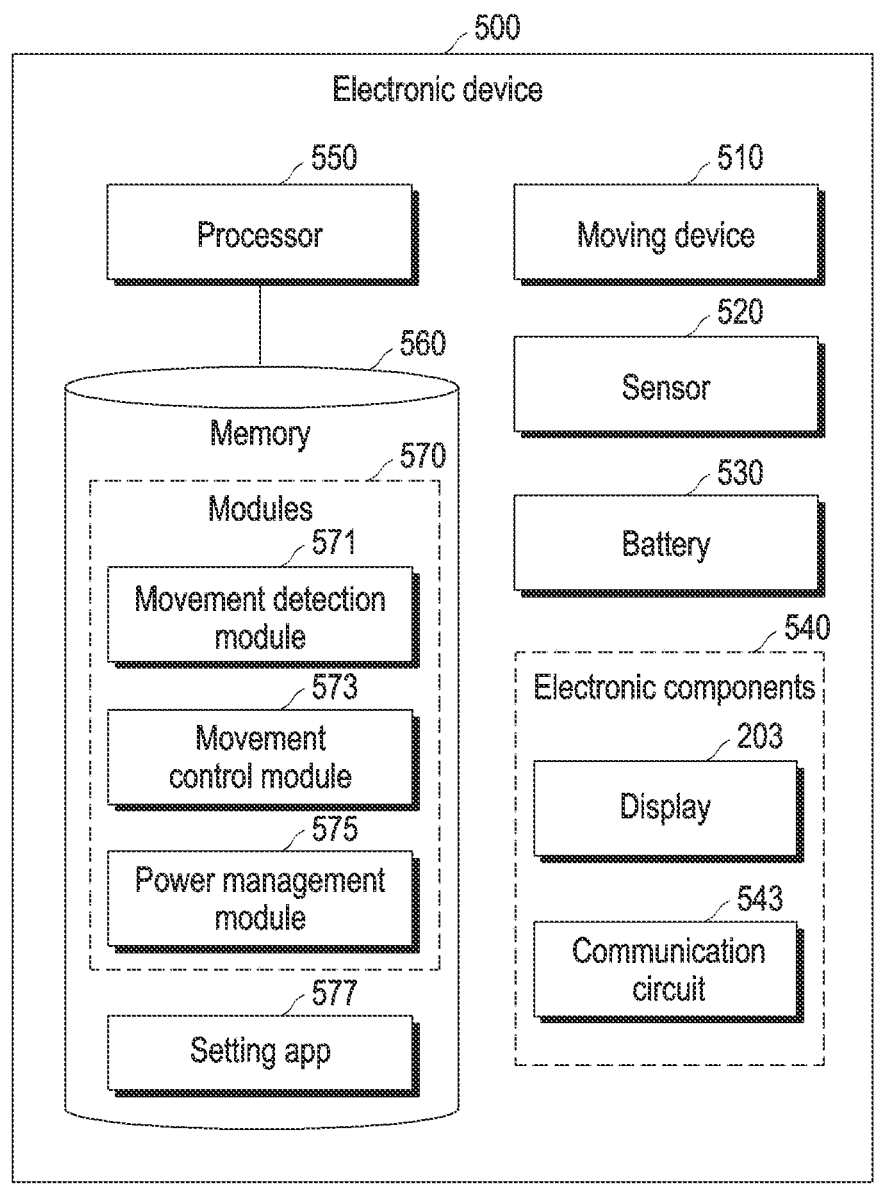
FIG. 5 is a view illustrating a configuration of an electronic device according to various embodiments of the disclosure.

FIG. 5 is a view illustrating a configuration of an electronic device 200 according to various embodiments of the disclosure. FIG. 5 is described below with reference to FIG. 6.

Figure 6:
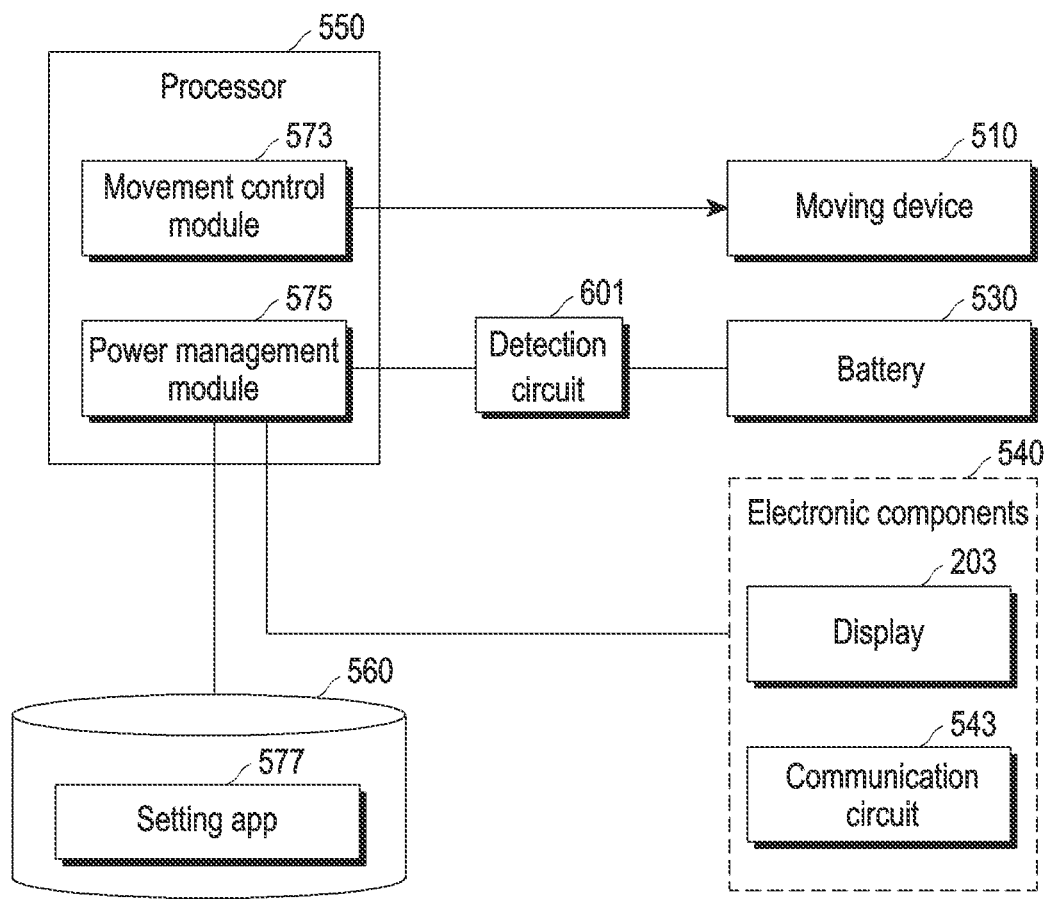
FIG. 6 is a view illustrating examples of an operation for identifying power for controlling a moving device (e.g., a motor) by a processor and an operation for transferring a signal corresponding to the identified power to the moving device (e.g., a motor) according to various embodiments of the disclosure.

FIG. 6 is a view illustrating examples of an operation for identifying power for controlling a moving device 510 (e.g., a motor) by a processor 550 and an operation for transferring a signal corresponding to the identified power to the moving device 510 (e.g., a motor) according to various embodiments of the disclosure.

According to various embodiments, the electronic device 200 may include a moving device 510, a sensor 520, a battery 530, electronic components 540, a processor 550, and a memory 560 as illustrated in FIG. 5. Without being limited to the components illustrated in FIG. 5, the electronic device 200 may be implemented to include more or fewer components. For example, the electronic device 200 may be implemented to further include components of the electronic device 101 described below with reference to FIG. 1.

Hereinafter, an example of the moving device 510 according to various embodiments is described.

According to various embodiments, the moving device 510 may include devices for sliding the display 203 (or the first structure 201 or the first plate 211*a*). For example, the moving device 510 may include a motor for rotating the above-described roller 251 in one direction (e.g., clockwise or counterclockwise). In addition to the motor, the moving device 510 may include various devices for rotating the roller 251 to slide the display 203 (or the first structure 201 or the first plate 211*a*). Meanwhile, without being limited thereto, the electronic device 200 may include a guide member and/or a guide structure (e.g., a hinge structure implemented with a shape memory alloy) for guiding the display 203 instead of the roller 251.

Hereinafter, an example of the at least one sensor 520 is described.

According to various embodiments, when the display 203 (or the first structure 201 or the first plate 211*a*) slides, the sensor 520 may sense the slide of the display 203 and return an electrical value (e.g., a current value and/or voltage value) indicating the state of the sliding movement. The processor 550, which is described below, may obtain the electrical value to identify the state associated with the sliding movement. For example, the state associated with the sliding movement may include at least one of the start or end of the sliding movement of the display 203, a state of the electronic device 200 according to the sliding movement (e.g., an open state, a closed state, or an intermediate state), or the sliding distance. For example, the at least one sensor 520 may be implemented as a sensor (e.g., the image sensor 300 or an optical sensor) for detecting specific content (e.g., a RGB color) displayed in a partial area of the received portion (e.g., the second area A2) of the display 203, identify a change in the detection state of the specific content (e.g., a movement of the content or non-display of the content) when the display 203 is moved, and return an electrical value indicating the start of the sliding movement. In this case, if the sliding movement is finished, the electronic device 200 may redisplay specific content in the partial area of the received portion (e.g., the second area A2) of the display 203, and the at least one sensor 520 may detect the redisplayed content and return an electrical value indicating the end of the sliding movement. As another example, the at least one sensor 520 may include a sensor that detects an electromagnet which is attached when the sliding movement of the display 203 is started or ended and, when the sliding movement starts or ends, return an electrical value indicating the start or end. As another example, the at least one sensor 520 may be implemented as a sensor (e.g., a pressure sensor, a resistance sensor, etc.) for detecting a dielectric that is moved when the display 203 slides and may return an electrical value indicating the sliding distance based on the moving distance of the dielectric. Meanwhile, without being limited to the above description, instead of receiving a value from the at least one sensor 520, the electronic device 200 may identify the state associated with the sliding movement of the display 203 based on a signal for controlling the motor for rotating the roller (e.g., roller 251) of a movement control module 573 described below.

According to various embodiments, the sensor 520 may include types of sensors for obtaining other various information than the state (e.g., the grip state or the mounted state) of the electronic device 200. For example, the at least one sensor 520 may include a grip sensor. The electronic device 200 may identify whether the electronic device 200 is gripped using the grip sensor. For example, the at least one sensor 520 may include an acceleration sensor (e.g., a 6-axis sensor). The electronic device 200 may detect the placement state of the electronic device 200 using the acceleration sensor and may detect whether the electronic device 200 is placed on an object according to the placement state.

According to various embodiments, the sensor 520 may include sensors for identifying the state of the electronic device 200. For example, the at least one sensor may include a temperature sensor for measuring the temperature of the electronic device 200.

Hereinafter, examples of electronic components 540 according to various embodiments are described.

According to various embodiments, the electronic components 540 are devices included in the electronic device 200 and may be devices driven by receiving power (or current, or voltage). For example, as illustrated in FIG. 5, the electronic components 540 may include a display 203 and a communication circuit 543. However, without being limited to those described and/or shown, the electronic components 540 may further include the components of the electronic device 200 described in connection with FIG. 1 and/or other components (e.g., a sensor) not classified as the electronic components 540. Further, although the electronic components 540 are shown as separate devices from the moving device 510, the electronic components 540 may be a concept including the moving device 510. As is described below, the processor 550 may control to provide power from the battery 530 to each of the electronic components 540 using a charging circuit (not shown) (e.g., a charger). The processor 550 may manage the power to be provided to the motor and each electronic component 540 and may identify the magnitude of power to be provided to each electronic component 540 based on the management.

According to various embodiments, the electronic components 540 may be classified into predetermined groups for power management. For example, as illustrated in FIG. 5, the electronic components 540 may include a first group including the display 203, which consumes the largest amount of power, and a second group including the remaining electronic components 540 (e.g., the communication circuit 543) other than the display 203. However, without being limited to those described and/or shown, the electronic components 540 may be classified into various groups. According to an embodiment, the processor 550 may control power per group (e.g., the first group and the second group) as at least part of the operation of controlling (or driving) the power (e.g., terminal driving power) of the electronic components 540. For example, the processor 550 may sequentially control power for each group (e.g., the first group and the second group). For example, the processor 550 may determine whether the operation of reducing the power of the display 203 classified into the first group among the plurality of groups and then reducing the power of the electronic components 540 classified into the second group (e.g., determine whether the reduced power reaches a target value) as at least part of the operation of reducing the power (e.g., terminal driving power) of the electronic components 540. The second group of electronic components 540 may be defined as a system for convenience of description. When it is determined that the operation of reducing the power of the electronic components 540 classified into the second group is required, the processor 550 may reduce the power of the electronic components 540 classified into the second group. On the other hand, without being limited to the described example, the opposite operation may be performed. In an embodiment, in the sequential control operation, per-group power control may be performed in order of priority based on per-group priorities. For example, the first group having a large power consumption may be set to have a higher priority than the second group. As another example, a group with a lower minimum driving power may be set to have a higher priority. As another example, the priority may be set based on a setting value for each device (e.g., the display 203 and the electronic components 540) set in the setting app 577, which is described below.

An example of the battery 530 is described below according to various embodiments.

According to various embodiments, the battery 530 may be charged with power to be used by the devices (e.g., the moving device 510, sensor 520, electronic components 540, and processor 550) included in the electronic device 200. The electronic device 200 (e.g., the processor 550) may detect power (or current or voltage) from the battery 530 using a detection circuit 601 as illustrated in FIG. 6 and may identify the parameter values associated with the power of the battery 530 (e.g., the current remaining amount of the battery 530 or the peak power (or peak current or peak voltage) of the battery 530) based on the detected power.

According to various embodiments, without being limited to those shown, an example of the processor 550 for using the power of the battery 530, in addition to the battery 530, is described according to various embodiments.

The processor 550 may include at least one of an application processor (AP), a central processing unit (CPU), a graphic processing unit (GPU), a display processing unit (DPU), or a neural processing unit (NPU). The operation of the processor 550 described below may be performed by the execution of the modules 570 (e.g., a movement detection module 571, a movement control module 573, and a power management module 575) stored in the memory 560. At least some of the modules 570 (e.g., the movement detection module 571, the movement control module 573, and the power management module 575) stored in the memory 560 may be implemented (e.g., executed) in software, firmware, or in a combination of at least two thereof. For example, the modules may be implemented in the form of an application, program, computer code, instructions, routines, or processes, which are executable by the processor 550. Accordingly, if the modules 570 (e.g., the movement detection module 571, the movement control module 573, and the power management module 575) are executed by the processor 550, the modules (e.g., the movement detection module 571, the movement control module 573, and the power management module 575) may enable the processor 550 to perform operations (or function that the modules may provide) associated with the modules 570. Therefore, when it is described below that a specific module performs an operation, it may be interpreted as the processor 550 performing the operation as the specific module is executed. Alternatively, the modules (e.g., the movement detection module 571, the movement control module 573, and the power management module 575) may be implemented as part of a specific application. Alternatively, without being limited to what is described and/or shown, each module may be implemented as a separate hardware device (e.g., a processor 550 or control circuit) from the processor 550. Meanwhile, at least some of the operations of the modules described below may be implemented as a separate module instead of the corresponding module. For example, some of the operations of the movement control module 573 described below may be implemented as a first module (e.g., a first program), and the rest of the operations may be implemented as a second module (e.g., a second program).

First, an example of the movement detection module 571 according to various embodiments is described below.

According to various embodiments, the movement detection module 571 may detect the state of the sliding movement (e.g., whether a sliding movement starts or ends) and the sliding distance of the display 203 (or the first structure 201 or the first plate 211*a*) based on the value obtained from the above-described at least one sensor 520. Further, the movement detection module 571 may identify a parameter associated with an area of the display 203 that is changed according to the sliding movement of the display 203. In an embodiment, the parameter may include the size of the area, exposed to the outside, of the display 203 (or a length of the area in one direction (e.g., the direction in which the display 203 is drawn in or out (e.g., the horizontal direction or X direction)). For example, the movement detection module 571 may identify the slid distance of the display 203 and may calculate the area corresponding to the identified slid distance. The movement detection module 571 may identify the size of the area, currently exposed to the outside, of the display 203 by adding the calculated area to the area before the sliding movement of the display 203. In an embodiment, the parameter may include a ratio (e.g., a screen expansion ratio) between the exposed area and the received area of the display 203. For example, the movement detection module 571 may identify the slid distance of the display 203 and compare the identified slid distance with the maximum slidable distance of the display 203 to thereby identify the ratio of the exposed area to the received area of the display 203. Further, in an embodiment, the parameter may include the current drawn-out distance (or drawn-in distance) of the display 203. For example, the movement detection module 571 may identify the drawn-out distance of the display 203 by identifying the slid distance of the display 203.

Hereinafter, an example of the movement control module 573 according to various embodiments is described.

According to various embodiments, the movement control module 573 may control the display 203 (or the first structure 201 or the first plate 211*a*) of the electronic device 200 to slide. For example, the movement control module 573 may control to drive the above-described moving device 510 (e.g., a motor) so that the roller 251 rotates in one direction to slide the display 203. For example, if the movement control module 573 rotates the roller 251 in a first direction (e.g., counterclockwise), the display 203 may slide out and, if the movement control module 573 rotates the roller 251 in a second direction (e.g., clockwise), the display 203 may slide in. If the movement control module 573 rotates the roller 251 in the first direction and then in the second direction, the display 203 may slide out and then slide in. According to the control of the movement control module 573, the distance at which the display 203 slides (e.g., slide-out or slide-in) may be limited (e.g., about 40 mm) For example, the maximum slide-out distance is the maximum distance at which the first structure 201 is exposed from the state in which the first structure 201 is received in the second structure 202 through the second structure 202 and may be determined by at least one of the width of the first structure 201 or the width of the second structure 202. As another example, the maximum slide-in distance is the maximum distance at which the first structure 201 is received from the state in which the first structure 201 is maximally exposed to the outside into the second structure 202 through the second structure 202 and may be determined by at least one of the width of the first structure 201 or the second structure 202. For example, as at least one of the width of the first structure 201 or the width of the second structure 202 increases, upon sliding movement of the first structure 201 (e.g., slide-out movement or slide-in), the first structure 201 may slide longer while being guided (or supported) on the inner lower surface of the second structure 202.

According to various embodiments, the movement control module 573 may control the display 203 to slide based on occurrence of a designated event. For example, the designated event may include identification of the execution and/or operation of the designated app and a user input (e.g., identification of selection of an icon or pressing of a physical key) for triggering a sliding movement of the flexible display 203.

According to various embodiments, the movement control module 573 may control the display 203 (or the first structure 201 or the first plate 111*a*) to slide (e.g., slide-out or slide-in) at a designated speed. For example, the movement control module 573 may control the moving device 510 (e.g., a motor) to move the display 203 at a speed (e.g., 40 mm/sec) for moving to the maximum distance (e.g., 40 mm) for a preset time (e.g., 1 sec). The speed is not limited thereto but may be set, reset, and/or changed to various values. As another example, the movement control module 573 may control the display 203 to slide at a speed determined based on various pieces of information (e.g., external illuminance). For example, the movement control module 573 may control the display 203 to move at a lower speed as the external illuminance decreases.

According to various embodiments, the movement control module 573 may provide a specific signal to the moving device 510 (e.g., a motor) for driving the motor. For example, the movement control module 573 may provide a pulse-width modulation (PWM) signal. In this case, the movement control module 573 may control the rotation speed of the motor by controlling the characteristics (e.g., frequency and/or magnitude) of the PWM signal provided to the moving device 510 (e.g., a motor). For example, the rotation speed of the motor may be proportional to the frequency and magnitude of the PWM signal. Referring to FIG. 6, the movement control module 573 may receive information for the magnitude of the power (e.g., peak power (or peak current or peak voltage) providable from the battery) for controlling (or driving) the motor, received from the power management module 575. The movement control module 573 may provide the moving device 510 (e.g., a motor) with a PWM signal having characteristics (e.g., frequency and/or magnitude) corresponding to the magnitude of the power through a moving device driver (e.g., a motor driver). For example, the movement control module 573 may provide a PWM signal having a high frequency and/or a high magnitude to the moving device 510 (e.g., a motor) in proportion to the power.

Hereinafter, an example of the power management module 575 according to various embodiments is described.

According to various embodiments, the power management module 575 may manage the power of the electronic device 200. For example, the power management module 575 may control to allow the power output from the battery 530 to be lower than a previously defined peak power.

According to various embodiments, when a sliding movement event occurs, the power management module 575 may manage the power to control (or drive) devices associated with the sliding movement, included in the electronic device 200 (e.g., the display 203, the moving device 510 (e.g., a motor), or a communication circuit 543). When the moving device 510 (e.g., a motor) of the electronic device 200 is controlled for sliding movement of the first structure 201 (or the first plate 211*a*), the power for currently controlling (or driving) other electronic components 540 (e.g., the display 203 or the communication circuit 543) may be insufficient due to the magnitude of the power (e.g., peak power) (or current or voltage) instantaneously provided to the moving device 510 or, due to insufficiency of the peak power providable from the battery 530, the electronic device 200 may be turned off (e.g., power-off). For example, if the power (e.g., peak power) (or current or voltage) outputable from the battery 530 corresponding to the remaining power of the battery 530 is predefined, and power higher than the defined power is output from the battery 530, the supplying voltage of the battery 530 becomes lower than an under-voltage lockout (UVLO) level so that the electronic device 200 may abruptly power off The peak power (or peak voltage or peak current) may mean the power (or voltage or current) currently providable instantaneously (or for a specific short time) from the battery 530. Therefore, as illustrated in FIG. 6, the power management module 575 may identify first power of the battery 530 (e.g., the power (or current or voltage) currently providable instantaneously from the battery 530) and may identify second power for controlling (or driving) electronic components 540 (e.g., the display 203 and the communication circuit 543) and third power for controlling (or driving) the moving device 510 (e.g., a motor) based on the identified power of the battery 530. In an embodiment, the power management module 575 may identify the power (or voltage or current) output from the battery 530 using a detection circuit 601 and may identify the remaining power of the battery 530 corresponding to the identified power (or voltage or current) and the peak power (or peak voltage or peak current) providable (or output) from the battery 530. For example, the electronic device 200 may previously store information for the information for the remaining power of the battery 530 and/or the peak power corresponding to the electrical characteristics (e.g., power, voltage, or current) identified from the battery 530. The power management module 575 may obtain the information for the remaining power of the battery 530 and/or the information for the peak power by referring to information pre-stored in the memory 560.

According to various embodiments, the power management module 575 may identify the second power of the electronic components and the third power of the moving device 510 based on the identified first power (e.g., peak power) of the battery 530. In an embodiment, the power management module 575 may adjust the second power and the third power based on parameters (e.g., temperature, remaining power of the battery 530, and the motor available ratio and motor power ratio described below) for adjusting the power of the electronic components and/or the moving device 510. In this case, the power management module 575 may adjust the adjusted second power and third power to be lower than the first power. In another embodiment, the power management module 575 may adjust the second power and the third power based on a mode associated with the power of the electronic device 200 selected through the setting app 577. Examples of the operation of adjusting the second power and the third power of the power management module 575 are described below.

An example of an operation of an electronic device 200 is described below according to various embodiments.

According to various embodiments, the electronic device 200 (e.g., the processor 550) may identify power for controlling (or driving) each device (or each component) associated with sliding movement (e.g., the display 203, the communication circuit 543, or the moving device 510 (e.g., a motor)) based on the power (e.g., peak power) of the battery 530. For example, the electronic device 200 (e.g., the processor 550) may identify second power (e.g., component power 820) for controlling (or driving) the electronic components 540 (e.g., the display 203 or the communication circuit 543) and third power (e.g., motor power 810) for controlling (or driving) the moving device 510 (e.g., a motor) based on the power (e.g., peak power) of the battery 530.

Figure 7:
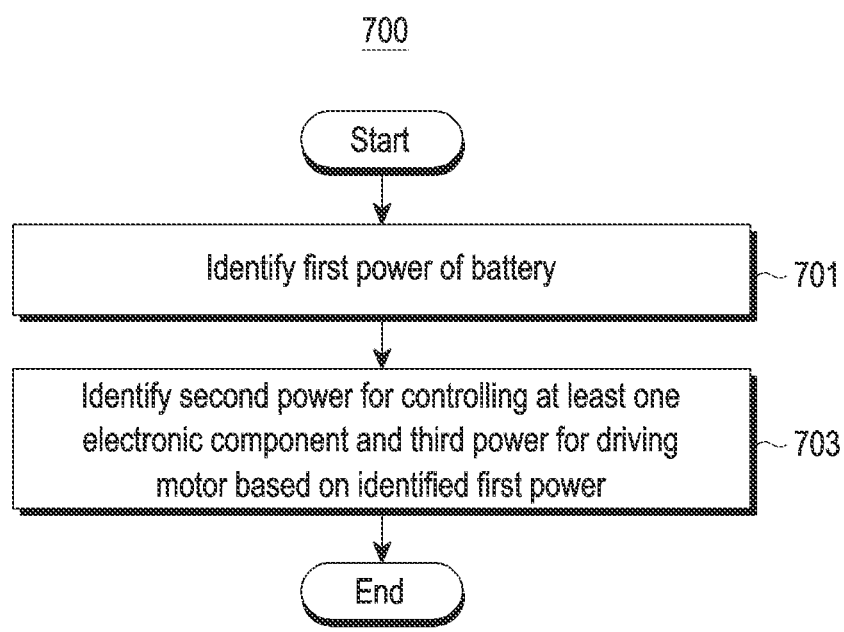
FIG. 7 is a flowchart illustrating an example of an operation of an electronic device according to various embodiments of the disclosure.

FIG. 7 is a flowchart 700 illustrating an example of an operation of an electronic device 200 according to various embodiments of the disclosure. According to various embodiments, the operations shown in flowchart 700 of FIG. 7 are not limited to the shown order but may rather be performed in other various orders. According to various embodiments, more or less operations than those of FIG. 7 may be performed. FIG. 7 is described below with reference to FIG. 8.

Figure 8:
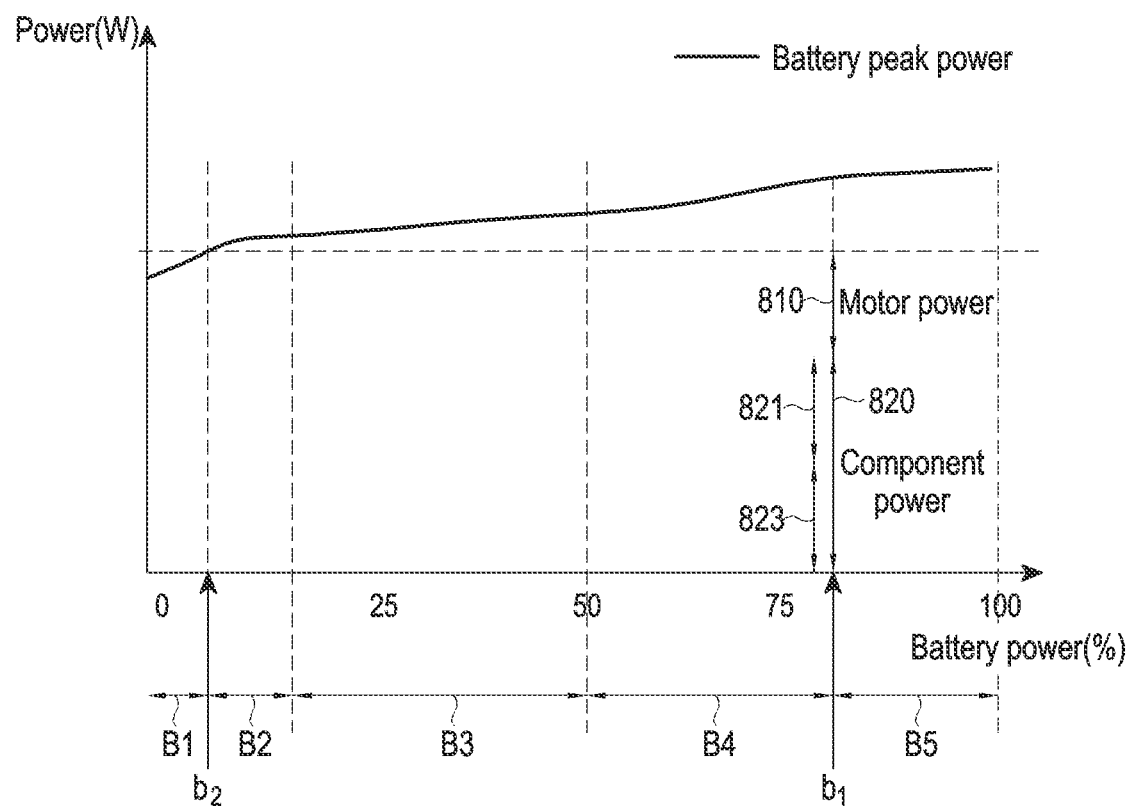
FIG. 8 is a view illustrating an operation for identifying power for controlling electronic components (e.g., a display or a communication circuit) and a moving device (e.g., a motor) based on the power of a battery of an electronic device according to various embodiments of the disclosure.

FIG. 8 is a view illustrating an operation for identifying power for controlling electronic components 540 (e.g., the display 203 or the communication circuit 543) and a moving device 510 (e.g., a motor) based on the power of a battery 530 of an electronic device 200 according to various embodiments of the disclosure.

According to various embodiments, the electronic device 200 (e.g., the processor 550) may identify first power of the battery 530 in operation 701. For example, as described above in connection with FIG. 6, the electronic device 200 (e.g., the power management module 575) may identify the power (or voltage or current) of the battery 530 using the detection circuit 601 and identify the peak power of the battery 530 corresponding to the identified power (or voltage or current) of the battery 530 and pre-stored information. As described above, the peak power is power that may be provided (or output) from the battery 530 at the current time (or at the current battery level b1) (or for a specific short time). If higher power than the defined peak power is output from the battery 530, the electronic device 200 may power off For example, as described in Table 1 below, information for the peak power may be stored for each section (B1, B2, B3, B4, and B5) of the remaining power of the battery 530. Based on the trend in which the peak power of the battery 530 is proportional to the remaining power of the battery 530 (or the power (or voltage or current) of the battery 530), as the section of the remaining power of the battery 530 (or the power (or voltage or current) of the battery 530) has a higher value, information for higher peak power may be included.

TABLE 1

| Remaining battery power | Battery voltage | Peak power | Peak current |
|---|---|---|---|
| 50 to 100 | 4 V | 28.2 W | 7.05 A |
| 15 to 50 | 3.6 V | 26 W | 7.22 A |
| 5 to 15 | 3.4 V | 24 W | 7.05 A |
| less than 5 | 3.2 V | 18 W | 5.62 A |

The electronic device 200 (e.g., the power management module 575) may identify the peak power of the battery 530 corresponding to the section including the remaining power of the battery 530 corresponding to the power of the battery 530 based on comparison between information stored in the memory and the identified power (or voltage or current) of the battery 530. For example, if a first voltage is currently identified from the battery 530 using the detection circuit 601, the electronic device 200 (e.g., the power management module 575) may identify the peak power corresponding to the first voltage based on comparison between the information and the currently identified first voltage. Or as an example, the electronic device 200 (e.g., the power management module 575) may identify the remaining power section (or the remaining power of the battery 530) of the battery 530 corresponding to the first voltage and identify the peak power corresponding to the identified remaining power section. Meanwhile, without being limited to what has been described, rather than the remaining power sections of the battery 530, information for the peak power as illustrated in FIG. 8 may be stored per remaining power of the battery 530. According to various embodiments, in operation 703, the electronic device 200 (e.g., the processor 550) may identify the second power (e.g., component power 820) for controlling the electronic component and the third power (e.g., motor power 810) for driving the motor based on the identified first power. For example, as illustrated in FIG. 8, the electronic device 200 (e.g., the power management module 575) may control (or set) the second power (e.g., the component power 820) and the third power (e.g., the motor power 810) so that the sum of the second power (e.g., the component power 820) for controlling (or driving) the electronic components 540 and the third power (e.g., the motor power 810) for controlling (or driving) the moving device 510 (e.g., a motor) at the current time is lower than the peak power (e.g., the first power) of the battery 530. The second power may include power 821 for controlling the display 203 and power 823 for controlling other components (e.g., the communication circuit 543). Thus, the electronic device 200 (e.g., the power management module 575) may prevent the electronic device 200 from powering off at the current time. In this case, as at least part of the operation of controlling (or setting) the second power (e.g., the component power 820) and the third power (e.g., the motor power 810), the electronic device 200 (e.g., the power management module 575) may control (or set) the second power (e.g., the component power 820) and the third power (e.g., the motor power 810) so that the second power (e.g., the component power 820) is larger than the minimum power for controlling (or driving) the electronic components 540 (or not less than the minimum power), and the third power (e.g., the motor power 810) is larger than the minimum power for controlling (or driving) the moving device 510 (e.g., a motor) (or not less than the minimum power). According to various embodiments, the electronic device 200 (e.g., the power management module 575) may adjust the second power (e.g., the component power 820) and/or the third power (e.g., the motor power 810), thereby dynamically adjusting the sum of the second power (e.g., the component power 820) and the third power (e.g., the motor power 810). For example, the electronic device 200 may adjust (or set) the sum of the second power (e.g., the component power 820) and the third power (e.g., the motor power 810) to decrease by adjusting the second power (e.g., the component power 820) and/or the third power (e.g., the motor power 810) based on various parameters (e.g., temperature or remaining power of the battery 530) described below. Thus, it may be further reduced from the remaining power b2 of the battery 530 where power-off may occur. In this case, as at least part of the operation of adjusting (or setting) the second power (e.g., the component power 820) and/or the third power (e.g., the motor power 810), the electronic device 200 may control (or adjust or set) the degree of adjusting the second power (e.g., the component power 820) and the degree of adjusting the third power (e.g., the motor power 810) according to the power mode set through the setting app. An example of an operation for adjusting (or setting) the second power (e.g., the component power 820) and the third power (e.g., the motor power 810) by the electronic device 200 (e.g., the power management module 575) is described below in detail.

According to various embodiments, referring to FIG. 8, the electronic device 200 (e.g., the processor 550) may previously store information for the remaining power b2 (e.g., 5%) of the battery, where power-off occurs and control the sliding movement based on comparison between the current remaining battery power and the remaining power (e.g., 5%) of the battery where power-off occurs. For example, if the remaining power of the battery 530 is smaller than a designated value (e.g., 5%) where power-off occurs, the electronic device 200 (e.g., the processor 550) may provide notification content indicating low power (e.g., display a notification on the display 203, output a notification sound through a speaker, or output a light indication through a light generator (e.g., a light emitting diode (LED))) and, after the display operation, refrain from the operation of transferring power from the battery 530 to the electronic components 540 (e.g., the display 203 or the communication circuit 543). Thereafter, the electronic device 200 (e.g., the movement detection module 571) may provide the motor with a signal corresponding to the peak power corresponding to the current remaining power of the battery 530, automatically moving the flexible display 203. For example, if the electronic device 200 is in the open state, the electronic device 200 may automatically control the motor so that the flexible display 203 is drawn in. In this case, the peak power of the battery 530 at the designated remaining power of the battery 530 may be higher than the minimum power for driving the moving device 510 (e.g., a motor). As another example, if the remaining power of the battery 530 is larger than the designated value (e.g., 5%), the electronic device 200 may identify the third power (e.g., the motor power) for driving the motor based on the first power (e.g., peak power) of the battery 530 and the second power (e.g., the component power) of the electronic components 540 as described above and drive the motor with the signal corresponding to the third power.

An example of an operation of an electronic device 200 is described below according to various embodiments.

According to various embodiments, the electronic device 200 (e.g., the processor 550) may identify the third power for controlling the moving device 510 (e.g., a motor) based on the first power (e.g., peak power) of the battery 530 and the second power for controlling (or driving) the electronic components 540.

Figure 9:
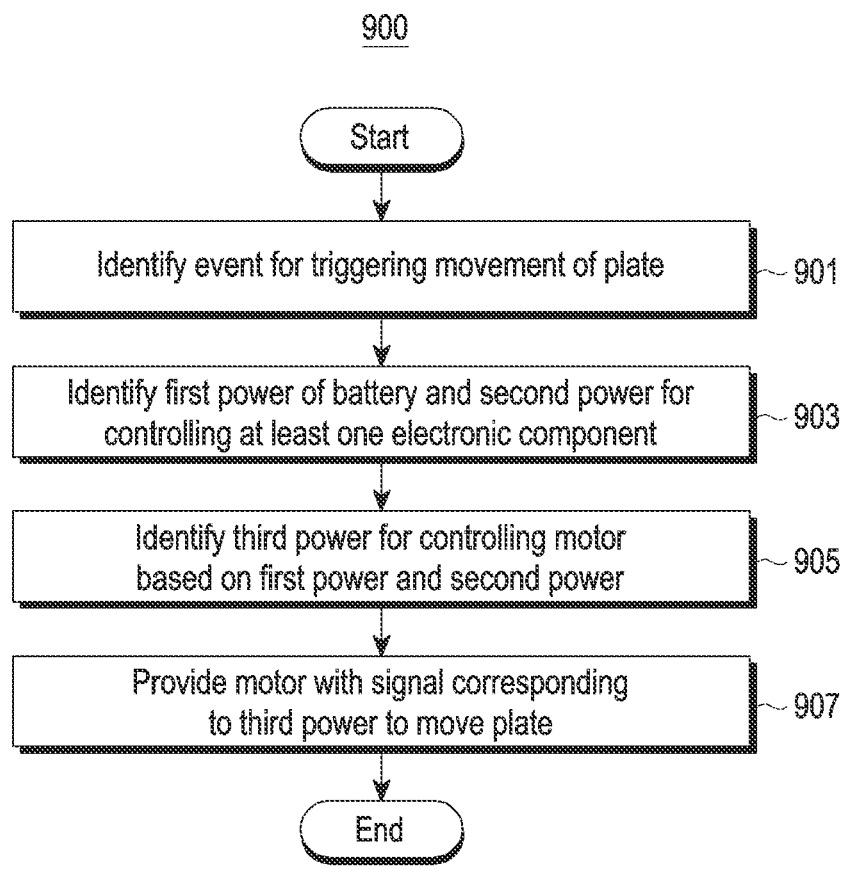
FIG. 9 is a flowchart illustrating an example of an operation of an electronic device according to various embodiments of the disclosure.

FIG. 9 is a flowchart 900 illustrating an example of an operation of an electronic device 200 according to various embodiments of the disclosure. According to various embodiments, the operations shown in flowchart 900 of FIG. 9 are not limited to the shown order but may rather be performed in other various orders. According to various embodiments, more or less operations than those of FIG. 9 may be performed. FIG. 9 is described below with reference to FIG. 10.

Figure 10:
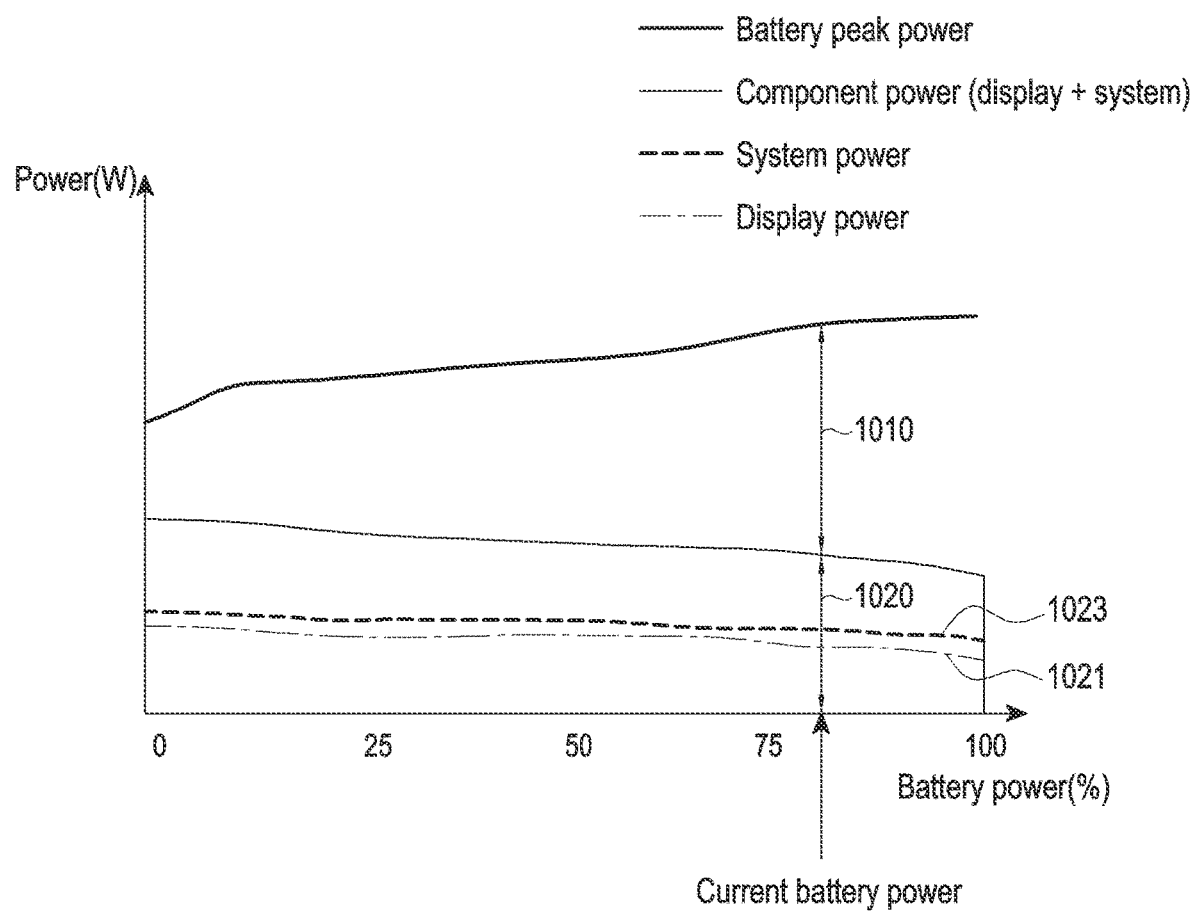
FIG. 10 is a view illustrating an example of an operation for identifying third power for controlling a moving device (e.g., a motor) based on second power for controlling (or driving) electronic components and first power (e.g., peak power) of a battery of an electronic device according to various embodiments of the disclosure.

FIG. 10 is a view illustrating an example of an operation for identifying third power for controlling a moving device 510 (e.g., a motor) based on second power for controlling (or driving) electronic components 540 and first power (e.g., the peak power of the battery 530) of a battery 530 of an electronic device 200 according to various embodiments of the disclosure.

According to various embodiments, the electronic device 200 (e.g., the processor 550) may identify an event for triggering a movement of a plate in operation 901. In an embodiment, the electronic device 200 (e.g., the movement detection module 571) may identify an occurrence of an event set to trigger a sliding movement of the display 203 (or the first structure 201 or the first plate 211a). The designated event may include identifying execution and/or operation of an app designated to trigger a sliding movement of the display 203 (or the first structure 201 or the first plate 211a) and a user input (e.g., identifying a selection of an icon or pressing of a physical key) for triggering a sliding movement of the display 203. Based on identifying the occurrence of the designated event, the electronic device 200 may control the moving device 510 (e.g., a motor) to rotate the roller 251 to thereby move the first structure 201.

According to various embodiments, in operation 903, the electronic device 200 (e.g., the processor 550) may identify the first power of the battery 530 and second power (e.g., the component power 1020) for controlling at least one electronic component. For example, based on the occurrence of the event set to trigger a sliding movement of the display 203 (or the first structure 201 or the first plate 211a), the electronic device 200 (e.g., the power management module 575) may identify the electrical characteristics (e.g., power, voltage, and/or current) of the battery 530 using the detection circuit 601 and identify the first power (e.g., peak power) of the battery 530 corresponding to the identified electrical characteristics. The operation of identifying the first power by the electronic device 200 may be performed like the above-described operation 701 of the electronic device 200, and thus, no duplicate description is given below. As another example, based on the occurrence of the event, the electronic device 200 may identify the second power (e.g., the component power 1020) for controlling (or driving) at least one electronic component 540 (e.g., the display 203 or the communication circuit 543) except for the moving device 510 (e.g., a motor) of the electronic device 200. For example, based on the occurrence of the event (or at the time of occurrence of the event), the electronic device 200 may detect (or identify) the power provided (or transferred) from the battery 530 to each electronic component 540 through a charger (not shown) (e.g., the power transferred to the display 203 (e.g., display power 1021)) and the power transferred to the other electronic components (e.g., system power 1023), using the detection circuit 601 connected to the battery 530. As another example, based on the occurrence of the event (or at the time of occurrence of the event), the electronic device 200 may detect (or identify) the power provided (or transferred) to the electronic components 540 (e.g., the power transferred to the display 203 (e.g., the display power 1021)) and the power transferred to the other electronic components (e.g., the system power 1023). In an embodiment, the electronic device 200 may identify the power for controlling the current power (or voltage or current) of the battery 530 or the power for controlling a different electronic component 540 per current remaining power of the battery 530. For example, as illustrated in FIG. 8, the electronic device 200 may identify the second power (e.g., the component power 1020) for controlling the electronic component in proportion to the power (or voltage or current) of the battery 530 or the remaining power of the battery 530. As an example, the electronic device 200 (e.g., the processor 550) may reduce the power for controlling each electronic component 540 as the power (or voltage or current) of the battery 530 or the remaining power of the battery 530 reduces. Thus, as the current power (or voltage or current) of the battery 530 or remaining power of the battery 530 increases, the electronic device 200 may identify the second power (e.g., the component power 1020) of a higher magnitude for controlling (or driving) the electronic components 540. However, without being limited thereto, the power for controlling (or driving) each electronic component 540 may be constant irrespective of the power or remaining power of the battery 530.

According to various embodiments, in operation 905, the electronic device 200 (e.g., the processor 550) may identify the third power (e.g., the motor power 1010) for controlling the moving device 510 (e.g., a motor) based on the first power and the second power (e.g., the component power 1020). In an embodiment, as illustrated in FIG. 10, the electronic device 200 (e.g., the power management module 575) may identify the third power (e.g., the motor power 1010) for controlling (or driving) the motor within the remaining power except for the second power (e.g., the component power 1020) for controlling (or driving) the electronic components 540 from the first power (e.g., peak power) of the battery 530. For example, the third power may be a power equal to or less than a difference between the first power (e.g., peak power) and the second power. In the case, as at least part of the operation of identifying the third power (e.g., the motor power 1010), the electronic device 200 may identify the third power (e.g., the motor power 1010) higher than the minimum power for controlling (or driving) the motor. According to an embodiment, the electronic device 200 (e.g., the power management module 575) may identify a first parameter (e.g., the motor power available ratio described below) based on the remaining power and identify the third power (e.g., the motor power 1010) based on the value of the identified first parameter and a preset second parameter (e.g., the motor power ratio). The operation of identifying the third power (e.g., the motor power 1010) by the electronic device 200 based on parameters (e.g., the first and second parameters) is described below with reference to the flowchart 1100 of FIG. 11.

According to various embodiments, in operation 907, the electronic device 200 (e.g., the processor 550) may provide the motor with a signal corresponding to the third power (e.g., the motor power 1010) to move the plate. For example, the electronic device 200 (e.g., the movement control module 573) may provide the moving device 510 (e.g., a motor) with a signal (e.g., a PWM signal) having the characteristics (e.g., frequency or magnitude) corresponding to the identified third power (e.g., the motor power 1010). The motor may rotate at the rotation speed corresponding to the signal characteristics (e.g., frequency or magnitude) and, based on the rotation, the first structure 201 may move. As the first structure 201 moves, at least a portion of the area (e.g., the second area A2 of FIG. 2B) received inside the electronic device 200 may be exposed to the outside.

An example of an operation of an electronic device 200 is described below according to various embodiments. Since at least some of the above-described operations of the electronic device 200 (e.g., the operations of the flowchart 900 of FIG. 9) may be performed in combination with the operations described below, and thus, no duplicate description is presented.

According to various embodiments, the electronic device 200 (e.g., the processor 550) may identify the first parameter (hereinafter, motor power available ratio (MPAr)) associated with the power capable of controlling (or driving) the moving device 510 (e.g., a motor) based on the first power (e.g., peak power) of the battery 530 and the second power (e.g., the component power) for controlling (or driving) the electronic components 540. The electronic device 200 may identify a preset second parameter (hereinafter, motor power ratio (MPr)) corresponding to the remaining power of the battery 530 and/or the current power (or voltage or current) of the battery 530 and identify the third power (e.g., the motor power) for driving the motor based on the first parameter and the second parameter.

Figure 11:
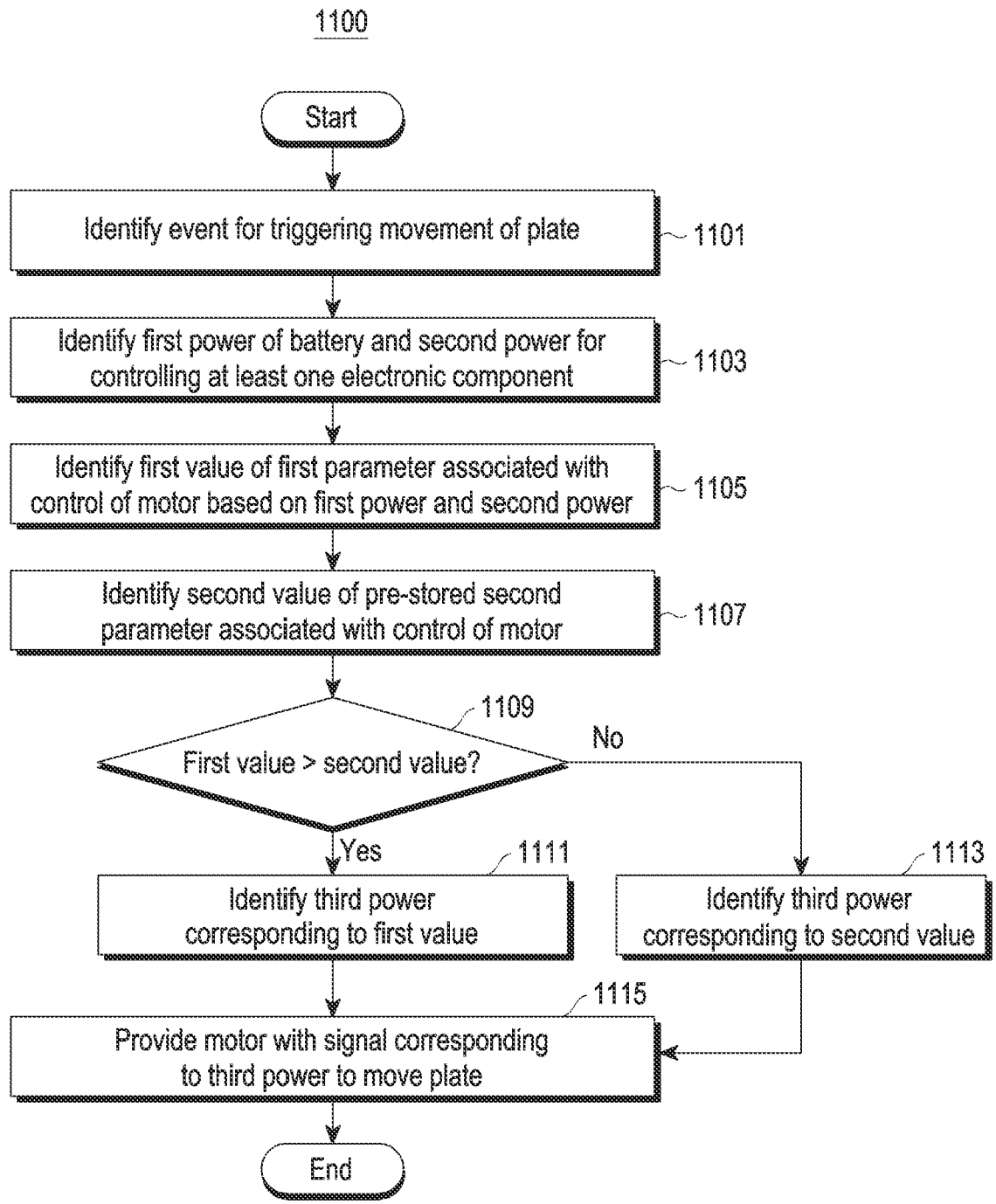
FIG. 11 is a flowchart illustrating an example of an operation of an electronic device according to various embodiments of the disclosure.

FIG. 11 is a flowchart 1100 illustrating an example of an operation of an electronic device 200 according to various embodiments of the disclosure. According to various embodiments, the operations shown in flowchart 1100 of FIG. 11 are not limited to the shown order but may rather be performed in other various orders. According to various embodiments, more or less operations than those of FIG. 11 may be performed.

According to various embodiments, the electronic device 200 may identify an event for triggering a movement of a plate in operation 1101. For example, the electronic device 200 (e.g., the movement detection module 571) may identify an occurrence of an event set to trigger a sliding movement of the display 203 (or the first structure 201 or the first plate 211a). Operation 1201 of the electronic device 200 may be performed like operation 901 of the electronic device 200 as described above, and no duplicate description thereof is given below.

According to various embodiments, in operation 1103, the electronic device 200 may identify the first power of the battery 530 and the second power (e.g., the component power) for controlling at least one electronic component and, in operation 1105, identify a first value of a first parameter (e.g., the motor power available ratio) associated with the control of the motor based on the first power and the second power (e.g., the component power). For example, as described above, the electronic device 200 may identify the first power (e.g., peak power) of the battery 530 corresponding to the value (e.g., the power of the battery 530 or the remaining power of the battery 530) identified using the detection circuit 601 and may identify the second power (e.g., the component power) provided to the electronic components 540 (e.g., the display 203 or communication circuit 543) (or for controlling the electronic components 540 at the time of occurrence of an event). The electronic device 200 may identify the first parameter associated with controlling (or driving) the motor based on the first power and the second power (e.g., the component power). The first parameter may be a parameter associated with the power capable of controlling (or driving) the moving device 510 (e.g., a motor) and may denote a ratio of the maximum power for controlling (or driving) the moving device 510 (e.g., a motor) to the power capable of controlling (or driving) the motor in the current state. For example, it may represent that as the first parameter increases, the amount of the power available for currently controlling (or driving) the motor by the electronic device 200 increases. As an example, the electronic device 200 may identify the value of the motor power available ratio based on a preset motor driving power and a difference between the first power and the second power (e.g., the component power) as shown in Equation 1 below.

$$\text{Motor power available ratio} = \frac{\text{First power} - \text{Second power (e.g., component power)}}{\text{Preset motor driving power}} \quad \text{Equation 1}$$

In Equation 1, first power may denote the peak power of the battery 530, and second power (e.g., the component power) may denote the power for controlling (or driving) other electronic components 540 (e.g., the display 203 or communication circuit 543) than the moving device 510 (e.g., a motor). The preset motor driving power may be present maximum power for driving the moving device 510 (e.g., a motor). For example, the preset motor driving power may be preset power for controlling (or driving) the moving device 510 (e.g., a motor) in the fully charged state of the battery 530 (e.g., in the state in which the remaining power of the battery 530 is maximum). Alternatively, without being limited thereto, the preset motor driving power may be power lower the maximum power.

According to various embodiments, the electronic device 200 may identify a pre-stored second value of second parameter associated with the control of the motor in operation 1107. For example, the electronic device 200 may identify a preset second value of the second parameter associated with controlling (or driving) the moving device 510 (e.g., a motor). The second parameter may be a parameter (e.g., the motor power ratio) associated with the power for controlling (or driving) the moving device 510 and may denote a ratio of the power for controlling (or driving) the moving device 510 (e.g., a motor) to the preset power. As another example, the electronic device 200 may identify the motor driving power corresponding to the remaining power of the battery 530 as shown in Equation 2 below and identify the ratio of the identified motor driving power to the preset motor driving power.

$$\text{Motor power ratio} = \frac{\text{Motor driving power corresponding to remaining battery power}}{\text{Preset motor driving power}} \quad \text{Equation 2}$$

According to various embodiments, in operation 1109, the electronic device 200 may determine (or compare) whether the first value of the first parameter is larger than the second value of the second parameter. If the first value of the first parameter is not larger (or smaller), the electronic device 200 may identify the third power (e.g., the motor power) corresponding to the first value in operation 1111 and, if the first value of the first parameter is larger (or if the second value of the second parameter is smaller), the electronic device 200 may identify the third power (e.g., the motor power) corresponding to the second value in operation 1113. For example, the electronic device 200 may compare the first value of the first parameter (e.g., the motor power available ratio) with the second value of the second parameter (e.g., the motor power ratio). The electronic device 200 may identify the smaller of the first value and the second value and multiply the identified value by a preset motor driving power (e.g., the maximum motor driving power) to thereby identify the third power (e.g., the motor power) for currently controlling (or driving) the moving device 510 (e.g., a motor). As an example, if the first value of the first parameter (e.g., the motor power available ratio) is smaller, the electronic device 200 may reflect (or multiply) the present motor driving power to the first value to thereby identify the third power (e.g., the motor power). Thus, in the state in which the power available for controlling (or driving) the motor is relatively insufficient, the electronic device 200 may refrain from the operation of driving the motor with a preset motor power (e.g., driving the motor with the third power (e.g., the motor power) corresponding to the motor power available ratio) and control the motor with the available power, preventing the electronic device 200 from powering off As another example, if the second value of the second parameter (e.g., the motor power ratio) is smaller, the electronic device 200 may reflect (or multiply) the preset motor driving power to the second value, identifying the third power (e.g., the motor power). Thus, in the state in which the power available for controlling (or driving) the motor is relatively sufficient, the electronic device 200 may perform the operation of driving the motor with the preset motor power, allowing the display 203 (or the first structure 201 or the first plate 211a) to smoothly move.

According to various embodiments, the first value of the first parameter and the second value of the second parameter may be larger than a value corresponding to the minimum power for driving the motor (hereinafter, 'motor power ratio minimum'). If one of the first value or the second value is smaller than the value corresponding to the minimum power, the second power (e.g., the component power) for controlling the electronic components 540 may be adjusted, which is described below with reference to FIGS. 17, 18A, and 18B.

According to various embodiments, in operation 1115, the electronic device 200 may provide the motor with a signal corresponding to the third power (e.g., the motor power) to move the plate. For example, the electronic device 200 may provide the moving device 510 (e.g., a motor) with a signal (e.g., a PWM signal) having the characteristics (e.g., frequency or magnitude) corresponding to the third power (e.g., the motor power).

Meanwhile, according to various embodiments, the electronic device 200 may identify the motor power and the motor power available at the time of occurrence of an event instead of the operation of calculating the parameters (e.g., the motor power available ratio and the motor power ratio). For example, the electronic device 200 may identify the difference between the first power of the battery 530 and the second power (e.g., the component power) for controlling (or driving) the electronic components 540 as the motor power available and may identify a preset motor power that is lower than a preset maximum motor power for controlling the motor to the maximum. Thus, as described above, the electronic device 200 may control the moving device 510 (e.g., a motor) with the lower value of the motor power available and the motor power. As described below, the motor power ratio MPr may be appreciated as the motor power MP, the motor power available ratio MPAr may be appreciated as the motor power available MPA, and the motor power ratio minimum Mprmin may be appreciated as the motor power minimum Mpmin which is the minimum power for controlling the motor.

Meanwhile, according to various embodiments, the electronic device 200 may identify other parameters associated with controlling (or driving) the motor instead of parameters (e.g., the motor power available ratio and the motor power ratio) associated with the power for controlling (or driving) the motor. For example, the electronic device 200 may identify the parameters (e.g., the motor speed available ratio and the motor speed ratio) associated with the rotation speed of the motor and identify the power corresponding to the identified parameters. As an example, the motor speed available ratio may denote the ratio between the maximum rotation speed and the currently rotatable speed, and the motor speed ratio may denote the ratio between the maximum rotation speed and a preset rotation speed.

An example of an operation of an electronic device 200 is described below according to various embodiments. Since at least some of the above-described operations of the electronic device 200 (e.g., the operations of the flowchart 900 of FIG. 9 and the operations of the flowchart 1100 of FIG. 11) may be performed in combination with the operations described below, and thus, no duplicate description is presented.

According to various embodiments, the electronic device 200 (e.g., the processor 550) may identify power for controlling (or driving) the motor and transfer a signal corresponding to the identified power to the motor to thereby control the motor. While controlling the motor (or while the display 203 slides), the electronic device 200 may maintain the power for controlling (or driving) the other electronic components 540 (e.g., the display 203 or communication circuit 543) than the motor, preventing the electronic device 200 from powering off.

Figure 12:
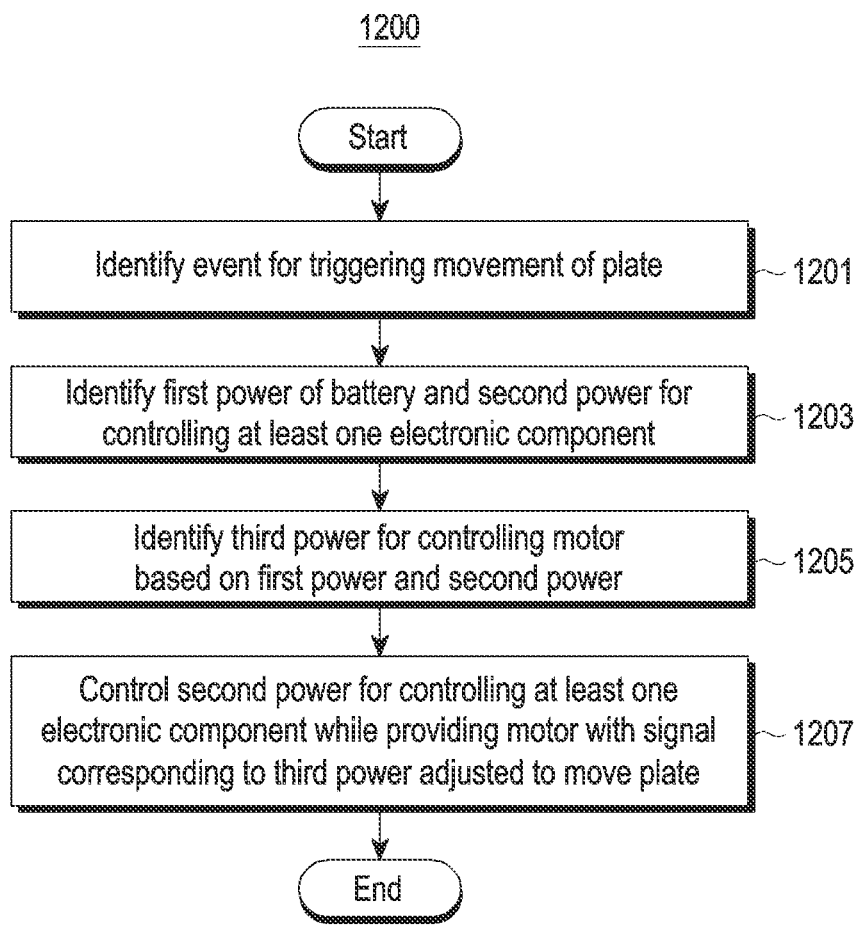
FIG. 12 is a flowchart illustrating an example of an operation of an electronic device according to various embodiments of the disclosure.

FIG. 12 is a flowchart 1200 illustrating an example of an operation of an electronic device 200 according to various embodiments of the disclosure. According to various embodiments, the operations shown in flowchart 1200 of FIG. 12 are not limited to the shown order but may rather be performed in other various orders. According to various embodiments, more or less operations than those of FIG. 12 may be performed.

Figure 13A:
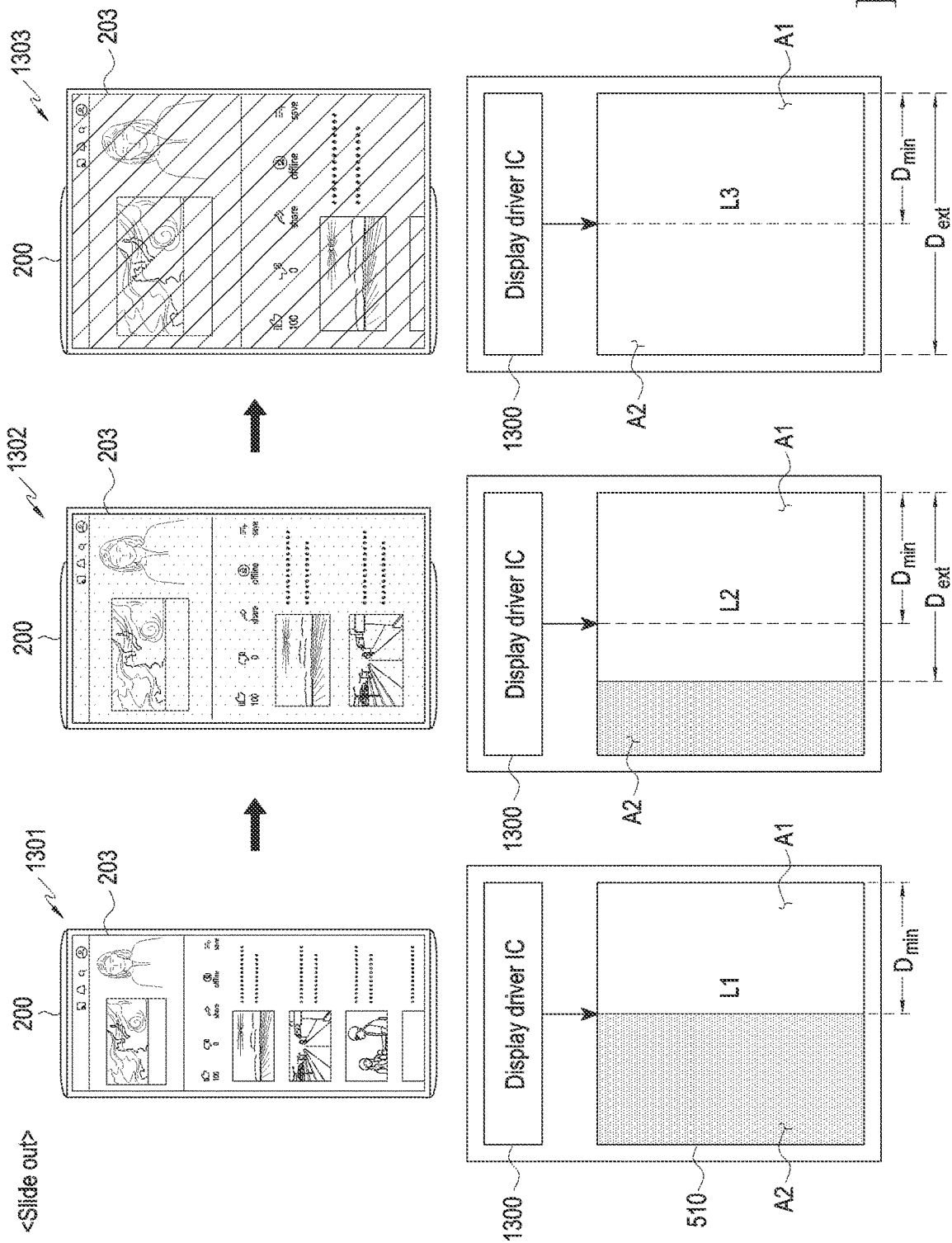
FIG. 13A is a view illustrating an example of an operation for controlling the power of a display of an electronic device while a display slides out, according to various embodiments of the disclosure.

FIG. 13A is a view illustrating an example of an operation for controlling the power of a display 203 of an electronic device 200 while the display 203 slides out, according to various embodiments of the disclosure. FIG. 13B is a view illustrating an example of an operation for controlling the power of a display 203 of an electronic device 200 while the display 203 slides in, according to various embodiments of the disclosure.

According to various embodiments, the electronic device 200 may identify an event for triggering a movement of a plate in operation 1201. For example, the electronic device 200 (e.g., the movement detection module 571) may identify an occurrence of an event set to trigger a sliding movement of the display 203 (or the first structure 201 or the first plate 211a). Operation 1201 of the electronic device 200 may be performed like operation 901 of the electronic device 200 as described above, and no duplicate description thereof is given below.

According to various embodiments, the electronic device 200 may identify the first power of the battery 530 and the second power (e.g., the component power) for controlling at least one electronic component in operation 1203 and, in operation 1205, the electronic device 200 may identify the third power (e.g., the motor power) for controlling the motor based on the first power and the second power (e.g., the component power). For example, as described above, the electronic device 200 may identify the first power (e.g., peak power) of the battery 530 corresponding to the value (e.g., the power of the battery 530 or the remaining power of the battery 530) identified using the detection circuit 601 and may identify the second power (e.g., the component power) provided to the electronic components 540 (e.g., the display 203 or communication circuit 543). In an embodiment, the electronic device 200 may identify the third power (e.g., the motor power) for controlling (or driving) the moving device 510 (e.g., a motor) within a difference between the first power and the second power (e.g., the component power). In an embodiment, the electronic device 200 may identify values of parameters (e.g., the motor power available ratio and the motor power ratio) associated with the power for controlling the moving device 510 (e.g., a motor) based on the first power and the second power (e.g., the component power) and identify the third power (e.g., the motor power) based on the identified values. Operations 1203 to 1205 of the electronic device 200 may be performed like operations 903 to 905 of the electronic device 200 and operations 1103 to 1113 of the electronic device 200 as described above, and no duplicate description thereof is given below.

According to various embodiments, in operation 1207, the electronic device 200 may control the second power (e.g., the component power) for controlling at least one electronic component while providing the motor with a signal corresponding to the third power (e.g., the motor power) adjusted to move the plate. As illustrated in FIGS. 13A and 13B, the electronic device 200 (e.g., the power management module 575) may adjust the second power (e.g., the component power) transferred to the electronic components 540 (e.g., the display 203 or communication circuit 543) while the display 203 slides, based on providing the motor with the signal (e.g., a PWM signal) corresponding to the third power (e.g., the motor power). For example, since the power for driving the display 203 is changed as the area exposed to the outside of the display 203 is changed while the display 203 slides, the electronic device 200 (e.g., the power management module 575) may adjust the power for driving the display 203.

According to various embodiments, referring to FIG. 13A, the electronic device 200 may maintain the power for driving the display 203 by reducing the value of a visual characteristic (e.g., luminance, scan rate, or brightness) associated with the power of the display 203 while the display 203 is drawn out. After the display 203 is completely drawn out, the electronic device 200 may continue to maintain the reduced value of the visual characteristic (e.g., luminance, scan rate, or brightness). As an example of an operation for adjusting the visual characteristics of the electronic device 200, examples of an operation for setting a luminance are described below.

As an example, referring to 1301, 1302, and 1303 of FIG. 13A, the electronic device 200 may identify the values (e.g., luminance Dext) of the reduced luminances L2 and L3 of the display 203 to be set in real-time, based on the values (e.g., luminance Dmin) of the luminances L1 and L2 before the display 203 is drawn out, the length (or width) Dmin before the display 203 is drawn out, and the length (or width) Dext of the display 203 drawn out at the current time as shown in Equation 3 below. The electronic device 200 may provide the second power (e.g., the component power) corresponding to the identified values of the luminances L2 and L3 to the display 203 through a display driver IC 1300. The display 203 may display content at each luminance L1, L2, and L3.

$$\text{luminance}(Dext) = \frac{D\text{min}}{Dext} \times \text{luminance}(D\text{min}) \quad \text{Equation 3}$$

As another example, the electronic device 200 may identify the value (e.g., luminance Dmax) of the reduced luminance to be set from the time when an event occurs to the time when the sliding movement is completed, based on the luminance (e.g., luminance Dmin) before the display 203 is drawn out, the length (or width) (e.g., Dmin) before the display 203 is drawn out, and the maximum length (or width) (e.g., Dmax) of the display 203 that may be drawn out, as shown in Equation 4 below. The electronic device 200 may provide the second power (e.g., the component power) corresponding to the identified luminance value to the display 203 until the sliding movement is completed. The display 203 may display content at the reduced luminance.

$$\text{luminance}(D\text{max}) = \frac{D\text{min}}{D\text{max}} \times \text{luminance}(D\text{min}) \quad \text{Equation 4}$$

According to various embodiments, if the slide-out of the display 203 is completed, the electronic device 200 may control the display 203 to display content at the luminance before change.

Meanwhile, according to various embodiments, the electronic device 200 may perform control so that the visual characteristic (e.g., luminance) value of the newly externally exposed portion of the display 203 is higher than the visual characteristic value of the other portion. In this case, the electronic device 200 may reduce the visual characteristic (e.g., luminance) of the previously exposed area (e.g., the first area A1) of the display 203. For example, the electronic device 200 may identify the luminance value (e.g., D(origin)) of the luminance of the display 203 of the externally exposed area A1, to be set in real-time, based on the luminance value(e.g., luminance Dmin) before the display 203 is drawn out, the luminance (e.g., luminance Dnew) set to the area A2 of the display 203, which is newly drawn out, the extension length Dmin before the display 203 is drawn out, and the drawn-out length (e.g., Dext) of the display 203 at the current time, as shown in Equation 5 below and provide the second power (e.g., the component power) corresponding to the identified luminance value D(origin) to the display 203. As another example, the electronic device 200 may identify the luminance value of the display 203 in the area A1 exposed to the outside of the fixed display 203 similarly to Equation 4 above, identify the luminance value to be set from the time the event is generated, and provide the second power (e.g., the component power) corresponding to the identified luminance value to the display 203.

$$\text{luminance}(Dorigin) = \\ \text{luminance}(D\text{min}) - \text{luminance}(Dnew) \times \frac{Dext}{D\text{min} - 1} \quad \text{Equation 5}$$

According to various embodiments, as illustrated in 1304, 1305, and 1306 of FIG. 13B, the electronic device 200 may maintain the value L4 of the visual characteristic (e.g., luminance) associated with the power of the display 203 while the display 203 is drawn in. When the display 203 is drawn in, although the value of the visual characteristic (e.g., luminance) is maintained, the power for controlling the display 203 may be reduced. Thus, the electronic device 200 may maintain the value of the visual characteristic (e.g., luminance) associated with the power of the display 203. Without being limited to those described, the electronic device 200 may increase the value of the visual characteristic (e.g., luminance) when the display is drawn in, increasing the visibility of the display 203. For example, similar to Equation 3, the electronic device 200 may identify the value (e.g., luminance Din) of the luminance of the display 203 to be set in real-time, based on the extension length (e.g., Dmax) before the display 203 is drawn in, the current extension length Din after the display 203 is drawn in, and the value (e.g., luminance (e.g., Dmax)) of the luminance before the display 203 is drawn in, as in Equation 6, and provide the second power (e.g., the component power) corresponding to the identified luminance value (e.g., luminance (e.g., Din)) to the display 203. Further, similar to Equation 4 described above, the display 203 may be controlled with a fixed increased luminance.

$$\text{luminance}(Din) = \frac{D\text{max}}{Din} \times \text{luminance}(D\text{max}) \quad \text{Equation 6}$$

An example of an operation of an electronic device 200 is described below according to various embodiments. Since at least some of the above-described operations of the electronic device 200 (e.g., the operations of the flowchart 900 of FIG. 9, the operations of the flowchart 1100 of FIG. 11, and the operations of the flowchart 1200 of FIG. 12) may be performed in combination with the operations described below, and thus, no duplicate description is presented.

According to various embodiments, the electronic device 200 (e.g., the processor 550) may adjust second power (e.g., component power 1520) for controlling (or driving) the electronic components 540 (e.g., the display 203 or the communication circuit 543) and third power (e.g., motor power 1510) for controlling (or driving) the moving device 510 (e.g., a motor) based on at least one parameter for power adjustment.

Figure 14:
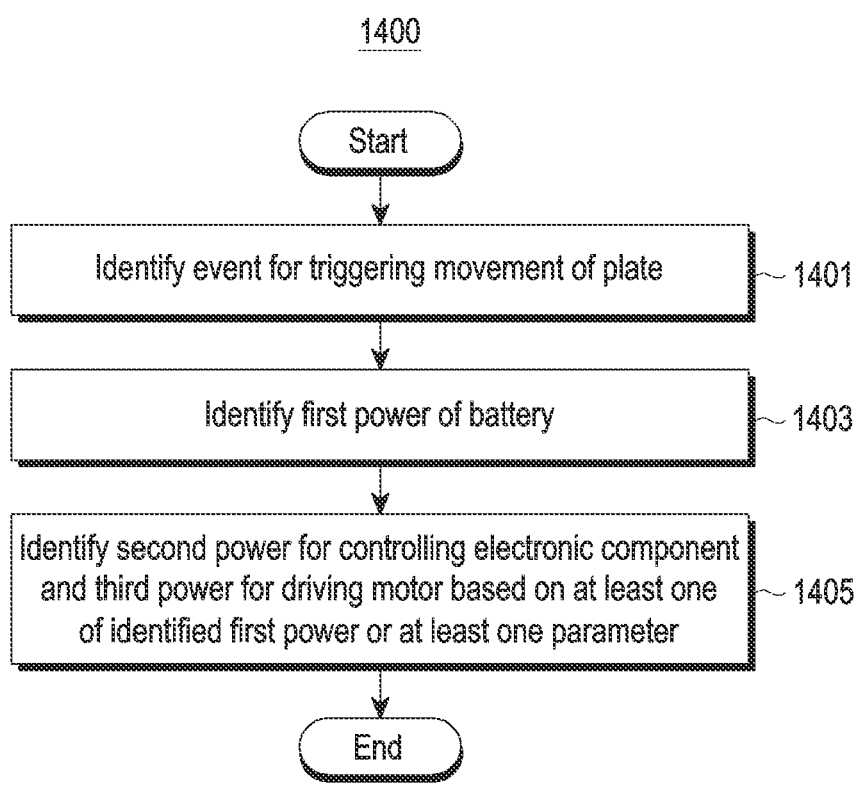
FIG. 14 is a flowchart illustrating an example of an operation of an electronic device according to various embodiments of the disclosure.

FIG. 14 is a flowchart illustrating an example of an operation of an electronic device according to an embodiment of the disclosure. According to various embodiments, the operations shown in flowchart 1400 of FIG. 14 are not limited to the shown order but may rather be performed in other various orders. According to various embodiments, more or less operations than those of FIG. 14 may be performed.

Figure 15:
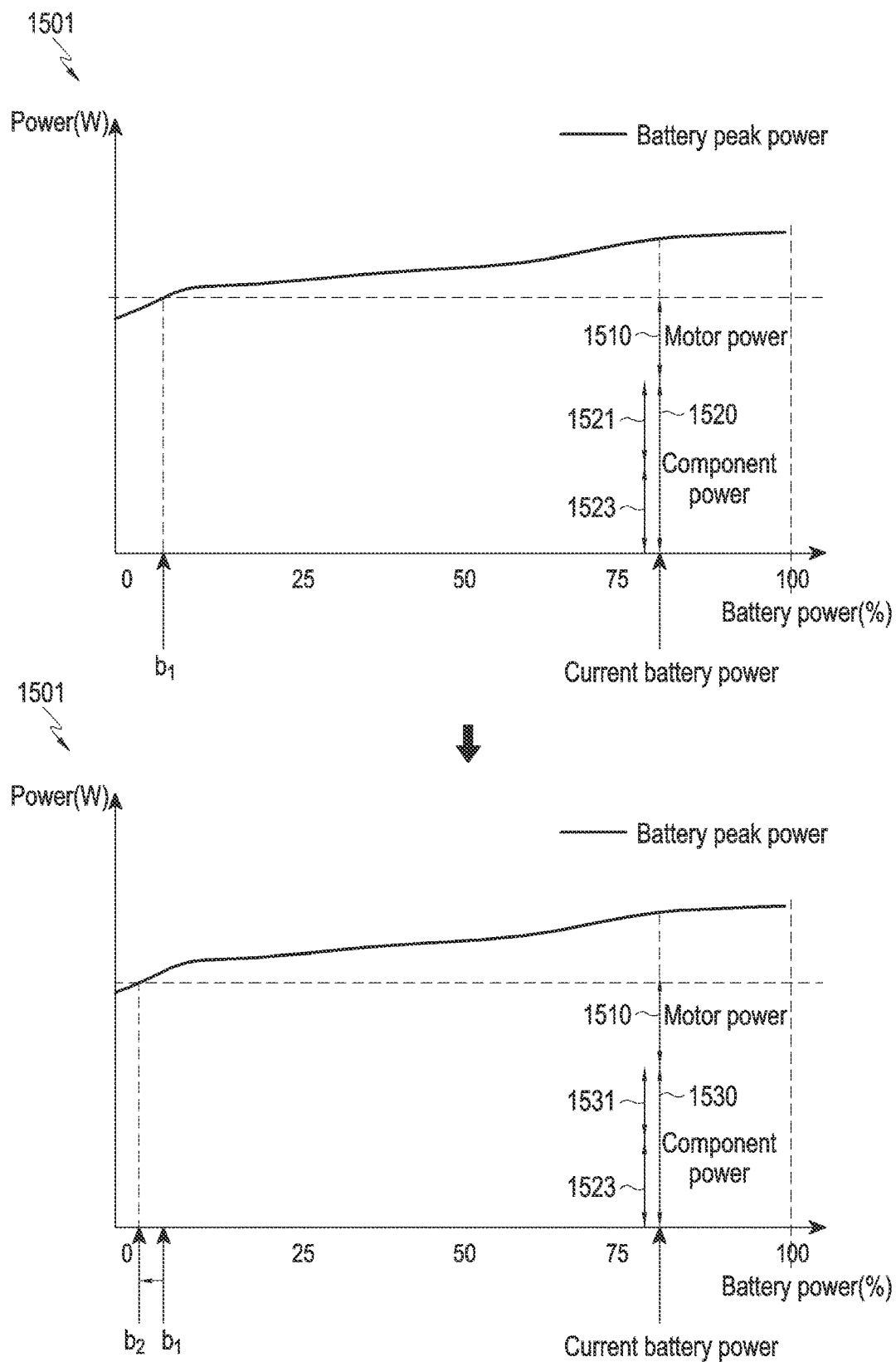
FIG. 15 is a view illustrating an example of an operation for adjusting third power for controlling (or driving) a moving device (e.g., a motor) and second power for controlling (or driving) electronic components (e.g., a display or a communication circuit) of an electronic device according to various embodiments of the disclosure.

FIG. 15 is a view illustrating an example of an operation for adjusting third power (e.g., the motor power 1510) for controlling (or driving) a moving device 510 (e.g., a motor) and second power (e.g., the component power 1520) for controlling (or driving) electronic components 540 (e.g., a display 203 or a communication circuit 543) of an electronic device 200 according to various embodiments of the disclosure.

According to various embodiments, the electronic device 200 may identify an event for triggering a movement of a plate in operation 1401. For example, the electronic device 200 (e.g., the movement detection module 571) may identify an occurrence of an event set to trigger a sliding movement of the display 203 (or the first structure 201 or the first plate 211a). Operation 1401 of the electronic device 200 may be performed like operation 901 of the electronic device 200 as described above, and no duplicate description thereof is given below.

According to various embodiments, the electronic device 200 may identify first power of the battery 530 in operation 1403. For example, the electronic device 200 may identify the current first power (e.g., peak power) of the battery 530 corresponding to the identified value (e.g., the power of the battery 530 or the remaining power of the battery 530) using the detection circuit 601.

According to various embodiments, in operation 1405, the electronic device 200 may identify the second power (e.g., the component power 1520) for controlling the electronic component 540 and the third power (e.g., the motor power 1510) for driving the motor based on at least one of the identified first power or at least one parameter. For example, as illustrated in FIG. 15, the electronic device 200 (e.g., the power management module 575) may identify second power (e.g., component power 1520) for controlling (or driving) the electronic components 540 (e.g., the display 203 or the communication circuit 543) and third power (e.g., motor power 1510) for controlling (or driving) the moving device 510 (e.g., a motor) based on at least one parameter for adjusting power within the identified first power (e.g., peak power) of the battery 530. For example, a third parameter for adjusting (or setting) the second power (e.g., the component power 1520) for controlling (or driving) the electronic components 540 (hereinafter, component adjustment parameter) may include at least one of the temperature of the electronic device 200, the remaining power of the battery 530, the difference between the motor power available ratio MPAr and the motor power ratio MPr, or the difference between the motor power available ratio MPAr and the motor power ratio minimum Mprmin. As another example, the parameter for adjusting (or setting) the third power (e.g., the motor power 1510) for controlling (or driving) the moving device 510 (e.g., a motor) (hereinafter, motor adjustment parameter) may include at least one of the temperature or the remaining power of the battery 530. Based on an occurrence of an event, the electronic device 200 may identify the values of the above-described parameters (e.g., the component adjustment parameter and the motor adjustment parameter) and may identify the second power (e.g., the component power 1520) for controlling (or driving) the electronic components 540 (e.g., the display 203 or communication circuit 543) and/or the third power (e.g., the motor power 1510) for controlling (or driving) the moving device 510 (e.g., a motor) based on the identified values of the parameters. Meanwhile, the parameters (e.g., the third parameter and the fourth parameter) are not limited to the examples described but may further include other various parameters. In particular, the parameters may further include information for the set power mode described in connection with FIGS. 21 to 28. The electronic device 200 (e.g., the power management module 575) may adjust (or set) the second power (e.g., the component power 1520) and/or the third power (e.g., the motor power 1510) according to the set power mode.

In an embodiment, the electronic device 200 may adjust the second power (e.g., the component power 1520) and/or the third power (e.g., the motor power 1510) so that the sum of the second power (e.g., the component power 1520) for controlling (or driving) the electronic components 540 (e.g., the display 203 or communication circuit 543) and the third power (e.g., the motor power 1510) for controlling (or driving) the moving device 510 (e.g., a motor) is reduced. For example, referring to 1501 and 1502 of FIG. 15, the electronic device 200 (e.g., the power management module 575) may reduce, by a certain extent, the second power (e.g., the component power 1520) (e.g., reduce the first power 1521 for driving the display 203 to the second power 1531) based on the third parameter (e.g., the temperature, the remaining power of the battery 530, the difference between the motor power available ratio MPAr and the motor power ratio MPr, the difference between the motor power available ratio MPAr and the motor power ratio minimum Mprmin, and/or the power mode setting), obtaining a reduced component power 1530. Accordingly, the motor power 1510 may be increased by a certain extent. Without being limited to the described example, the electronic device 200 (e.g., the power management module 575) may reduce the power 1523 for controlling components other than the display 203. Further, without being limited to those described and/or shown, the electronic device 200 (e.g., the power management module 575) may reduce the third power (e.g., the motor power 1510) for controlling (or driving) the moving device 510 (e.g., a motor) based on a fourth parameter (e.g., the temperature, the remaining power of the battery 530, and/or the power mode setting). Thus, the remaining power of the battery 530, at which the first power (e.g., peak power) of the battery 530 equals the sum of the second power (e.g., the component power 1520) and the third power (e.g., the motor power 1510), is reduced (e.g., reduced from b1 to b2), so that the power-off of the electronic device 200 may be delayed.

In another embodiment, the electronic device 200 may adjust the second power (e.g., the component power 1520) and/or the third power (e.g., the motor power 1510) based on the parameters so that the third power (e.g., the motor power 1510) for driving the moving device 510 (e.g., a motor) is maximally secured. For example, the electronic device 200 may increase the third power (e.g., the motor power 1510) for driving the moving device 510 (e.g., a motor). In this case, the electronic device 200 may reduce the second power (e.g., the component power 1520) for controlling (or driving) the electronic components (e.g., the display 203 or communication circuit 543) for maximally securing the available power for controlling (or driving) the moving device 510 (e.g., a motor) while increasing the third power (e.g., the motor power 1510). However, without being limited thereto, the electronic device 200 may increase the third power (e.g., the motor power 1510) within the difference between the first power (e.g., peak power) of the battery 530 and the second power (e.g., the component power 1520) (i.e., the available power for controlling the moving device 510 (e.g., a motor)).

In another embodiment, the electronic device 200 may adjust the second power (e.g., the component power 1520) and/or the third power (e.g., the motor power 1510) based on the parameters so that the second power (e.g., the component power 1520) for driving the electronic components 540 (e.g., the display 203 or communication circuit 543) is maximally secured. For example, the electronic device 200 may increase the second power (e.g., the component power 1520) for driving the electronic components 540 (e.g., the display 203 or communication circuit 543). In this case, the electronic device 200 may reduce the second power (e.g., the component power 1520) for controlling (or driving) the moving device 510 (e.g., a motor) (e.g., reduce up to the minimum power for controlling the moving device 510 (e.g., a motor)) to maximally secure the available power for the electronic components 540 (e.g., the display 203 or communication circuit 543) while increasing the second power (e.g., the component power 1520). However, without being limited thereto, the electronic device 200 may increase the second power (e.g., the component power 1520) within the difference between the first power (e.g., peak power) of the battery 530 and the third power (e.g., the motor power 1510) (i.e., the available power for controlling the electronic components 540 (e.g., the display 203 or communication circuit 543)).

An example of an operation of an electronic device 200 is described below according to various embodiments. Since at least some of the above-described operations of the electronic device 200 (e.g., the operations of the flowchart 900 of FIG. 9, the operations of the flowchart 1100 of FIG. 11, the operations of the flowchart 1200 of FIG. 12, and the operations of the flowchart 1400 of FIG. 14) may be performed in combination with the operations described below, and thus, no duplicate description is presented.

According to various embodiments, when an event for triggering a sliding movement occurs, the electronic device 200 (e.g., the processor 550) may identify the power for identifying the electronic components 540 based on at least one of the temperature or the remaining power of the battery 530.

Figure 16:
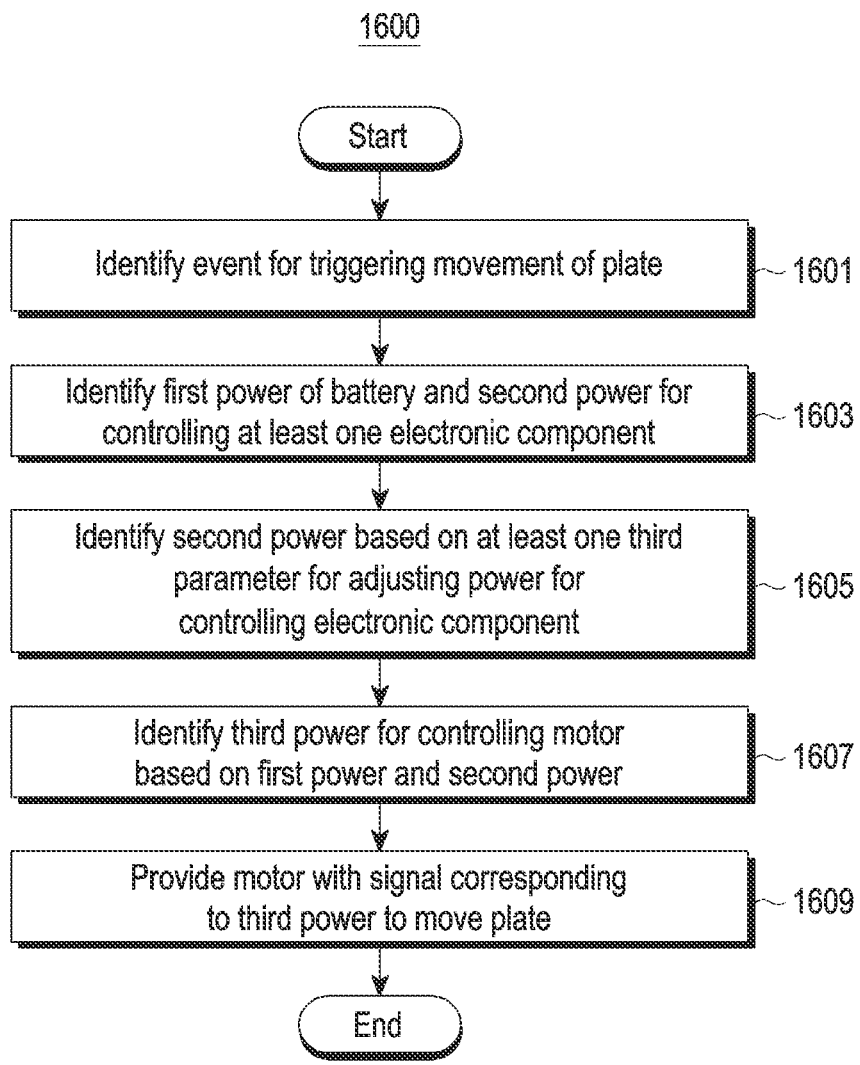
FIG. 16 is a flowchart illustrating an example of an operation of an electronic device according to various embodiments of the disclosure.

FIG. 16 is a flowchart 1600 illustrating an example of an operation of an electronic device 200 according to various embodiments of the disclosure. According to various embodiments, the operations shown in flowchart 1600 of FIG. 16 are not limited to the shown order but may rather be performed in other various orders. According to various embodiments, more or less operations than those of FIG. 16 may be performed.

According to various embodiments, the electronic device 200 may identify an event for triggering a movement of a plate in operation 1601. For example, the electronic device 200 (e.g., the movement detection module 571) may identify an occurrence of an event set to trigger a sliding movement of the display 203 (or the first structure 201 or the first plate 211a). Operation 1601 of the electronic device 200 may be performed like operation 901 of the electronic device 200 as described above, and no duplicate description thereof is given below.

According to various embodiments, in operation 1603, the electronic device 200 may identify the first power of the battery 530 and second power (e.g., the component power 1520) for controlling at least one electronic component. For example, based on the occurrence of the event, the electronic device 200 (e.g., the power management module 575) may identify the first power (e.g., peak power) of the battery 530 corresponding to the identified value (e.g., the power of the battery 530 or the remaining power of the battery 530) using the detection circuit 601.

According to various embodiments, in operation 1605, the electronic device 200 may identify the second power (e.g., the component power 1520) for controlling the electronic components 540 based on at least one third parameter for adjusting the power for controlling the electronic components. Based on the occurrence of the event, the electronic device 200 (e.g., the power management module 575) may identify the second power (e.g., the component power 1520) provided to the electronic components 540 (e.g., the display 203 or communication circuit 543) (or for controlling the electronic components 540 at the time of occurrence of the event), as set based on the third parameter. For example, the at least one third parameter may include at least one of the temperature or the remaining power of the battery 530. The second power (e.g., the component power 1520) may be proportional to at least one of the temperature or the remaining power of the battery 530. For example, as the temperature increases, the second power (e.g., the component power 1520) may be set to be higher. As another example, as the remaining power of the battery 530 increases, the second power (e.g., the component power 1520) may be set to be higher. However, without being limited thereto, the second power (e.g., the component power 1520) may be inversely proportional to at least one of the temperature or the remaining power of the battery 530. Accordingly, based on the occurrence of an event, the electronic device 200 (e.g., the power management module 575) may identify the temperature using a sensor and/or identify the remaining power of the battery 530 using the detection circuit 601 and may identify the second power (e.g., the component power 1520) corresponding to the temperature and/or the remaining power of the battery 530.

According to various embodiments, in operation 1607, the electronic device 200 may identify the third power (e.g., the motor power 1510) for controlling the motor based on the first power and the adjusted second power (e.g., the component power 1520). In an embodiment, the electronic device 200 may identify the third power (e.g., the motor power 1510) for controlling (or driving) the moving device 510 (e.g., a motor) within a difference between the first power and the second power (e.g., the component power 1520). In an embodiment, the electronic device 200 may identify values of parameters (e.g., the motor power available ratio MPAr and the motor power ratio MPr) based on the first power and the second power (e.g., the component power 1520) and identify the third power (e.g., the motor power 1510) based on the identified values. Operation 1607 of the electronic device 200 may be performed like operations 903 to 905 of the electronic device 200 and operations 1103 to 1113 of the electronic device 200 as described above, and no duplicate description thereof is given below.

According to various embodiments, in operation 1609, the electronic device 200 may provide the motor with a signal corresponding to the third power (e.g., the motor power 1510) to move the plate. For example, the electronic device 200 (e.g., the movement control module 573) may provide the moving device 510 (e.g., a motor) with a signal (e.g., a PWM signal) having the characteristics (e.g., frequency or magnitude) corresponding to the identified third power (e.g., the motor power 1510).

An example of an operation of an electronic device 200 is described below according to various embodiments. Since at least some of the above-described operations of the electronic device 200 (e.g., the operations of the flowchart 900 of FIG. 9, the operations of the flowchart 1100 of FIG. 11, the operations of the flowchart 1200 of FIG. 12, the operations of the flowchart 1400 of FIG. 14, and the operations of the flowchart 1600 of FIG. 16) may be performed in combination with the operations described below, and thus, no duplicate description is presented.

According to various embodiments, when an event for triggering a sliding movement occurs, the electronic device 200 (e.g., the processor 550) may set (or adjust) the second power (e.g., the component power 1520) for controlling (or driving) the components (e.g., the display 203 or communication circuit 543). For example, the electronic device 200 may set (or adjust) the second power (e.g., the component power 1520) for controlling (or driving) the components (e.g., the display 203 or communication circuit 543) based on the power for controlling the moving device 510 (e.g., a motor) and/or a preset power for controlling the moving device 510 (e.g., a motor). For example, to drive the moving device 510 (e.g., a motor), if the power for controlling the moving device 510 (e.g., a motor) is lower than the minimum power for driving the moving device 510 (e.g., a motor), the electronic device 200 may reduce the second power (e.g., the component power 1520) so that the power for controlling the moving device 510 (e.g., a motor) is higher than the minimum power. As another example, to maximally secure the performance of the moving device 510 (e.g., a motor), if the power for controlling the moving device 510 (e.g., a motor) is lower than the power for controlling the moving device 510 (e.g., a motor), the electronic device 200 may reduce the second power (e.g., the component power 1520) so that the power for controlling the moving device 510 (e.g., a motor) is higher than the power for controlling the moving device 510 (e.g., a motor).

Figure 17:
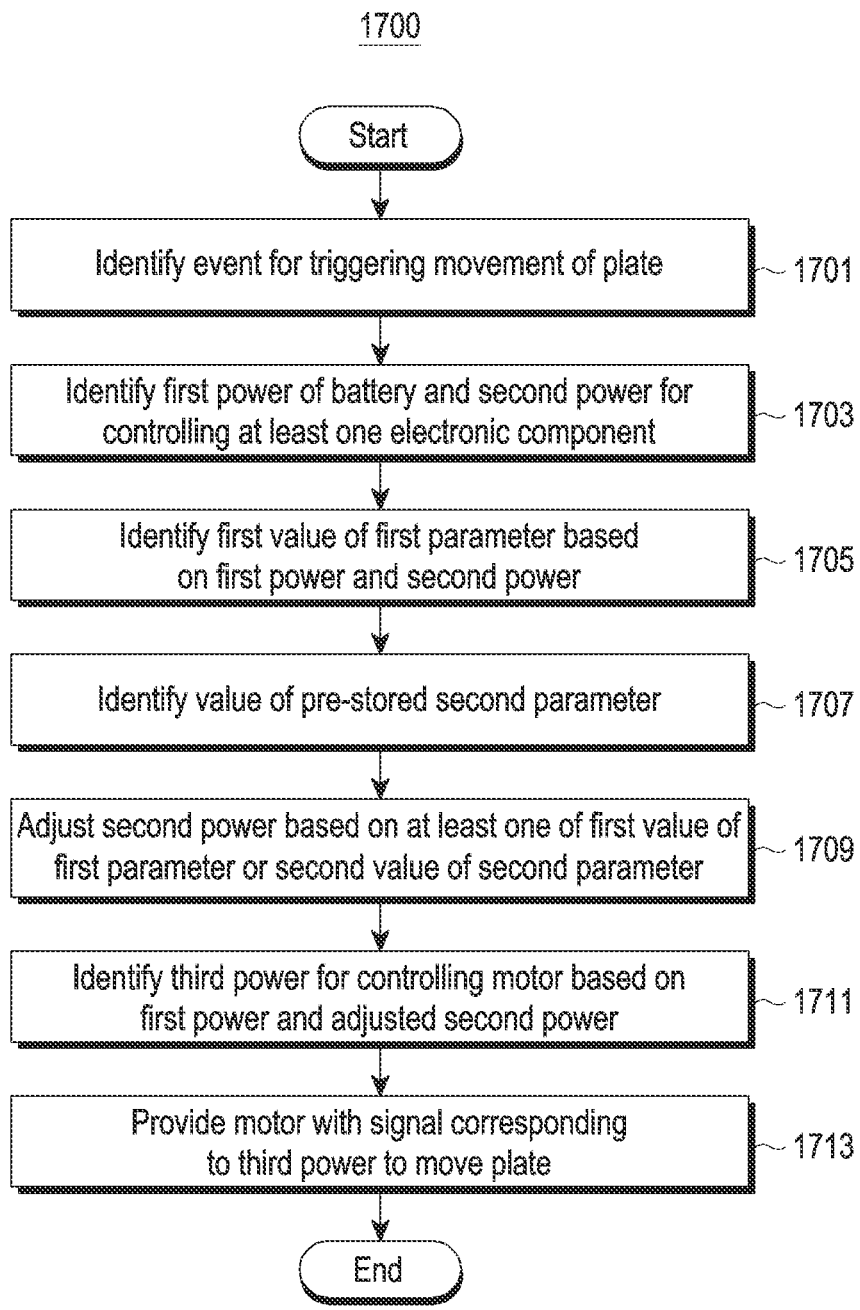
FIG. 17 is a flowchart illustrating an example of an operation of an electronic device according to various embodiments of the disclosure.

FIG. 17 is a flowchart 1700 illustrating an example of an operation of an electronic device 200 according to various embodiments of the disclosure. According to various embodiments, the operations shown in flowchart 1700 of FIG. 17 are not limited to the shown order but may rather be performed in other various orders. According to various embodiments, more or less operations than those of FIG. 17 may be performed.

Figure 18A:
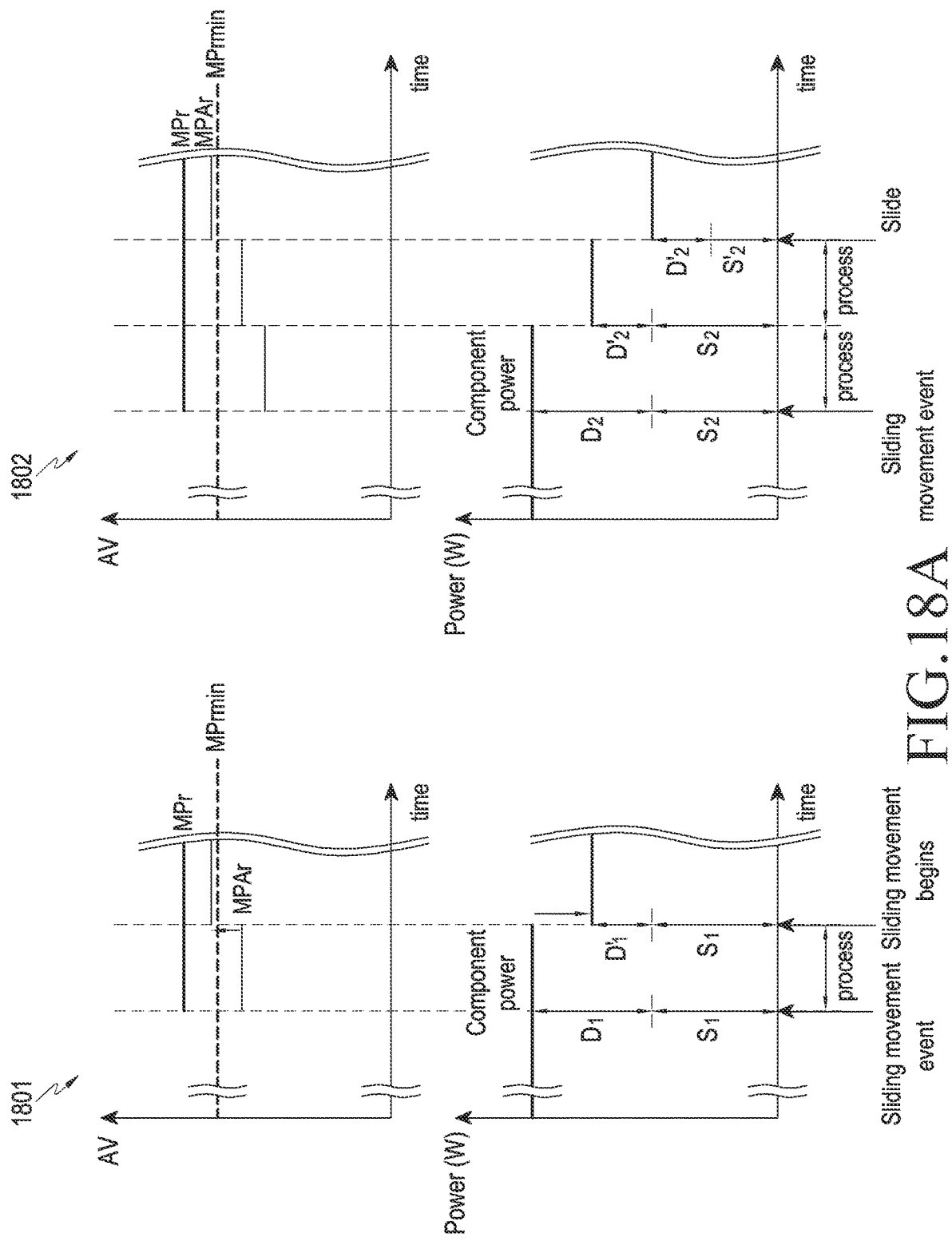
FIG. 18A is a view illustrating an example of an operation for reducing the power for controlling electronic components (e.g., a display or a communication circuit) when a motor power available ratio of an electronic device is lower than a lowest motor power ratio according to various embodiments of the disclosure.
Figure 18B:
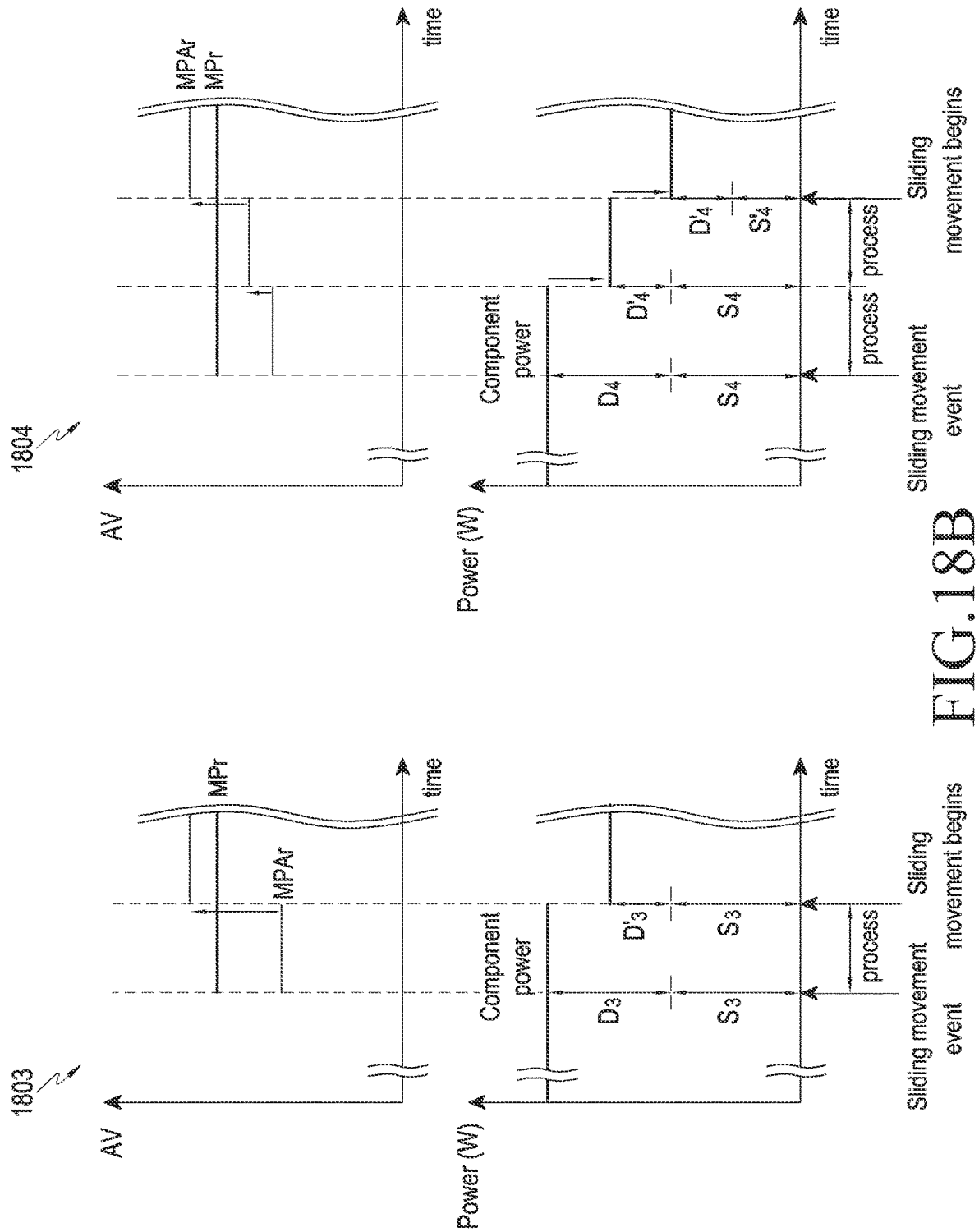
FIG. 18B is a view illustrating an example of an operation for reducing the power for controlling electronic components (e.g., a display or a communication circuit) when a motor power available ratio of an electronic device is lower than a motor power ratio according to various embodiments of the disclosure.

FIG. 18A is a view illustrating an example of an operation for reducing the power for controlling electronic components 540 (e.g., a display 203 or a communication circuit 543) when a motor power available ratio MPAr of an electronic device 200 is lower than a motor power ratio minimum Mprmin according to various embodiments of the disclosure. FIG. 18B is a view illustrating an example of an operation for reducing the power for controlling electronic components 540 (e.g., a display 203 or a communication circuit 543) when a motor power available ratio MPAr of an electronic device is lower than a motor power ratio MPr according to various embodiments of the disclosure. Meanwhile, as described above, the parameters (e.g., the motor power available ratio MPAr, the motor power ratio minimum, and the motor power ratio MPr) illustrated in FIGS. 18A and 18B may be replaced with the motor power available, motor power minimum, or motor power or with other parameters (e.g., parameters associated with the motor speed).

According to various embodiments, the electronic device 200 may identify an event for triggering a movement of a plate in operation 1701. For example, the electronic device 200 (e.g., the movement detection module 571) may identify an occurrence of an event set to trigger a sliding movement of the display 203 (or the first structure 201 or the first plate 211*a*). Operation 1701 of the electronic device 200 may be performed like operation 901 of the electronic device 200 as described above, and no duplicate description thereof is given below.

According to various embodiments, in operation 1703, the electronic device 200 may identify the first power of the battery 530 and the second power (e.g., the component power) for controlling at least one electronic component and, in operation 1705, identify the first value of the first parameter based on the first power and the second power (e.g., the component power 1520) and, in operation 1707, identify the pre-stored second parameter value. For example, the electronic device 200 may identify the first power (e.g., peak power) of the battery 530 corresponding to the value (e.g., the power of the battery 530 or the remaining power of the battery 530) identified using the detection circuit 601 and may identify the second power (e.g., the component power 1520) provided to the electronic components 540 (e.g., the display 203 or communication circuit 543). The electronic device 200 may identify the first value of the first parameter (e.g., the motor power available ratio MPAr) and the second value of the preset second parameter (e.g., the motor power ratio MPr), associated with the power for controlling the moving device 510 (e.g., a motor) based on the first power and the second power (e.g., the component power 1520). The operation of identifying the parameters (e.g., the motor power available ratio MPAr and the motor power ratio MPr) of the electronic device 200 may be performed like operations 1103 to 1113 of the electronic device 200, and no duplicate description is thus given below. Meanwhile, as described above in connection with FIG. 11, the parameters (e.g., the motor power available ratio MPAr, the motor power ratio minimum, and the motor power ratio MPr) illustrated in FIGS. 18A and 18B may be replaced with the motor power available, motor power minimum, or motor power or with other parameters (e.g., parameters associated with the motor speed).

According to various embodiments, in operation 1709, the electronic device 200 may adjust the second power (e.g., the component power 1520) based on at least one of the first value of the first parameter or the second value of the second parameter. For example, the electronic device 200 may adjust the second power (e.g., the component power 1520) for controlling the components for driving the moving device 510 (e.g., a motor) based on at least one of the motor power available ratio MPAr, the motor power ratio minimum Mprmin, or the motor power ratio MPr. Hereinafter, examples of the operation of the electronic device 200 are described.

In an embodiment, if the first value of the first parameter (e.g., the motor power available ratio MPAr) is smaller than a preset value (e.g., the motor power ratio minimum Mprmin) corresponding to the minimum power for controlling the moving device 510 (e.g., a motor), the electronic device 200 may reduce the power of the components (e.g., the display 203 or communication circuit 543). For example, as illustrated in 1801 of FIG. 18A, if the motor power available ratio MPAr is smaller than the motor power ratio minimum Mprmin, the electronic device 200 (e.g., the power management module 575) may reduce some power of the power of the components (e.g., the power D1 of the display 203 or the power S1 of the system including other components (e.g., the communication circuit 543) than the display 203) so that it is possible to drive the moving device 510 (e.g., a motor). The degree (e.g., D1'/D1 or D1'-D1) by which the power is reduced is described below with reference to FIGS. 21 to 28 and may be determined according to the degree of power change per device which is determined based on the setting app. However, without being limited thereto, the degree by which the power is reduced may be previously set. As an example, as at least part of the operation of reducing the power D1 of the display 203, the electronic device 200 (e.g., the power management module 575) may reduce the characteristic value (e.g., luminance, scan rate, or brightness) of the display 203 (e.g., control the display driver IC 1300 to reduce the corresponding value). As some power of the power (e.g., the component power) of the components reduces, the motor power available ratio MPAr may become higher than the motor power ratio minimum Mprmin. Thus, in a state where the motor power available ratio MPAr and the motor power ratio MPr is higher than the motor power ratio minimum Mprmin, the electronic device 200 may select the lower of the motor power available ratio MPAr and the motor power ratio MPr as the value for identifying the power for controlling (or driving) the moving device 510 (e.g., a motor). Further, as illustrated in 1802 of FIG. 18A, as at least part of the operation of reducing some power (e.g., the power for controlling the display 203) of the power (e.g., the component power) of the components, the electronic device 200 may sequentially reduce the power (component power) for controlling (or driving) the components (e.g., the power D2 for controlling the display 203 or the power S2 for controlling the other components) until the motor power available ratio MPAr becomes higher than the motor power ratio minimum Mprmin For example, the electronic device 200 (e.g., the power management module 575) may reduce some power of the power of the components (e.g., the component power) (e.g., reduce the power D2 for controlling the display 203 to power D2') and then compare the motor power available ratio MPAr with the motor power ratio minimum Mprmin. If the motor power available ratio MPAr is lower than the motor power ratio minimum MPrmin, the electronic device 200 (e.g., the power management module 575) may reduce the remaining power of the power of the components (e.g., the component power) (e.g., reduce the power S2 of the communication circuit 543 to power S2'). As described above, the order in which the power is reduced may be set according to the priorities of per-component groups. Meanwhile, as described above, the motor power available ratio MPAr may be appreciated as the motor power available MPA, and the motor power ratio minimum Mprmin may be appreciated as the motor power minimum Mpmin Thus, the above-described operation may be appreciated as the operation of reducing the power of the components (e.g., the component power) until the motor power available MPA becomes higher than the motor power minimum Mpmin.

In another embodiment, if the first value of the first parameter (e.g., the motor power available ratio MPAr) is smaller than the second value of the second parameter (e.g., the motor power ratio MPr), the electronic device 200 may reduce the power of the components (e.g., the display 203 or communication circuit 543). For example, as illustrated in 1803 of FIG. 18B, if the motor power available ratio MPAr is smaller than the motor power ratio MPr, the electronic device 200 may reduce some power of the power of the components (e.g., the component power) (e.g., reduce the power D3 for controlling the display 203 to power D3') so as to maximally secure the driving performance of the moving device 510 (e.g., a motor). As described above, the degree (e.g., D3'/D3 or D3'-D3) by which the power is reduced is described below with reference to FIGS. 21 to 28 and may be determined according to the degree of power change per device which is determined based on the setting app. However, without being limited thereto, the degree by which the power is reduced may be previously set. Accordingly, if the motor power available ratio MPAr is higher than the motor power ratio MPr, the electronic device 200 may select the motor power ratio MPr as a value for identifying the power for controlling (or driving) the moving device 510 (e.g., a motor). As another example, as illustrated in 1804 of FIG. 18B, the electronic device 200 may sequentially reduce the power (e.g., the component power) for controlling (or driving) the components (e.g., reduce the power D4 for controlling the display 203 to power D4' and reduce the power S4 for controlling the other components to power S4') until the motor power available ratio MPAr becomes higher than the motor power ratio MPr. Meanwhile, as described above, the motor power available ratio MPAr may be appreciated as the motor power available MPA, and the motor power ratio MPr may be appreciated as the motor power MP. Thus, the above-described operation may be appreciated as the operation of reducing the power of the components (e.g., the component power) until the motor power available MPA becomes higher than the motor power MP.

According to various embodiments, in operation 1711, the electronic device 200 may identify the third power for controlling the motor based on the first power and the adjusted second power (e.g., the component power 1520). For example, the electronic device 200 may identify the third power (e.g., the motor power 1510) corresponding to the determined parameter value (e.g., the value of the motor power available ratio MPAr or the value of the motor power ratio MPr). Operation 1711 of the electronic device 200 may be performed like operation 1113 of the electronic device 200 as described above, and no duplicate description thereof is given below.

According to various embodiments, in operation 1713, the electronic device 200 may provide the motor with a signal corresponding to the third power (e.g., the motor power 1510) to move the plate. For example, the electronic device 200 (e.g., the movement control module 573) may provide the moving device 510 (e.g., a motor) with a signal (e.g., a PWM signal) having the characteristics (e.g., frequency or magnitude) corresponding to the identified third power (e.g., the motor power 1510). If the sliding movement based on reducing the second power (e.g., the component power 1520) is completed, the electronic device 200 may provide a notification (e.g., display of content or output of an audio) indicating that further sliding movement is impossible.

An example of an operation of an electronic device 200 is described below according to various embodiments. Since at least some of the above-described operations of the electronic device 200 (e.g., the operations of the flowchart 900 of FIG. 9, the operations of the flowchart 1100 of FIG. 11, the operations of the flowchart 1200 of FIG. 12, the operations of the flowchart 1400 of FIG. 14, the operations of the flowchart 1600 of FIG. 16, and the operations of the flowchart 1700 of FIG. 17) may be performed in combination with the operations described below, and thus, no duplicate description is presented.

According to various embodiments, when an event for triggering a sliding movement occurs, the electronic device 200 (e.g., the processor 550) may identify the power for identifying the electronic components 540 based on at least one of the temperature or the remaining power of the battery 530.

Figure 19:
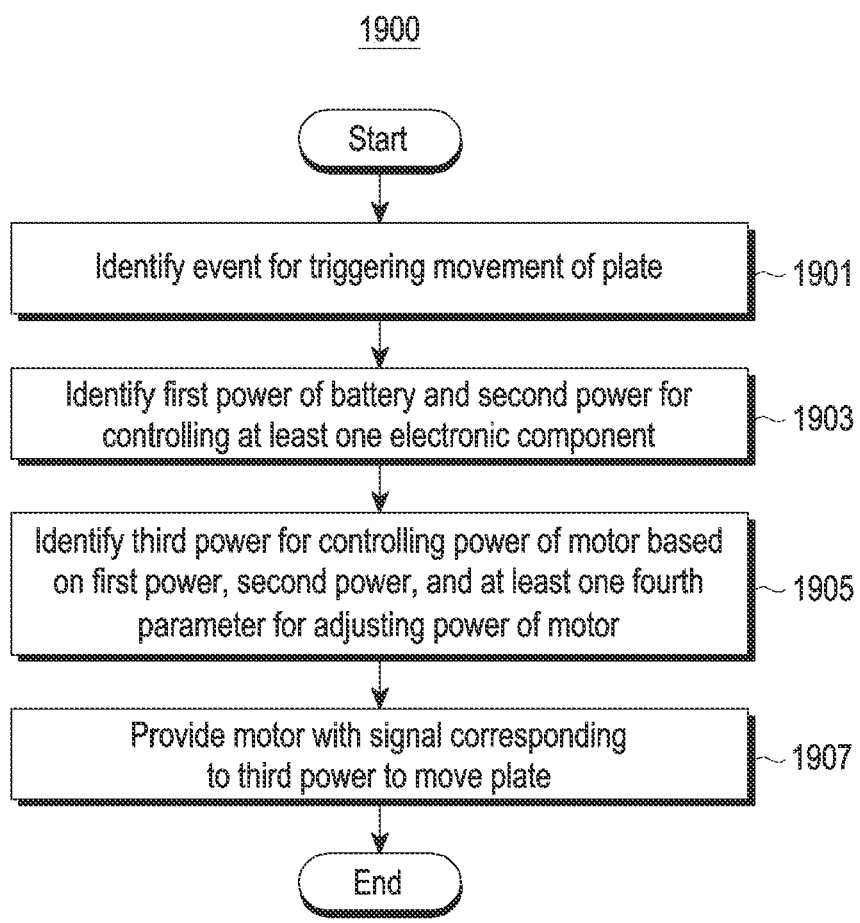
FIG. 19 is a flowchart illustrating an example of an operation of an electronic device according to various embodiments of the disclosure.

FIG. 19 is a flowchart 1900 illustrating an example of an operation of an electronic device 200 according to various embodiments of the disclosure. According to various embodiments, the operations shown in flowchart 1900 of FIG. 19 are not limited to the shown order but may rather be performed in other various orders. According to various embodiments, more or less operations than those of FIG. 19 may be performed.

According to various embodiments, the electronic device 200 may identify an event for triggering a movement of a plate in operation 1901. For example, the electronic device 200 (e.g., the movement detection module 571) may identify an occurrence of an event set to trigger a sliding movement of the display 203 (or the first structure 201 or the first plate 211a). Operation 1901 of the electronic device 200 may be performed like operation 901 of the electronic device 200 as described above, and no duplicate description thereof is given below.

According to various embodiments, in operation 1903, the electronic device 200 may identify the first power of the battery 530 and second power (e.g., the component power 1520) for controlling at least one electronic component. For example, the electronic device 200 may identify the first power (e.g., peak power) of the battery 530 corresponding to the value (e.g., the power of the battery 530 or the remaining power of the battery 530) identified using the detection circuit 601 and may identify the second power (e.g., the component power 1520) provided to the electronic components 540 (e.g., the display 203 or communication circuit 543) (or for controlling the components at the time of identification of the event).

According to various embodiments, in operation 1905, the electronic device 200 may identify the third power (e.g., the motor power 1510) for controlling the power of the motor, based on the first power, the second power (e.g., the component power 1520), and at least one fourth parameter for adjusting the power of the motor. For example, the electronic device 200 may identify the parameter (e.g., the motor power ratio MPr) associated with the power for controlling the moving device 510 (e.g., a motor), set based on at least one fourth parameter (e.g., the temperature and the remaining power of the battery 530). For example, the motor power ratio MPr may be previously set to be proportional to at least one of the temperature or the remaining power of the battery 530. As another example, referring to Table 2 below, as the remaining power of the battery 530 increases, the motor power ratio MPr may be previously set to be higher. In an embodiment, the motor power ratio may be lowered by 0.1 for each section of the remaining power of the battery. In another embodiment, the motor power ratio may be continuously decreased per remaining power of the battery, and in this case, the motor power ratio may be set with a predetermined slope for each remaining power of the battery.

TABLE 2

| Remaining battery power (%) | Motor power ratio |
|---|---|
| 50 to 100 | 1 |
| 15 to 50 | 0.9 |
| 5 to 15 | 0.8 |
| less than 5 | 0, i.e., power off as described above |

As another example, as the temperature increases, the motor power ratio MPr may be previously set to be higher. The motor power ratio MPr for each temperature may be set as the above-described motor power ratio MPr for each remaining power of the battery 530. Further, without being limited thereto, the second power (e.g., the component power 1520) may be inversely proportional to at least one of the temperature or the remaining power of the battery 530. Meanwhile, the motor power ratio MPr may be appreciated as the motor power MP, and thus, the motor power MP may be appreciated as proportional to the temperature and/or the remaining battery power.

Accordingly, the electronic device 200 (e.g., the power management module 575) may identify the motor power available ratio MPAr based on the first power and the second power (e.g., the component power 1520), identify the motor power ratio MPr based on the temperature and/or the remaining power of the battery 530, and select the smaller of the two parameters (e.g., the motor power available ratio MPAr and the motor power ratio MPr) as the value for controlling (or driving) the moving device 510 (e.g., a motor).

According to various embodiments, in operation 1907, the electronic device 200 may provide the motor with a signal corresponding to the third power (e.g., the motor power 1510) to move the plate. For example, the electronic device 200 (e.g., the movement control module 573) may provide the moving device 510 (e.g., a motor) with a signal (e.g., a PWM signal) having the characteristics (e.g., frequency or magnitude) corresponding to the identified third power (e.g., the motor power 1510).

An example of an operation of an electronic device 200 is described below according to various embodiments. Since at least some of the above-described operations of the electronic device 200 (e.g., the operations of the flowchart 900 of FIG. 9, the operations of the flowchart 1100 of FIG. 11, the operations of the flowchart 1200 of FIG. 12, the operations of the flowchart 1400 of FIG. 14, the operations of the flowchart 1600 of FIG. 16, the operations of the flowchart 1700 of FIG. 17, and the operations of the flowchart 1900 of FIG. 19) may be performed in combination with the operations described below, and thus, no duplicate description is presented.

According to various embodiments, when a sliding movement event occurs, the electronic device 200 (e.g., the processor 550) may identify power priorities of the devices (e.g., the motor, the display 203, and other components (or system) (e.g., the communication circuit 543)) and identify (or determine) the power for controlling the remaining devices based on the difference between the peak power of the battery 530 and the power for controlling the device having the highest priority. For example, the electronic device 200 (e.g., the processor 550) may identify (or determine) the power for controlling the remaining devices (e.g., the display 203 and the system (e.g., the communication circuit 543)) based on the difference between the second power (e.g., the component power) for controlling the motor and the power (e.g., peak power) of the battery 530. As is described below with reference to FIGS. 21 to 28, the power priorities may be set based on the setting app. Hereinafter, for convenience of description, a case in which the motor has the highest power priority is described as an example.

Figure 20A:
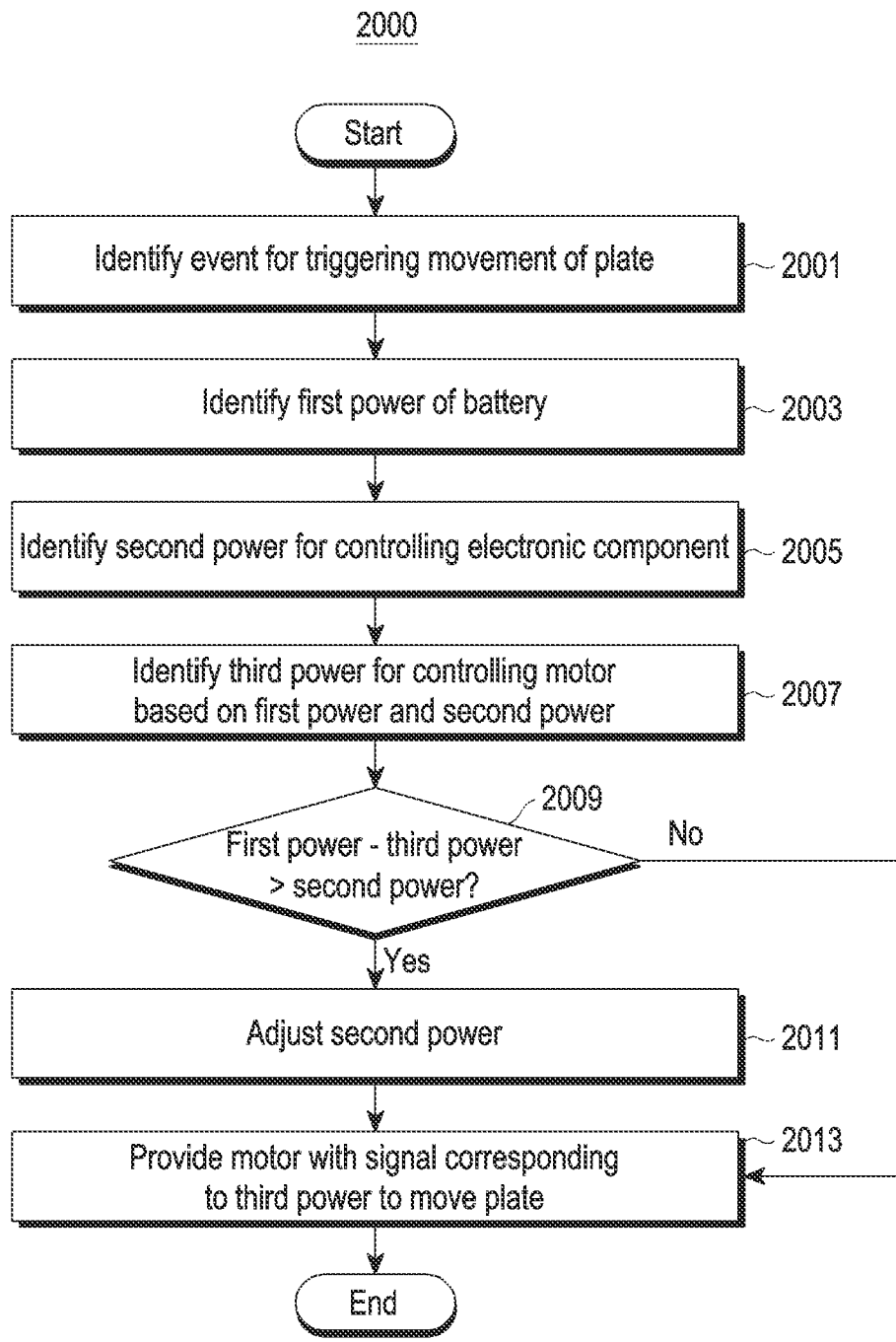
FIG. 20A is a flowchart illustrating an example of an operation of an electronic device according to various embodiments of the disclosure.

FIG. 20A is a flowchart 2000 illustrating an example of an operation of an electronic device 200 according to various embodiments of the disclosure. According to various embodiments, the operations shown in flowchart 2000 of FIG. 20A are not limited to the shown order but may rather be performed in other various orders. According to various embodiments, more or less operations than those of FIG. 20A may be performed.

Figure 20B:
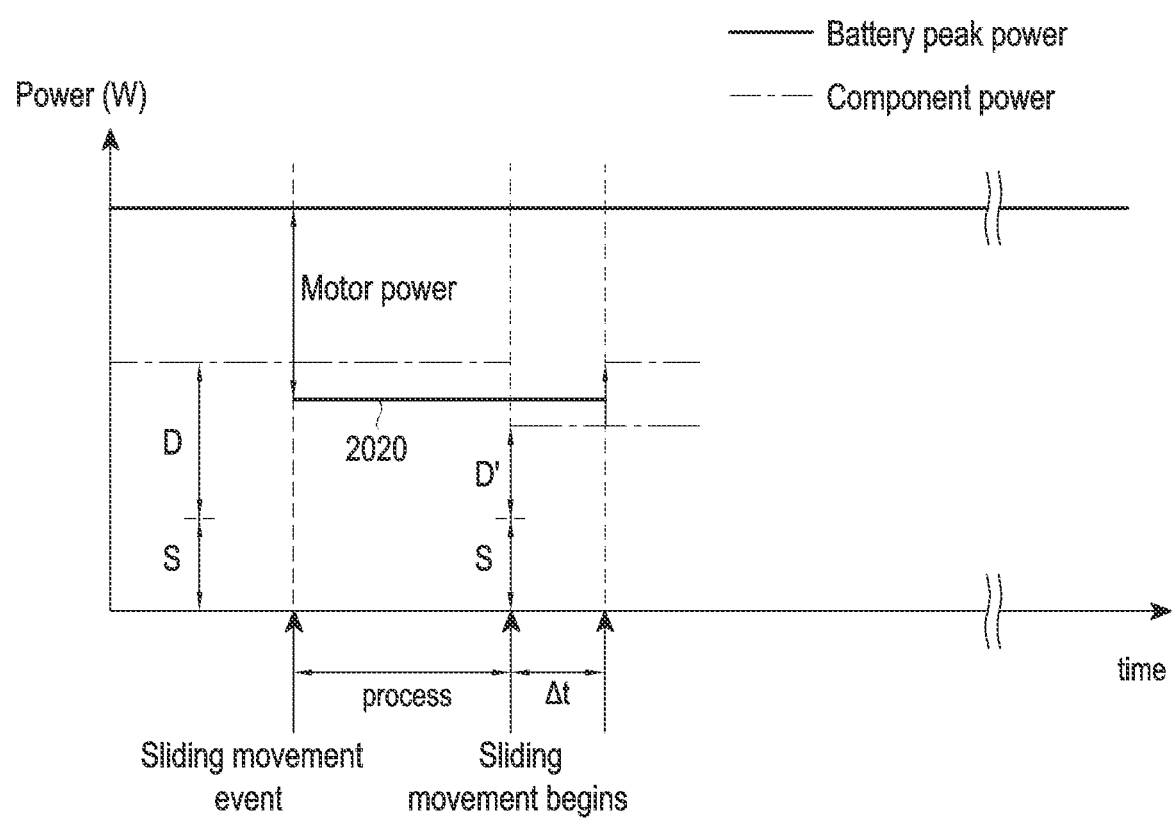
FIG. 20B is a view illustrating an example of an operation for adjusting the power for controlling (or driving) components (e.g., a display or a communication circuit) of an electronic device according to various embodiments of the disclosure.

FIG. 20B is a view illustrating an example of an operation for adjusting the power for controlling (or driving) components (e.g., a display 203 or a communication circuit 543) of an electronic device 200 according to various embodiments of the disclosure.

According to various embodiments, the electronic device 200 may identify an event for triggering a movement of a plate in operation 2001. For example, the electronic device 200 (e.g., the movement detection module 571) may identify an occurrence of an event set to trigger a sliding movement of the display 203 (or the first structure 201 or the first plate 211a). Operation 2001 of the electronic device 200 may be performed like operation 901 of the electronic device 200 as described above, and no duplicate description thereof is given below.

According to various embodiments, the electronic device 200 may identify first power of the battery 530 in operation 2003. For example, the electronic device 200 may identify the first power (e.g., peak power) of the battery 530 corresponding to the identified value (e.g., the power of the battery 530 or the remaining power of the battery 530) using the detection circuit 601.

According to various embodiments, in operation 2005, the electronic device 200 may identify the second power (e.g., the component power) for controlling the electronic component. For example, based on the identification of the event, the electronic device 200 may identify the second power (e.g., the component power) provided to the electronic components 540 (e.g., the display 203 or communication circuit 543) (or for controlling the components at the time of identification of the event). The second power may include the power D for controlling the display 203 and the power S for controlling the other components (system) (e.g., the communication circuit 543). In this case, as described above, as at least part of the operation of identifying the second power (e.g., the component power), the electronic device 200 may identify the second power (e.g., the component power) based on at least one third parameter (e.g., the temperature, the remaining power of the battery 530, and parameters associated with the power for controlling the motor (e.g., differences between the motor power available ratio MPAr, the motor power ratio minimum Mprmin, and the motor power ratio MPr).

According to various embodiments, in operation 2007, the electronic device 200 may identify the third power (e.g., the motor power) for controlling the motor based on the first power and the adjusted second power (e.g., the component power). In an embodiment, the electronic device 200 may identify the third power (e.g., the motor power) for controlling (or driving) the moving device 510 (e.g., a motor) within a difference between the first power and the second power (e.g., the component power). In an embodiment, the electronic device 200 may identify values of parameters (e.g., the motor power available ratio MPAr and the motor power ratio MPr) based on the first power and the second power (e.g., the component power) and identify the third power (e.g., the motor power) based on the identified values. Operation 2007 of the electronic device 200 may be performed like operations 903 to 905 of the electronic device 200 and operations 1103 to 1113 of the electronic device 200 as described above, and no duplicate description thereof is given below. In this case, as described above, as at least part of the operation of identifying the second power (e.g., the component power), the electronic device 200 may identify the second power (e.g., the component power) based on at least one third parameter (e.g., the temperature, the remaining power of the battery 530, and parameters associated with the power for controlling the motor (e.g., differences between the motor power available ratio MPAr, the motor power ratio minimum Mprmin, and the motor power ratio MPr).

According to various embodiments, in operation 2009, the electronic device 200 may determine whether the difference between the first power and the third power (e.g., the motor power) is larger than the second power (e.g., the component power). For example, as illustrated in FIG. 20B, at the time of occurrence of an event for triggering a sliding movement, the electronic device 200 may determine whether the difference 2020 between the first power (e.g., peak power) of the battery 530 and the third power (e.g., the motor power) for driving the motor is larger than the second power (e.g., the component power) for controlling the components (e.g., the display 203 or communication circuit 543). If the difference 2020 is larger than the second power (e.g., the component power), although the electronic device 200 provides the second power (e.g., the component power) for controlling the components (e.g., the display 203 or communication circuit 543) while driving the motor, no power-off may occur. However, when the difference 2020 is smaller than the second power (e.g., the component power), if the electronic device 200 provides the second power (e.g., the component power) for controlling the components (e.g., the display 203 or communication circuit 543) while driving the motor, power-off may occur.

According to various embodiments, if the difference is not larger (or is smaller) than the second power (e.g., the component power), the electronic device 200 may adjust the second power (e.g., the component power) in operation 2011 and, in operation 2013, may provide the motor with a signal corresponding to the third power (e.g., the motor power) to move the plate. For example, as illustrated in FIG. 20B, the electronic device 200 (e.g., the power management module 575) may reduce the second power (e.g., the component power) so that the second power (e.g., the component power) becomes smaller than the difference (e.g., reduce the power D of the display to power D' or reduce the system power S to power S'). The degree (e.g., D'/D or S'/S) by which the power is reduced is described below with reference to FIGS. 21 to 28 and may be determined according to the degree of power change per device which is determined based on the setting app. However, without being limited thereto, the degree by which the power is reduced may be previously set. In this case, as described above, as at least part of the operation of reducing the second power (e.g., the component power), the electronic device 200 may sequentially reduce the second power (e.g., the component power) based on the priority for each component until the second power (e.g., the component power) becomes lower than the difference 2020. Based on the second power (e.g., the component power) becoming smaller than the difference 2020, the electronic device 200 may provide the moving device 510 (e.g., a motor) with a signal (e.g., a PWM signal) having a characteristic (e.g., frequency or magnitude) corresponding to the identified third power (e.g., the motor power). If the sliding movement is completed (e.g., a designated time At elapses after the motor is driven), the electronic device 200 (e.g., the power management module 575) may provide the components (e.g., the display 203 or communication circuit 543) with the pre-reduction second power (e.g., the component power) (D+S).

According to various embodiments, if the difference is larger than the second power (e.g., the component power), the electronic device 200 may provide the motor with a signal corresponding to the third power (e.g., the motor power) to move the plate in operation 2013.

Meanwhile, the one with the highest power priority has been described as an example but, without being limited thereto, if another device (e.g., the display 203) or system (e.g., the communication circuit 543) has the highest priority, the electronic device 200 may perform a different operation. For example, if the difference between the first power (e.g., peak power) of the battery 530 and the second power (e.g., the component power) for controlling (or driving) the components (e.g., the display 203 or communication circuit 543) is larger than the third power (e.g., the motor power) for controlling the moving device 510 (e.g., a motor), the electronic device 200 (e.g., the power management module 575) may reduce the third power (e.g., the motor power) for controlling the moving device 510 (e.g., a motor).

An example of an operation of an electronic device 200 is described below according to various embodiments. Since at least some of the above-described operations of the electronic device 200 (e.g., the operations of the flowchart 900 of FIG. 9, the operations of the flowchart 1100 of FIG. 11, the operations of the flowchart 1200 of FIG. 12, the operations of the flowchart 1400 of FIG. 14, the operations of the flowchart 1600 of FIG. 16, the operations of the flowchart 1700 of FIG. 17, the operations of the flowchart 1900 of FIG. 19, and the operations of the flowchart 2000 of FIGS. 20A and 20B) may be performed in combination with the operations described below, and thus, no duplicate description is presented.

According to various embodiments, the electronic device 200 (e.g., the processor 550) may set the second power (e.g., the component power) for controlling the electronic components 540 (e.g., the display 203 or communication circuit 543) and/or the third power (e.g., the motor power) for controlling the moving device 510 (e.g., a motor) based on the set power mode.

FIG. 21 is a flowchart 2100 illustrating an example of an operation of an electronic device 200 according to various embodiments of the disclosure. According to various embodiments, the operations shown in flowchart 2100 of FIG. 21 are not limited to the shown order but may rather be performed in other various orders. According to various embodiments, more or less operations than those of FIG. 21 may be performed. FIG. 21 is described below with reference to FIGS. 22 and 23.

Figure 22:
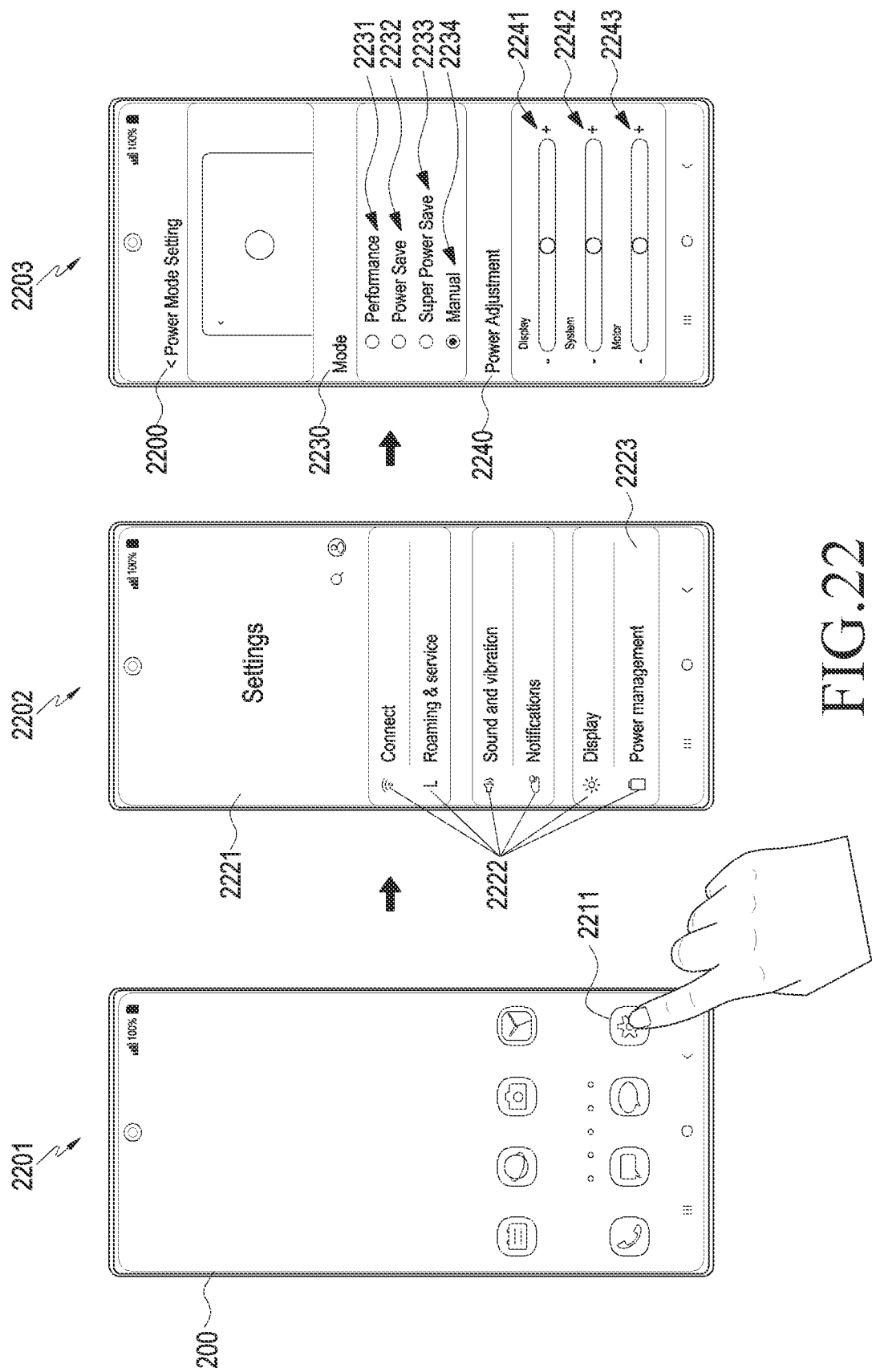
FIG. 22 is a view illustrating an example of an operation for displaying a screen for setting a power mode of an electronic device according to various embodiments of the disclosure.
Figure 23:
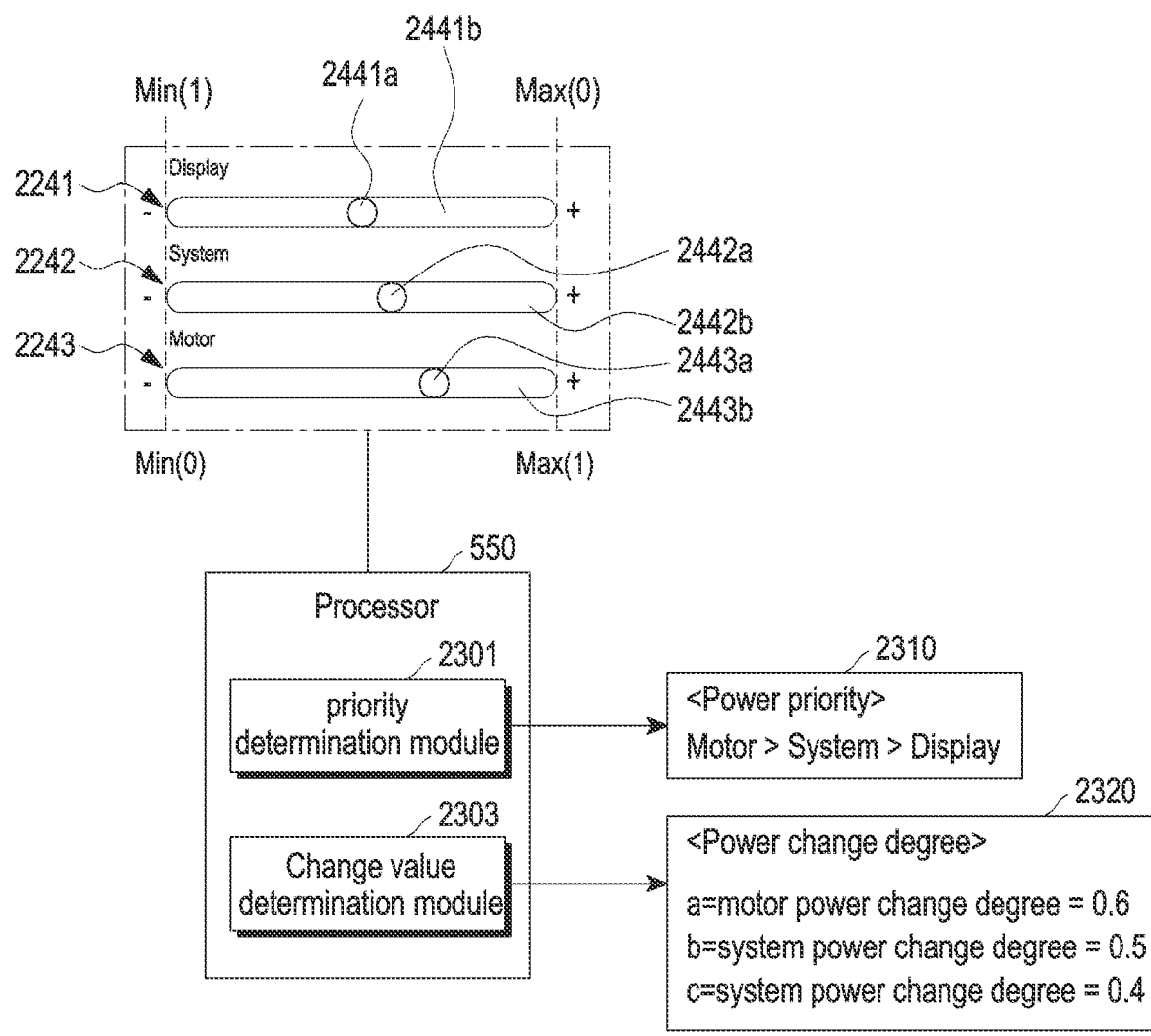
FIG. 23 is a view illustrating an example of an operation for identifying a power priority and/or power change degree based on each setting value of an electronic device according to various embodiments of the disclosure.

FIG. 22 is a view illustrating an example of an operation for displaying a screen for setting a power mode of an electronic device according to various embodiments of the disclosure. FIG. 23 is a view illustrating an example of an operation for identifying a power priority and/or power change degree based on each setting value of an electronic device 200 according to various embodiments of the disclosure.

According to various embodiments, the electronic device 200 may display a setting screen for controlling the power of the electronic device 200 in operation 2101. For example, as illustrated in 2201 of FIG. 22, the electronic device 200 may identify a selection of an icon 2211 for executing an application (e.g., a setting app) for setting the electronic device 200 among a plurality of icons. Based on the selection of the icon 2211, the electronic device 200 may display the execution screen 2221 of the application as illustrated in 2202 of FIG. 22. The execution screen may include a plurality of menu items 2222 for a plurality of settings (e.g., a communication connection setting, an audio setting, a notification setting, and a display setting) of the electronic device 200. A first menu item 2223 of the plurality of menu items 2222 may be associated with power management associated with a sliding movement. Based on identification of a user input for selecting the first menu item 2223 among the plurality of menu items 2222, the electronic device 200 may display a screen 2200 for power management associated with the sliding movement as illustrated in 2203 of FIG. 22. Meanwhile, without being limited to those described and/or shown, the electronic device 200 may invoke the screen 2200 for power management associated with the sliding movement in addition to the selection of the icon. For example, the screen 2200 for the power management may include objects 2230 (or graphic user interface elements) (e.g., check boxes) for selecting a plurality of modes 2231, 2232, 2233, and 2234 and objects 2240 for setting a value associated with a power change of sliding movement-associated devices (or components) (e.g., the display 203 or system (e.g., the electronic components 540 other than the display 203), and the motor). The objects 2240 may include objects 2241 for setting the value associated with the power of the display 203, an object 2242 for setting the value associated with the power of the system, and an object 2243 for setting the value associated with the power of the motor. The objects 2241, 2242, and 2243, respectively, may include rods (or bars) 2441b, 2442b, and 2443b and buttons 2441a, 2442a, and 2443a movable on the rods 2441b, 2442b, and 2443b. The modes may include a first mode (e.g., a performance mode 2231), a second mode (e.g., a power save mode 2232), and a third mode (e.g., a super power save mode 2233), and a fourth mode (e.g., a manual mode 2234) but, without being limited thereto, may include more modes. Further, the sliding movement-associated devices (or components) may include more devices (or components) (e.g., the communication circuit 543) other than the display 203, the system (e.g., other electronic components 540 (e.g., the communication circuit 543) than the display 203), and the motor, and more devices (or components) may be added according to the user's settings. As an example, the electronic device 200 may display the screen based on a designated input (e.g., a hardware key input or a voice input). As another example, the electronic device 200 may display a menu screen for displaying the screen in a drop-down form based on the user's drag input. Meanwhile, the screen for power management may be implemented as an execution screen implemented as a separate app, rather than a screen of a specific menu of the setting app.

According to various embodiments, the electronic device 200 may identify the power priority and/or power change degree for each of the modes (e.g., the first to fourth modes). For example, the power priority may denote a priority in which power needs to be secured for control, among the devices (or components) (e.g., the motor, system, and display 203) when an event for a sliding movement occurs. For example, in a case where the motor has the highest power priority, if power adjustment is required for the power of the other components (e.g., the display 203 or system) than the power of the motor when an event for triggering the sliding movement occurs, the power of other components (e.g., the component power) than the motor may be adjusted. In other words, the electronic device 200 (e.g., the power management module 575) may calculate the difference between the power (e.g., the peak power) of the battery 530 and the power of the device (e.g., the motor) having the highest priority and determine whether the power (or total sum of the power) for controlling the other components is larger than the calculated difference. If the power for controlling the other components is larger than the difference based on the result of the determination, the electronic device 200 may determine that power adjustment is required and adjust the power (e.g., the component power) of the other components. As another example, the power change degree may denote a degree by which a specific value is changed from the identified value when an event for triggering a sliding movement occurs. For example, the power change degree of the motor denotes the degree by which the preset motor power ratio MPr is changed depending on the remaining battery power and may be set to a value between 0 and 1. For example, as described in connection with Table x, if the motor power ratio is reduced by 0.1 as the remaining battery power section is decreased, the power change degree of the motor may be 0.1. As another example, referring to Equation 7 below, it may denote the degree (e.g., the value of the slope) by which the value of the motor power ratio MPr is changed per remaining battery power. Meanwhile, without being limited thereto, the power change degree of the motor may indicate information for the motor power ratio MPr to be set per remaining power of the battery 530, rather than the value settable to 0 to 1 and, accordingly, the electronic device 200 may identify the motor power ratio MPr corresponding to the current remaining battery power and the currently set power change degree among pre-stored information for the motor power ratio MPr. As another example, the power change degree for each component (e.g., the display 203 or the system (e.g., the communication circuit 543)) may denote the value of the degree b by which the power of the identified components (e.g., the display 203 or the system (e.g., the communication circuit 543)) is changed at the time of occurrence of the event for triggering the sliding movement as in Equation 8 below and may be set to 0 to 1. Meanwhile, without being limited thereto, the power change degree of the components may include information for the power for each component to be set per remaining power of the battery 530, rather than the slope value settable to 0 to 1, and thus, the electronic device 200 may identify the power for each component corresponding to the currently set component power change degree.

Motor power ratio per remaining battery power (MPr)=$a$×Preset motor power ratio (MPr)　　Equation 7

Component power changed due to occurrence of event=$b$×Component power identified when event occurs　　Equation 8

In an embodiment, the first mode (e.g., the performance mode) may be a mode for securing the motor power when a sliding movement event occurs and may be a mode in which the power priority of the motor is highest. In another embodiment, the second mode (e.g., the power save mode) is a mode for reducing the motor power per remaining power of the battery 530 while securing the motor power when a sliding movement event occurs and may be a mode in which the power priority of the motor is highest and, unlike the performance mode, the power change degree of the motor is larger than 0 (e.g., the motor power ratio MPr is changed per remaining power of the battery 530). In another embodiment, the third mode (e.g., the super power save mode) is a mode for reducing the power for each of the devices (or components) (e.g., the motor, system, or display 203) associated with the sliding movement when the sliding movement event occurs and may be a mode in which a power change degree exists per device (or component). The fourth mode (e.g., the manual mode) may be a mode in which the above-described power priority and power and/or power change degree are set based on the value set for each of the devices (or components) associated with the sliding movement.

According to various embodiments, referring to FIG. 23, the electronic device 200 (e.g., the priority determination module 2301 and the change value determination module 2303) may identify the setting value (or setting step) depending on the positions of the buttons 2441a, 2442a, and 2443a for each device (or component) (e.g., the display 203, system, or motor) and identify the above-described power priority and/or power change degree based on the identified setting values. The priority determination module 2301 and the change value determination module 2303 may be modules included in the power management module 575. For example, the electronic device 200 (e.g., the power management module 575) may identify a larger setting value as the button 2441a, 2442a, or 2443a is positioned closer to the rightmost side (e.g., closer to the "+") on the rod and may identify a smaller setting value as the button 2441a, 2442a, or 2443a is positioned closer to the leftmost side (e.g., closer to the "−") on the rod. Accordingly, when the button 2441a, 2442a, or 2443a is positioned to the rightmost side, the setting value may be the maximum value and, when it is positioned to the leftmost side, the setting value may be the minimum value. Alternatively, without being limited thereto, the setting value may increase as it is positioned closer to the leftmost side, and the setting value may decrease as it is positioned closer to the rightmost side. The button 2441a, 2442a, or 2443a may be moved on the rod by the user's drag input. Meanwhile, instead of the object in the shape of the rod and the button 2441a, 2442a, or 2443a, the electronic device 200 may display a type of object (e.g., a text box) for identifying the setting value on the screen. According to an embodiment, the electronic device 200 (e.g., the priority determination module 2301) may determine the power priority 2310 for each device (or component) based on the side relationship between the setting values for the devices (or components) (e.g., the display 203, system, or motor). For example, as illustrated in FIG. 23, the electronic device 200 may identify that the setting value of the motor is largest, the setting value of the display 203 is smallest, and the setting value of the system is an intermediate value depending on the position of the button 2441a, 2442a, or 2443a. In this case, the electronic device 200 may identify that the power priority of the motor is highest, the power priority of the display 203 is lowest, and the power priority of the system (e.g., the communication circuit 543) is intermediate. According to another embodiment, the electronic device 200 (e.g., the change value determination module 2303) may identify the power change degree 2320 for each device (or component) based on the setting value of each device (or component) (e.g., the display 203, system (e.g., the communication circuit 543), or motor). For example, the maximum value of the power setting value of the motor may correspond to when the above-described motor power change degree may correspond (or be mapped) to 0, and the minimum value may correspond to when the motor power change degree is 1. Thus, when the power setting value of the motor is the maximum value, the electronic device 200 (e.g., the power management module 575) may identify that the motor power change degree is 0 and, thus, when an event for triggering a sliding movement occurs, identify the same preset motor power ratio MPr per remaining power of the battery 530. As another example, the maximum value of the setting value for each of other electronic components 540 (e.g., the display 203 or system (e.g., the communication circuit 543)) than the motor may correspond to when the above-described power change degree for each component is 1, and the minimum value may correspond to when the power change degree for each component (e.g., the power change degree of the display 203 or the power change degree of the system) is 0. Accordingly, when the power setting value for each component is the maximum value, the electronic device 200 (e.g., the power management module 575) may identify that the power change degree for each component is 1. Thus, when an event for triggering antenna switching module occurs, it is possible to maintain, without reducing, the power for control per component. As a result, the position of the button 2441a, 2442a, or 2443a on the rod for each device (or component) may correspond to the power change degree for each device (or component). For example, if the button 2441a, 2442a, or 2443a of the motor is positioned to the rightmost side, the motor power change degree may be 0 and, if it is positioned to the leftmost side, the motor power change degree may be 1. As another example, if the button 2441a, 2442a, or 2443a for each component is positioned to the rightmost side, the power change degree for each component may be 1 and, if it is positioned to the leftmost side, the power change degree for each component may be 0. Accordingly, when a specific mode among the above-described modes is set, this may mean that the value for each device (or component) is set to a specific setting value, and the power priority and/or power change degree is set for each mode based on the setting value for each device (or component), as described above. This is described below in connection with FIGS. 24A, 24B, 25, 26A, 26B, and 26C.

According to various embodiments, in operation 2103, the electronic device 200 may identify an input for selecting one mode from among the plurality of modes being associated with controlling the motor. For example, the electronic device 200 may identify an input for selecting a specific mode from among the plurality of modes (e.g., a first mode to a fourth mode).

According to various embodiments, in operation 2105, the electronic device 200 may identify an event for triggering a movement of the plate and, in operation 2107, identify the first power of the battery 530. In an embodiment, the electronic device 200 (e.g., the movement detection module 571) may identify an occurrence of an event set to trigger a sliding movement of the display 203 (or the first structure 201 or the first plate 211a). The designated event may include identifying execution and/or operation of an app designated to trigger a sliding movement of the display 203 (or the first structure 201 or the first plate 211a) and a user input (e.g., identifying a selection of an icon or pressing of a physical key) for triggering a sliding movement of the display 203. Based on identifying the occurrence of the designated event, the electronic device 200 may control the moving device 510 (e.g., a motor) to rotate the roller 251 to thereby move the first structure 201. Based on the occurrence of the event set to trigger a sliding movement of the display 203 (or the first structure 201 or the first plate 211a), the electronic device 200 (e.g., the power management module 575) may identify the electrical characteristics (e.g., power, voltage, and/or current) of the battery 530 using the detection circuit 601.

According to various embodiments, in operation 2109, the electronic device 200 may identify the second power (e.g., the component power) for controlling the electronic component and the third power (e.g., the motor power) for driving the motor based on the first power and the selected mode. For example, the electronic device 200 may identify the second power (e.g., the component power) for controlling the electronic component and the third power (e.g., the motor power) for controlling the motor based on the power priority 2310 and/or power change degree 2320 for each device (or component) corresponding to the selected specific mode. The operation of identifying the second power (e.g., the component power) for controlling the electronic component and the third power (e.g., the motor power) for controlling the motor, for each mode of the electronic device 200, is described below with reference to FIGS. 24A, 24B, 25, 26A, 26B, and 26C.

According to various embodiments, in operation 2111, the electronic device 200 may provide the motor with a signal corresponding to the third power (e.g., the motor power) to move the plate. For example, the electronic device 200 (e.g., the movement control module 573) may provide the moving device 510 (e.g., a motor) with a signal (e.g., a PWM signal) having the characteristics (e.g., frequency or magnitude) corresponding to the identified third power (e.g., the motor power).

An example of an operation of an electronic device 200 is described below according to various embodiments. Since at least some of the above-described operations of the electronic device 200 (e.g., the operations of the flowchart 900 of FIG. 9, the operations of the flowchart 1100 of FIG. 11, the operations of the flowchart 1200 of FIG. 12, the operations of the flowchart 1400 of FIG. 14, the operations of the flowchart 1600 of FIG. 16, the operations of the flowchart 1700 of FIG. 17, the operations of the flowchart 1900 of FIG. 19, the operations of the flowchart 2000 of FIGS. 20A and 20B, and the operations of the flowchart 2100 of FIG. 21) may be performed in combination with the operations described below, and thus, no duplicate description is presented.

According to various embodiments, the electronic device 200 (e.g., the processor 550) may identify the second power (e.g., the component power) for controlling the electronic component and the third power (e.g., the motor power) for controlling the motor based on the power priority and/or power change degree for each device (or component) corresponding to the selected specific mode.

Figure 24A:
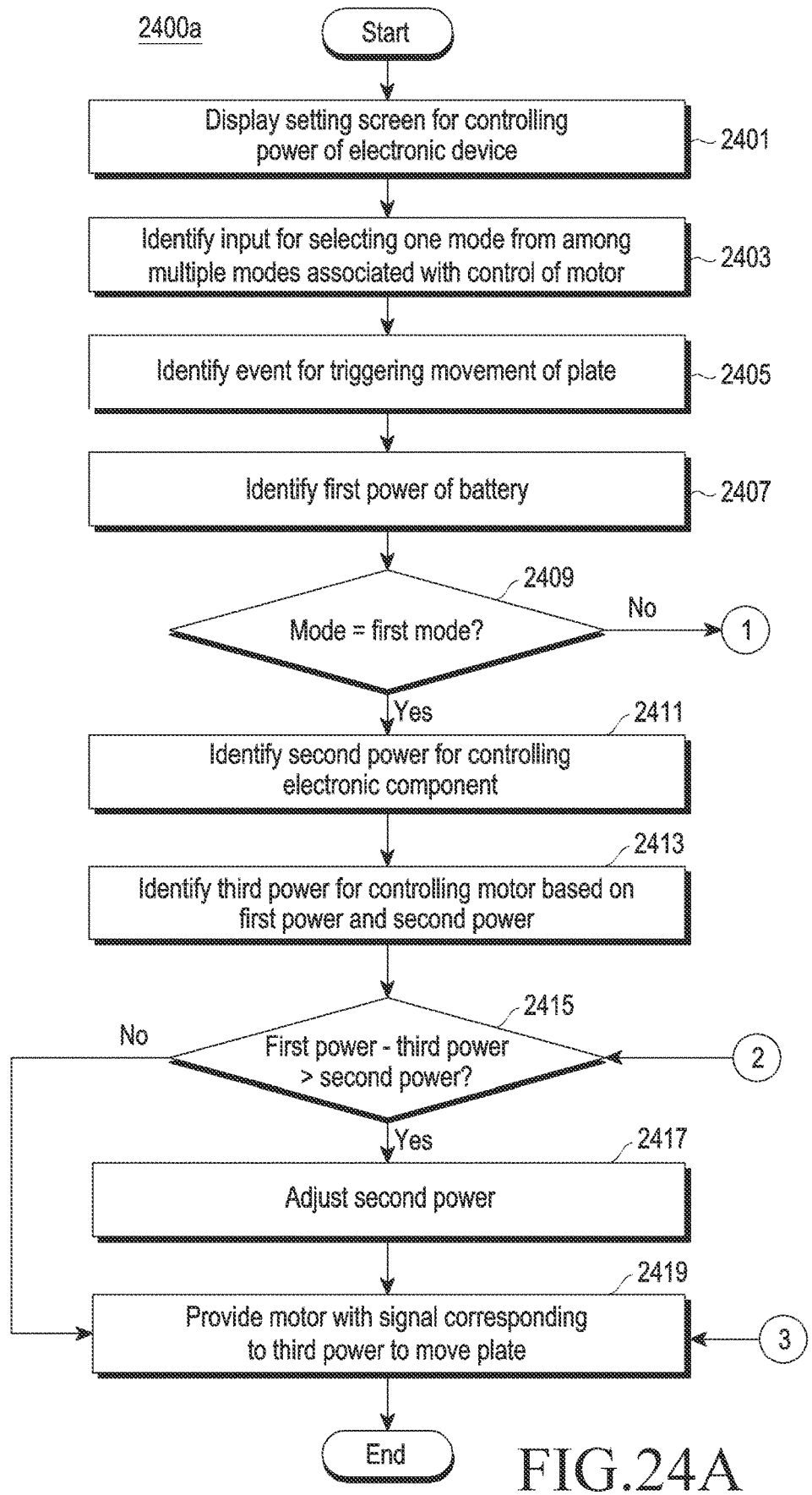
FIG. 24A is a flowchart illustrating an example of an operation of an electronic device according to various embodiments of the disclosure.
Figure 24B:
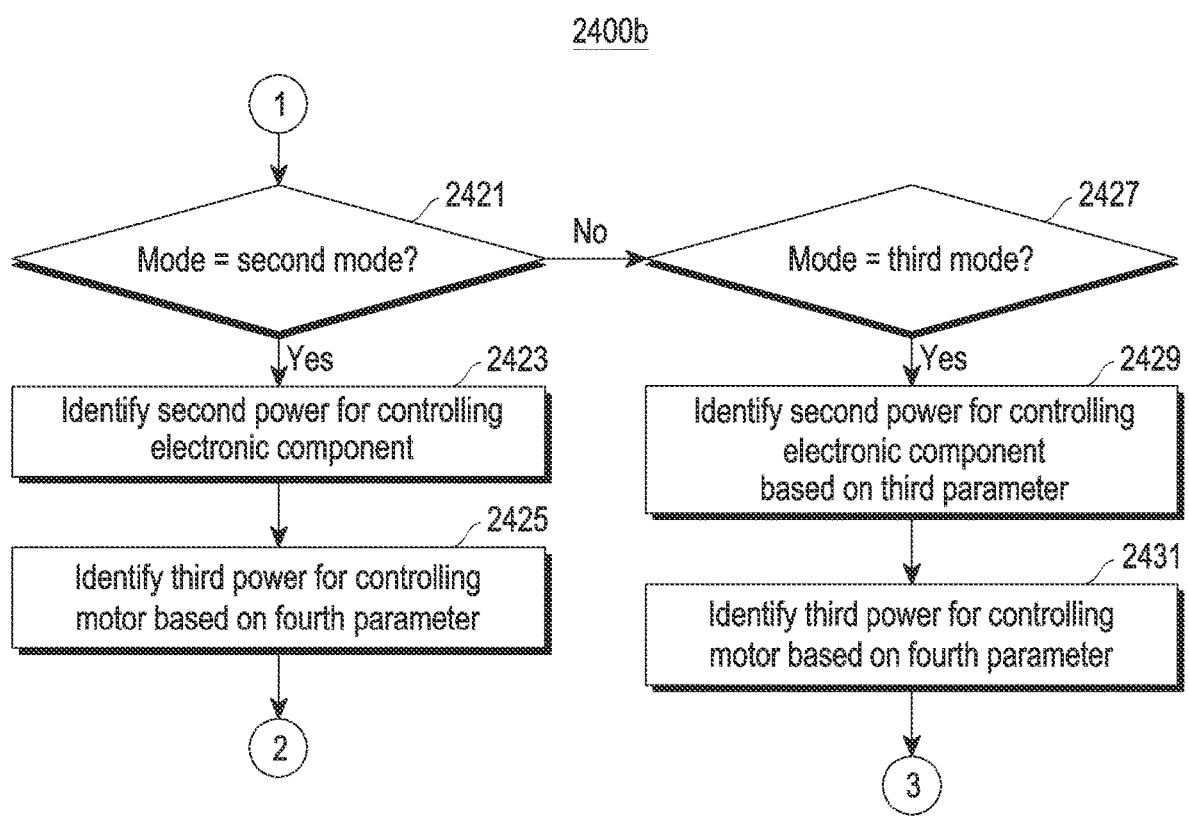
FIG. 24B is a flowchart illustrating an example of an operation of an electronic device according to various embodiments of the disclosure.

FIG. 24A is a flowchart 2400a illustrating an example of an operation of an electronic device 200 according to various embodiments of the disclosure. FIG. 24B is a flowchart 2400b illustrating an example of an operation of an electronic device 200 according to various embodiments of the disclosure. According to various embodiments, the operations shown in flowcharts 2400a and 2400b of FIGS. 24A and 24B, respectively, are not limited to the shown order but may rather be performed in other various orders. According to various embodiments, more or less operations than those of FIGS. 24A and 24B may be performed. FIGS. 24A and 24B are described below with reference to FIGS. 25 and 26A to 26C.

Figure 25:
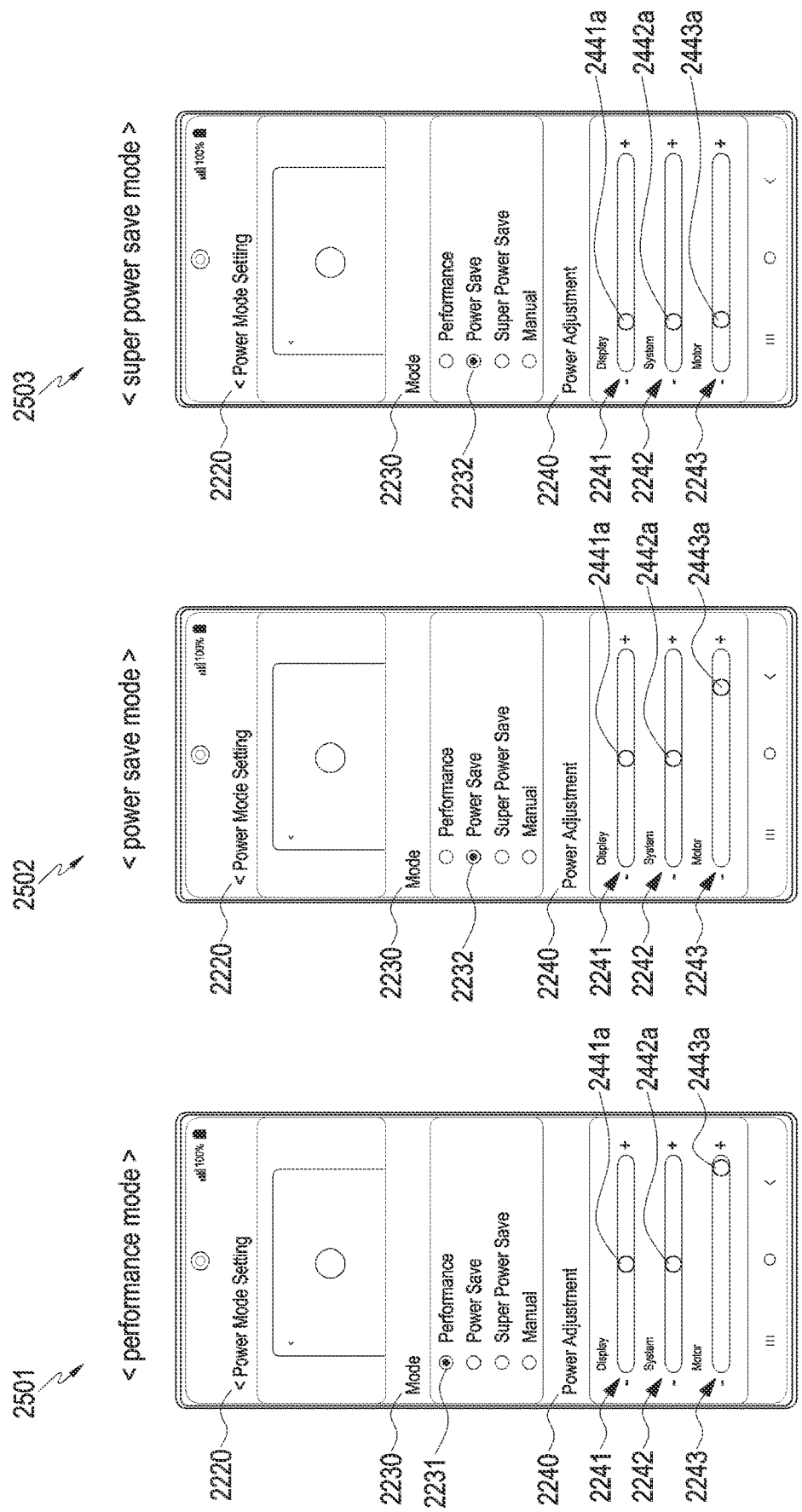
FIG. 25 is a view illustrating an example of an operation for displaying a screen for setting a power mode of an electronic device according to various embodiments of the disclosure.

FIG. 25 is a view illustrating an example of an operation for displaying a screen for setting a power mode of an electronic device 200 according to various embodiments of the disclosure. FIG. 26A is a view illustrating an example of an operation for setting power based on a performance mode 2231 of an electronic device 200 according to various embodiments of the disclosure. FIG. 26B is a view illustrating an example of an operation for setting power based on a power save mode 2232 of an electronic device 200 according to various embodiments of the disclosure. FIG. 26C is a view illustrating an example of an operation for setting power based on a super power save mode 2233 of an electronic device 200 according to various embodiments of the disclosure.

According to various embodiments, in operation 2401, the electronic device 200 may display a setting screen for controlling the power of the electronic device 200 and, in operation 2403, may identify an input for selecting one mode from among a plurality of modes associated with the control of the motor. For example, the electronic device 200 may identify an input for selecting a specific mode (e.g., the performance mode 2231, the power save mode 2232, or the super power save mode 2233) from among the plurality of power modes on the screen for power management associated with a sliding movement, as illustrated in 2501 to 2503 of FIG. 25. Operations 2401 to 2403 of the electronic device 200 may be performed like operations 2101 to 2103 of the electronic device 200 as described above, and no duplicate description thereof is given below.

According to various embodiments, the electronic device 200 may identify an input for adjusting the setting value for each device (or component) (e.g., the motor, display 203, or system (e.g., the communication circuit 543)) associated with a sliding movement for each selected mode. Hereinafter, an example of an operation for providing objects for adjusting the setting value for each mode of the electronic device 200 is described.

In an embodiment, if the selected mode is a first mode (e.g., the performance mode 2231), the electronic device 200 may display the button 2443a of the motor in the position indicating the maximum value and the buttons 2441a and 2442a of other devices (or components) (e.g., the display 203 or system (e.g., the communication circuit 543)) in positions indicating specific values smaller than the maximum value, as illustrated in 2501 of FIG. 25. For example, if the performance mode 2231 is selected, the electronic device 200 may set the setting value of the motor to the maximum value and the setting values of other devices (or components) to values smaller than the maximum value. According to the settings, the button 2441a, 2442a, or 2443a may be displayed and provided in the positions corresponding to the setting values. Thus, as described above, if the mode of the electronic device 200 is the performance mode 2231, upon a sliding movement, the power priority of the motor is highest, and the power change degree of the motor is 0. Thus, regardless of the remaining power of the battery 530, the motor power ratio MPr of the motor may be maintained, and the power of the other devices (or components) (e.g., the display 203 or the system (e.g., the communication circuit 543)) may be reduced. In the performance mode 2231, the electronic device 200 may perform control so that it is impossible to change the position of the button 2443a of the motor (e.g., deactivate the object for the motor) and set so that it is possible to change the position of the buttons 2441a and 2442a of the other devices (or components) (e.g., the display 203 or the system (e.g., the communication circuit 543)). Accordingly, as the position of the buttons 2441a and 2442a of the other devices (or components) (e.g., the display 203 or the system (e.g., the communication circuit 543)) is changed, in the performance mode 2231, the power change degree of the other devices (or components) (e.g., the display 203 or the system (e.g., the communication circuit 543)) may be adjusted. In this case, as at least part of the operation of setting so that it is possible to change the position of the buttons 2441a and 2442a of the other devices (or components) (e.g., the display 203 or the system (e.g., the communication circuit 543)), the electronic device 200 may set an upper position and/or a lower position where it is possible to change the position of the buttons 2441a and 2442a of the other devices (or components) (e.g., the display 203 or the system (e.g., the communication circuit 543)). The upper position may be a position which is a preset distance away, to the left, from the position of the rightmost side corresponding to the maximum value.

In another embodiment, if the selected mode is a second mode (e.g., the power save mode 2232), the electronic device 200 may display the button 2443a of the motor in a position, which is a preset value smaller than the maximum value, and the buttons 2441a and 2442a of other devices (or components) (e.g., the display 203 or system (e.g., the communication circuit 543)) in positions indicating specific values smaller than the maximum value, as illustrated in 2502 of FIG. 25. For example, if the power save mode 2232 is selected, the electronic device 200 may set the setting value of the motor to a value, which is a preset value smaller than the maximum value, and the setting values of other devices (or components) to values smaller than the maximum value. According to the settings, the button 2441a, 2442a, or 2443a may be displayed and provided in the positions corresponding to the setting values. Thus, as described above, if the mode of the electronic device 200 is the power save mode 2232, upon a sliding movement, the power priority of the motor is highest, and the power change degree of the motor is larger than 0. Thus, in inverse proportion to the remaining power of the battery 530, the motor power ratio MPr of the motor may be reduced, and the power of the other devices (or components) (e.g., the display 203 or the system (e.g., the communication circuit 543)) may be reduced. In the power save mode 2232, the electronic device 200 may set so that it is possible to change the position of the button 2443a of the motor and it is possible to change the position of the buttons 2441a and 2442a of the other devices (or components) (e.g., the display 203 or the system (e.g., the communication circuit 543)). Accordingly, as the position of the button 2443a of the motor and the buttons 2441a and 2442a of the other devices (or components) (e.g., the display 203 or the system (e.g., the communication circuit 543)) is changed, in the power save mode 2232, the power change degree of the motor and the other devices (or components) (e.g., the display 203 or the system (e.g., the communication circuit 543)) may be adjusted. In this case, as at least part of the operation of setting so that it is possible to change the position of the buttons 2441a and 2442a of the other devices (or components) (e.g., the display 203 or the system (e.g., the communication circuit 543)), the electronic device 200 may set an upper position and/or a lower position where it is possible to change the position of the buttons 2441a, 2442a, and 2443a so that the setting value of the motor is larger than the setting values of the other devices (or components) (e.g., the display 203 or the system (e.g., the communication circuit 543)) (e.g., set the lower position of the button 2443a of the motor further to the right than the upper position of the devices (or components)).

In another embodiment, if the selected mode is a third mode (e.g., the super power save mode 2233), the electronic device 200 may display the button 2443a of the motor and the respective buttons 2441a and 2442a of other devices (or components) (e.g., the display 203 or system (e.g., the communication circuit 543)) in positions indicating specific values smaller than the maximum value, as illustrated in 2502 of FIG. 25. For example, if the super power save mode 2233 is selected, the electronic device 200 may set the setting value of the motor and the setting values of other devices (or components) to values smaller than the maximum value. According to the settings, the button 2441a, 2442a, or 2443a may be displayed and provided in the positions corresponding to the setting values. Thus, as described above, if the mode of the electronic device 200 is the super power save mode 2233, upon a sliding movement, the motor power ratio of the motor may be reduced in inverse proportion to the remaining power of the battery 530, and the power of the other devices (or components) (e.g., the display 203 or the system (e.g., the communication circuit 543)) may be reduced. In the super power save mode 2233, the electronic device 200 may set so that it is possible to change the position of the button 2443a of the motor and it is possible to change the position of the buttons 2441a and 2442a of the other devices (or components) (e.g., the display 203 or the system (e.g., the communication circuit 543)). Accordingly, as the position of the button 2443a of the motor and the buttons 2441a and 2442a of the other devices (or components) (e.g., the display 203 or the system (e.g., the communication circuit 543)) is changed, in the super power save mode 2233, the power change degree of the motor and the other devices (or components) (e.g., the display 203 or the system (e.g., the communication circuit 543)) may be adjusted. In this case, as at least part of the operation of setting so that it is possible to change the position of the buttons 2441a and 2442a of the other devices (or components) (e.g., the display 203 or the system (e.g., the communication circuit 543)), the electronic device 200 may set an upper position where it is possible to change the position of the buttons 2441a, 2442a, and 2443a so that the setting value of the motor and the setting values of the other devices (or components) (e.g., the display 203 or the system (e.g., the communication circuit 543)) do not reach the maximum value (e.g., set a position corresponding to a value, which is a specific value smaller than the maximum value, to the upper position).

According to various embodiments, in operation 2405, the electronic device 200 may identify an event for triggering a movement of the plate and, in operation 2407, identify the first power of the battery 530. In an embodiment, the electronic device 200 (e.g., the movement detection module 571) may identify an occurrence of an event set to trigger a sliding movement of the display 203 (or the first structure 201 or the first plate 211a). The designated event may include identifying execution and/or operation of an app designated to trigger a sliding movement of the display 203 (or the first structure 201 or the first plate 211a) and a user input (e.g., identifying a selection of an icon or pressing of a physical key) for triggering a sliding movement of the display 203. Based on identifying the occurrence of the designated event, the electronic device 200 may control the moving device 510 (e.g., a motor) to rotate the roller 251 to thereby move the first structure 201. Based on the occurrence of the event set to trigger a sliding movement of the display 203 (or the first structure 201 or the first plate 211a), the electronic device 200 (e.g., the power management module 575) may identify the electrical characteristics (e.g., power, voltage, and/or current) of the battery 530 using the detection circuit 601.

According to various embodiments, in operation 2409, the electronic device 200 may determine whether the selected mode is the first mode (e.g., the performance mode 2231). If the selected mode is the first mode, the electronic device 200 may identify the second power (e.g., the component power) for controlling the electronic component in operation 2411. In operation 2413, the electronic device 200 may identify the third power (e.g., the motor power) for controlling the motor and, in operation 2415, the electronic device 200 may determine whether the difference between the first power and the third power (e.g., the motor power) is larger than the second power (e.g., the component power). If the difference is larger than the second power (e.g., the component power), the electronic device 200 may adjust the second power (e.g., the component power) in operation 2417. In operation 2419, the electronic device 200 may provide the motor with a signal corresponding to the third power (e.g., the motor power) to move the plate. For example, referring to FIG. 26A, in a case where the selected mode is the performance mode 2231, if a sliding movement event occurs, the electronic device 200 may perform control so that the power priority of the motor is highest, and the power of the other devices (or components) (e.g., the display 203 or the system (e.g., the communication circuit 543)) is reduced. For example, the electronic device 200 (e.g., the power management module 575) may identify the third power (e.g., the motor power) for controlling the motor and may identify the power (e.g., the component power) for controlling the components (e.g., the display 203 or the system (e.g., the communication circuit 543)) based on the difference between the first power (e.g., peak power) of the battery 530 and the third power (e.g., the motor power).

Accordingly, as illustrated in 2601 of FIG. 26A, it is possible to ensure that more motor power from the power G to the power G' is secured. For example, referring to 2602 of FIG. 26A, if a sliding movement event occurs, the electronic device 200 (e.g., the power management module 575) may identify the second power (e.g., the component power) provided to the components (e.g., the display 203 or the system (e.g., the communication circuit 543)) at the current time (or for controlling the components). The second power may include the power D1 for controlling the display 203 and the power S1 for controlling the system (e.g., the communication circuit 543). In this case, the electronic device 200 (e.g., the power management module 575) may reduce the second power (e.g., the component power) identified according to the value of the power change degree corresponding to the performance mode 2231 (e.g., the value according to the position of the buttons 2441a and 2442a of the display 203 or the system (e.g., the communication circuit 543) of 2501 of FIG. 25) (e.g., reduce the power D1 for controlling the display 203 to power Dr and/or reduce the power Si provided for controlling the system (e.g., the communication circuit 543) to power S1'), but is not limited thereto. The electronic device 200 (e.g., the power management module 575) may identify the motor power available ratio MPAr based on the first power (e.g., peak power) of the battery 530 and the identified second power (e.g., the component power) and identify the preset motor power ratio MPr. The electronic device 200 (e.g., the power management module 575) may identify the third power (e.g., the motor power) for controlling (or driving) the motor based on the preset motor power ratio MPr. The electronic device 200 (e.g., the power management module 575) may identify the difference 2620 between the first power and the third power (e.g., the motor power). If the second power (e.g., the component power) for controlling the components is larger than the identified difference 2620, the electronic device 200 (e.g., the power management module 575) may reduce the second power (e.g., the component power) (e.g., reduce the power Dr for controlling the display 203 to power D1" and/or reduce the power S1' provided for controlling the system (e.g., the communication circuit 543) to power S1"). Further, if the motor power available ratio MPAr is smaller than the motor power ratio MPr, the electronic device 200 (e.g., the power management module 575) may reduce the second power (e.g., the component power). After the second power (e.g., the component power) is reduced, the electronic device 200 may provide the motor with a signal corresponding to the third power (e.g., the motor power). If the sliding movement is completed (e.g., when a designated time At elapses after the sliding movement starts), the electronic device (e.g., the power management module 575) may identify the pre-reduction second power as the component power (e.g., increases D1" to D1 or increases S1" to S1). At least some of the operations of the flowchart 1600 of FIG. 16, the operations of the flowchart 1700 of FIG. 17, the operations of the flowchart 1900 of FIG. 19, and the operations of the flowchart 2000 of FIGS. 20A and 20B may be applied to operations 2409 to 2419 of the electronic device 200 described above, and thus, no detailed description thereof is given.

According to various embodiments, in operation 2421, the electronic device 200 may determine whether the selected mode is the second mode (e.g., the power save mode 2232). If the selected mode is the second mode, the electronic device 200 may identify the second power (e.g., the component power) for controlling the electronic component in operation 2423. In operation 2425, the electronic device 200 may identify the third power (e.g., the motor power) for controlling the motor based on the fourth parameter and may perform operations 2415 to 2419 described above. For example, referring to FIG. 26B, in a case where the selected mode is the power save mode 2232, based on an occurrence of a sliding movement event, the electronic device 200 may perform control so that the power priority of the motor is highest, and the preset power ratio of the motor is reduced while the power of the other devices (or components) (e.g., the display 203 or the system (e.g., the communication circuit 543)) is reduced. For example, the electronic device 200 (e.g., the power management module 575) may identify the motor power ratio MPr reduced as much as corresponding to the remaining power of the battery 530 from the preset motor power ratio MPr. As described above, the degree of reduction may be determined according to the power change degree of the motor. The electronic device 200 (e.g., the power management module 575) may identify the third power (e.g., the motor power) for controlling the motor based on the reduced motor power ratio MPr and may identify the power (e.g., the component power) for controlling the components (e.g., the display 203 or the system (e.g., the communication circuit 543)) based on the difference between the first power (e.g., peak power) of the battery 530 and the third power (e.g., the motor power). Accordingly, as the power for driving the motor reduces from G to G' as the remaining power of the battery 530 decreases as illustrated in 2603 of FIG. 26B, the value of the remaining power of the battery 530, at which the peak power occurs, may be further lowered. For example, referring to 2604 of FIG. 26B, if a sliding movement event occurs, the electronic device 200 (e.g., the power management module 575) may identify the second power (e.g., the component power) provided to the components (e.g., the display 203 or the system (e.g., the communication circuit 543)) at the current time (or the second power (e.g., the component power) for controlling the components). In this case, the electronic device 200 (e.g., the power management module 575) may reduce the second power (e.g., the component power) identified according to the value of the power change degree according to the mode setting (e.g., the value according to the position of the buttons 2441*a*, 2442*a*, and 2443*a* of the display 203 or the system (e.g., the communication circuit 543) of 2502 of FIG. 25) (e.g., reduce the power D2 for controlling the display 203 to power D2' and/or reduce the power S2 for controlling the system (e.g., the communication circuit 543) to power S2'), but is not limited thereto. The electronic device 200 (e.g., the power management module 575) may identify the motor power available ratio MPAr based on the first power (e.g., peak power) of the battery 530 and the identified second power (e.g., the component power), identify the preset motor power ratio MPr, and reduce the motor power ratio MPr as much as corresponding to the current remaining power of the battery 530 and the power change degree of the motor. The electronic device 200 (e.g., the power management module 575) may identify the third power (e.g., the motor power) for controlling (or driving) the motor based on the reduced motor power ratio MPr. As described above, the electronic device 200 (e.g., the power management module 575) may identify the difference 2640 between the first power and the third power (e.g., the motor power) and, if the second power (e.g., the component power) for controlling the components is larger than the difference 2640, reduce the second power (e.g., the component power). Further, if the motor power available ratio MPAr is smaller than the motor power ratio MPr, the electronic device 200 (e.g., the power management module 575) may reduce the second power (e.g., the component power). After the second power (e.g., the component power) is reduced, the electronic device 200 may provide the motor with a signal corresponding to the third power (e.g., the motor power). At least some of the operations of the flowchart 1600 of FIG. 16, the operations of the flowchart 1700 of FIG. 17, the operations of the flowchart 1900 of FIG. 19, and the operations of the flowchart 2000 of FIGS. 20A and 20B may be applied to operations 2421 to 2419 of the electronic device 200 described above, and thus, no detailed description thereof is given.

According to various embodiments, in operation 2427, the electronic device 200 may determine whether the selected mode is the third mode (e.g., the super power save mode 2233). If the selected mode is the third mode, the electronic device 200 may identify the second power (e.g., the component power) for controlling the electronic component based on the third parameter in operation 2429. In operation 2431, the electronic device 200 may identify the third power (e.g., the motor power) for controlling the motor based on the fourth parameter and may perform operation 2419 described above. For example, referring to FIG. 26C, in a case where the selected mode is the super power save mode 2233, based on an occurrence of a sliding movement event, the electronic device 200 may perform control so that the preset power ratio of the motor is reduced while the power of the other devices (or components) (e.g., the display 203 or the system (e.g., the communication circuit 543)) is reduced. For example, the electronic device 200 (e.g., the power management module 575) may reduce the second power (e.g., the component power) for controlling the components (e.g., the display 203 or the system (e.g., the communication circuit 543)) and the third power (e.g., the motor power) for controlling the motor, thereby securing as much power as possible in performing a sliding movement. Accordingly, as illustrated in 2605 of FIG. 26C, as the total sum of the second power (e.g., the component power) and the third power (e.g., the motor power) reduces, the value of the remaining power of the battery 530, at which the peak power occurs, may be further reduced. For example, referring to 2606 of FIG. 26C, if a sliding movement event occurs, the electronic device 200 (e.g., the power management module 575) may identify the second power (e.g., the component power) provided to the components (e.g., the display 203 or the system (e.g., the communication circuit 543)) at the current time (or the second power (e.g., the component power) for controlling the components). The second power may include the power D3 for controlling the display 203 and the power S3 for controlling the system (e.g., the communication circuit 543). In this case, the electronic device 200 (e.g., the power management module 575) may reduce the second power (e.g., the component power) identified according to the value of the power change degree according to the mode setting (e.g., the value according to the position of the buttons 2441*a*, 2442*a*, and 2443*a* of the display 203 or the system (e.g., the communication circuit 543) of 2503 of FIG. 25) (e.g., reduce the power D3 for controlling the display 203 to power D3' and/or reduce the power S3 provided for controlling the system (e.g., the communication circuit 543) to power S3'). In this case, even when the second power is equal to or smaller than the difference 2660 between the first power and the third power (e.g., the motor power), the electronic device 200 may reduce the second power, as described above, based on the mode of the electronic device being set to the super power save mode. The electronic device 200 (e.g., the power management module 575) may identify the motor power available ratio MPAr based on the first power (e.g., peak power) of the battery 530 and the identified second power (e.g., the component power), identify the preset motor power ratio MPr, and reduce the motor power ratio MPr as much as corresponding to the current remaining power of the battery 530 and the power change degree of the motor. The electronic device 200 (e.g., the power management module 575) may identify the third power (e.g., the motor power) for controlling (or driving) the motor based on the reduced motor power ratio MPr. The electronic device 200 may provide the motor with a signal corresponding to the third power (e.g., the motor power). At least some of the operations of the flowchart 1600 of FIG. 16, the operations of the flowchart 1700 of FIG. 17, the operations of the flowchart 1900 of FIG. 19, and the operations of the flowchart 2000 of FIGS. 20A and 20B may be applied to operations 2423 to 2419 of the electronic device 200 described above, and thus, no detailed description thereof is given.

According to various embodiments, if the selected mode is not the third mode in operation 2423, the electronic device 200 may identify that the selected mode is the manual mode 2234 and may identify the second power (e.g., the component power) and the third power (e.g., the motor power) based on the setting value for each device (or component) (e.g., the motor, display 203, or system (e.g., the communication circuit 543)). This is described below in connection with FIGS. 27 and 28.

An example of an operation of an electronic device 200 is described below according to various embodiments. Since at least some of the above-described operations of the electronic device 200 (e.g., the operations of the flowchart 900 of FIG. 9, the operations of the flowchart 1100 of FIG. 11, the operations of the flowchart 1200 of FIG. 12, the operations of the flowchart 1400 of FIG. 14, the operations of the flowchart 1600 of FIG. 16, the operations of the flowchart 1700 of FIG. 17, the operations of the flowchart 1900 of FIG. 19, the operations of the flowchart 2000 of FIG. 20A, the operations of the flowchart 2100 of FIG. 21, and the operations of the flowchart 2500 of FIG. 25) may be performed in combination with the operations described below, and thus, no duplicate description is presented.

According to various embodiments, if the selected mode is the manual mode 2234, the electronic device 200 (e.g., the processor 550) may identify the second power (e.g., the component power) and the third power (e.g., the motor power) based on the setting value for each device (or component) (e.g., the motor, display 203, or system (e.g., the communication circuit 543)).

Figure 27:
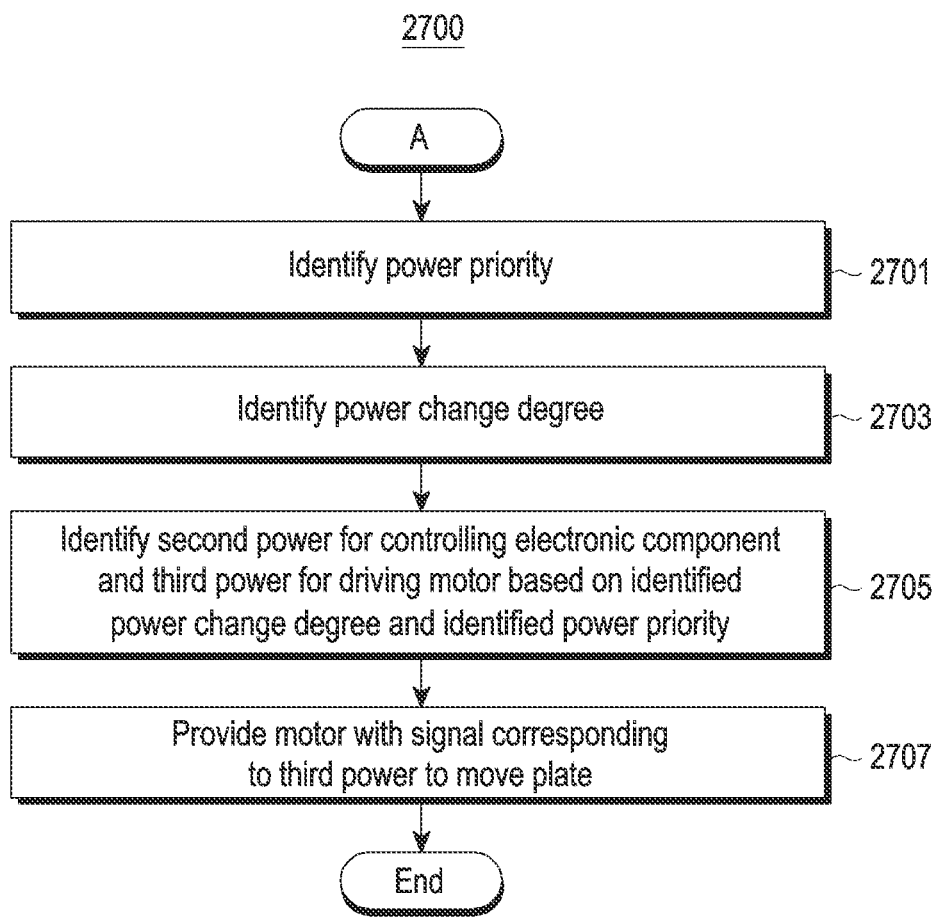
FIG. 27 is a flowchart illustrating an example of an operation of an electronic device according to various embodiments of the disclosure.

FIG. 27 is a flowchart 2700 illustrating an example of an operation of an electronic device 200 according to various embodiments of the disclosure. According to various embodiments, the operations shown in flowchart 2700 of FIG. 27 are not limited to the shown order but may rather be performed in other various orders. According to various embodiments, more or less operations than those of FIG. 27 may be performed. FIG. 27 is described below with reference to FIG. 28.

Figure 28:
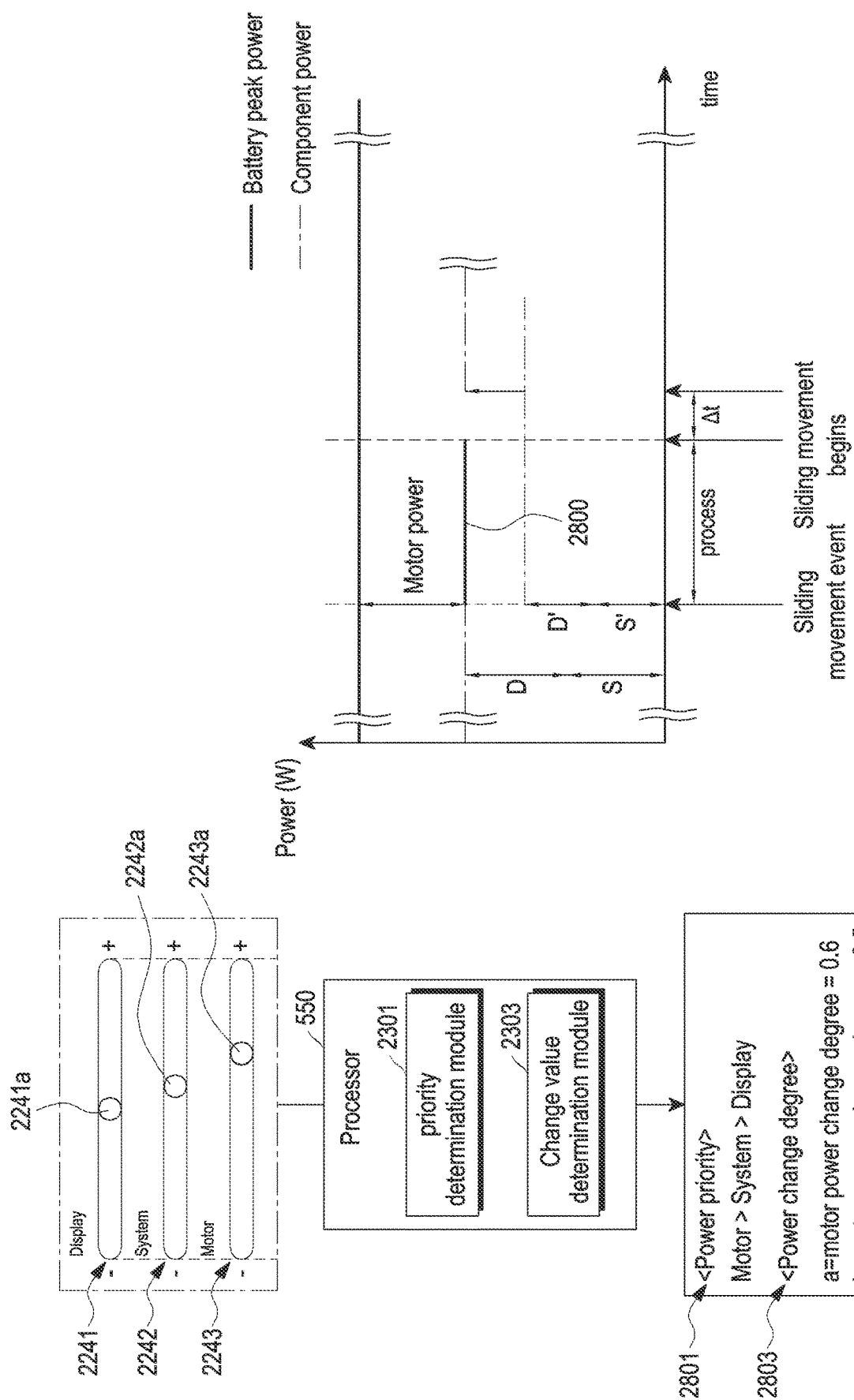
FIG. 28 is a view illustrating an example of an operation for identifying second power and third power based on a setting value for each device (e.g., a display, a motor, and a system) of an electronic device according to various embodiments of the disclosure.

FIG. 28 is a view illustrating an example of an operation for identifying second power (e.g., the component power) and third power (e.g., the motor power) based on a setting value for each device (e.g., a display 203, a motor, and a system (e.g., the communication circuit 543)) of an electronic device according to various embodiments of the disclosure.

According to various embodiments, the electronic device 200 (e.g., the processor 550) may identify power priority in operation 2701 and, in operation 2703, identify the power change degree for each device. For example, as illustrated in FIG. 28, the electronic device 200 may identify the power priority and/or the power change degree based on the setting value set for each device (e.g., the motor, display 203, and system (e.g., the communication circuit 543)). As described above, the electronic device 200 (e.g., the processor 550) may identify the setting value according to the position of the button 2441a, 2442a, or 2443a of each device (or component), determine the power priority 2801 based on the size relationship between the identified setting values, and identify the power change degree 2803 corresponding to the setting values. For example, referring to FIG. 28, the electronic device 200 may determine the priorities in the order of the motor, the system (e.g., the communication circuit 543), and the display 203 according to the order of the setting values and may identify the power change degree corresponding to each setting value (e.g., the motor power change degree is 0.6, the system power change degree is 0.5, and the display power change degree is 0.4).

According to various embodiments, in operation 2705, the electronic device 200 (e.g., the processor 550) may identify the second power (e.g., the component power) for controlling the electronic component and the third power (e.g., the motor power) for driving the motor, based on the identified power change degrees and the identified power priorities. For example, the electronic device 200 may reduce the identified second power (e.g., the component power) according to the power change degree (e.g., reduce the power D for controlling the display 203 to power D' and/or reduce the power S provided for controlling the system (e.g., the communication circuit 543) to power S') and identify the reduced second power (e.g., the component power). As another example, the electronic device 200 may identify the third power (e.g., the motor power) corresponding to the motor power ratio MPr corresponding to the power change degree of the motor. The electronic device 200 may calculate the difference 2800 between the first power and the third power (e.g., the motor power) based on the power priority and, if the second power (e.g., the component power) is larger than the difference 2800, the electronic device 200 may further reduce the second power (e.g., the component power).

According to various embodiments, in operation 2707, the electronic device 200 (e.g., the processor 550) may provide the motor with a signal corresponding to the third power (e.g., the motor power) to move the plate. For example, the electronic device 200 (e.g., the movement control module 573) may provide the moving device 510 (e.g., a motor) with a signal (e.g., a PWM signal) having the characteristics (e.g., frequency or magnitude) corresponding to the identified third power (e.g., the motor power).

According to various embodiments, there may be provided an electronic device (e.g., the electronic device 200 of FIGS. 2A to 2C) comprising a housing (e.g., the second structure 202 of FIGS. 2A to 2C), a plate (e.g., the first plate 211a of FIGS. 2A to 2C) coupled to the housing (e.g., the second structure 202 of FIGS. 2A to 2C) to reciprocate, a flexible display (e.g., the flexible display 203 of FIGS. 2A to 2C) having a first portion disposed on the plate (e.g., the first plate 211a of FIGS. 2A to 2C) and a second portion extending from the first portion and exposed to an outside or retracted into an inside of the housing (e.g., the second structure 202 of FIGS. 2A to 2C) as the plate (e.g., the first plate 211a of FIGS. 2A to 2C) reciprocates, a motor (e.g., the moving device 510 of FIG. 5) configured to move the plate (e.g., the first plate 211a of FIGS. 2A to 2C), at least one electronic component (e.g., the electronic component 540 of FIG. 5), a battery 530, and at least one processor (e.g., the processor 550 of FIG. 5), in which at least one processor (e.g., the processor 550 of FIG. 5) is configured to identify an event for triggering a movement of the plate (e.g., the first plate 211a of FIGS. 2A to 2C), identify a first power of the battery 530 and a second power (e.g., the component power) for controlling the flexible display (e.g., the flexible display 203 of FIGS. 2A to 2C) and the at least one electronic component (e.g., the electronic component 540 of FIG. 5), based on the identification of the event, identify a third power (e.g., the power of the motor (e.g., the moving device 510 of FIG. 5)) for controlling the motor (e.g., the moving device 510 of FIG. 5), based on the first power and the second power (e.g., the component power), and provide the motor (e.g., the moving device 510 of FIG. 5) with a signal corresponding to the third power (e.g., the power of the motor (e.g., the moving device 510 of FIG. 5)) to move the plate (e.g., the first plate 211a of FIGS. 2A to 2C).

According to various embodiments, there may be provided the electronic device (e.g., the electronic device 200 of FIGS. 2A to 2C) comprising a detection circuit 601 connected to the battery 530, in which at least one processor (e.g., the processor 550 of FIG. 5) is configured to identify the first power of the battery 530, based on a value sensed using the detection circuit 601, and the first power is a peak power providable from the battery 530.

According to various embodiments, there may be provided the electronic device (e.g., the electronic device 200 of FIGS. 2A to 2C) in which the at least one processor (e.g., the processor 550 of FIG. 5) is configured to identify the third power (e.g., the power of the motor (e.g., the moving device 510 of FIG. 5)) equal to or less than a difference between the first power and the second power (e.g., the component power).

According to various embodiments, there may be provided the electronic device (e.g., the electronic device 200 of FIGS. 2A to 2C), in which the at least one processor (e.g., the processor 550 of FIG. 5) is configured to identify a first value of a first parameter associated with a fourth power capable of controlling the motor (e.g., the moving device 510 of FIG. 5), based on the first power and the second power (e.g., the component power), identify a second value of a preset second parameter associated with the power for controlling the motor (e.g., the moving device 510 of FIG. 5), identify a lower value of the first value and the second value, and identify the third power (e.g., the power of the motor (e.g., the moving device 510 of FIG. 5)) corresponding to the identified lower value.

According to various embodiments, there may be provided the electronic device (e.g., the electronic device 200 of FIGS. 2A to 2C), in which the at least one processor (e.g., the processor 550 of FIG. 5) is configured to identify the first value of the first parameter, based on the difference between the first power and the second power (e.g., the component power) and a fifth power set to control the motor (e.g., the moving device 510 of FIG. 5), and identify the second value of the second parameter, based on the fifth power.

According to various embodiments, there may be provided the electronic device (e.g., the electronic device 200 of FIGS. 2A to 2C), in which the at least one processor (e.g., the processor 550 of FIG. 5) is configured to reduce a visual characteristic associated with display of content on the flexible display (e.g., the flexible display 203 of FIGS. 2A to 2C) to maintain the second power (e.g., the component power) while the plate (e.g., the first plate 211a of FIGS. 2A to 2C) moves, and the visual characteristic includes at least one of a luminance, a brightness, or a scan rate.

According to various embodiments, there may be provided the electronic device (e.g., the electronic device 200 of FIGS. 2A to 2C), in which the at least one processor (e.g., the processor 550 of FIG. 5) is configured to, as at least part of reducing the visual characteristic, identify a value of the visual characteristic to be changed based on the value of the visual characteristic before the movement of the plate (e.g., the first plate 211a of FIGS. 2A to 2C) and a parameter associated with the movement of the plate (e.g., the first plate 211a of FIGS. 2A to 2C).

According to various embodiments, there may be provided the electronic device (e.g., the electronic device 200 of FIGS. 2A to 2C) further comprising a detection circuit 601 connected to the battery 530, in which the at least one processor (e.g., the processor 550 of FIG. 5) is configured to identify a value of a third parameter associated with the second power (e.g., the component power), based on a value identified using the detection circuit 601 and/or a value identified using at least one sensor, the third parameter including at least one of a remaining power of the battery 530 or a temperature of the electronic device (e.g., the electronic device 200 of FIGS. 2A to 2C), and identify the second power (e.g., the component power), based on the value of the third parameter.

According to various embodiments, there may be provided the electronic device (e.g., the electronic device 200 of FIGS. 2A to 2C), in which the at least one processor (e.g., the processor 550 of FIG. 5) is configured to compare a difference between the first power and the second power (e.g., the component power) with the third power (e.g., the power of the motor (e.g., the moving device 510 of FIG. 5)), and reduce the second power (e.g., the component power) when the third power (e.g., the power of the motor (e.g., the moving device 510 of FIG. 5)) is larger than the difference based on a result of the comparison.

According to various embodiments, there may be provided the electronic device (e.g., the electronic device 200 of FIGS. 2A to 2C), in which the at least one processor (e.g., the processor 550 of FIG. 5) is configured to, as at least part of reducing the second power (e.g., the component power) reduce a power for controlling one of the display (e.g., the flexible display 203 of FIGS. 2A to 2C) and the at least one component, and reduce a power for controlling a remaining one of the display and the at least one component when the third power (e.g., the power of the motor (e.g., the moving device 510 of FIG. 5)) is larger than a difference between the first power and the reduced second power (e.g., the component power).

According to various embodiments, there may be provided the electronic device (e.g., the electronic device 200 of FIGS. 2A to 2C), in which the at least one processor (e.g., the processor 550 of FIG. 5) is configured to, when the first value of the first parameter associated with the fourth power capable of controlling the motor (e.g., the moving device 510 of FIG. 5) is equal to or less than a minimum value associated with a minimum power for controlling the motor (e.g., the moving device 510 of FIG. 5), reduce the second power (e.g., the component power) until the first value becomes larger than the minimum value.

According to various embodiments, there may be provided the electronic device (e.g., the electronic device 200 of FIGS. 2A to 2C), in which the at least one processor (e.g., the processor 550 of FIG. 5) is configured to, when the first value of the first parameter associated with the fourth power capable of controlling the motor (e.g., the moving device 510 of FIG. 5) is equal to or less than the second value of the preset second parameter associated with the fifth power set to control the motor (e.g., the moving device 510 of FIG. 5), reduce the second power (e.g., the component power) until the first value becomes larger than the second value.

According to various embodiments, there may be provided the electronic device (e.g., the electronic device 200 of FIGS. 2A to 2C), in which the at least one processor (e.g., the processor 550 of FIG. 5) is configured to provide the power before reducing the second power (e.g., the component power) to the flexible display (e.g., the flexible display 203 of FIGS. 2A to 2C) and the at least one component when the movement of the plate (e.g., the first plate 211a of FIGS. 2A to 2C) is completed.

According to various embodiments, there may be provided the electronic device (e.g., the electronic device 200 of FIGS. 2A to 2C) further comprising a detection circuit 601 connected to the battery 530, in which at least one processor (e.g., the processor 550 of FIG. 5) is configured to identify a value of a fourth parameter associated with the third power (e.g., the power of the motor (e.g., the moving device 510 of FIG. 5)), based on a value identified using the detection circuit 601 and/or a value identified using at least one sensor, the fourth parameter including at least one of a remaining power of the battery 530 or a temperature of the electronic device (e.g., the electronic device 200 of FIGS. 2A to 2C), and identify the third power (e.g., the power of the motor (e.g., the moving device 510 of FIG. 5)), based on the value of the fourth parameter.

According to various embodiments, there may be provided the electronic device (e.g., the electronic device 200 of FIGS. 2A to 2C), in which the at least one processor (e.g., the processor 550 of FIG. 5) is configured to identify the second value of the preset second parameter associated with the power for controlling the motor (e.g., the moving device 510 of FIG. 5), based on the value of the fourth parameter, and the second value may be proportional to the value of the fourth parameter.

According to various embodiments, there may be provided the electronic device (e.g., the electronic device 200 of FIGS. 2A to 2C), in which the at least one processor (e.g., the processor 550 of FIG. 5) is configured to display an execution screen including information for a plurality of modes associated with control of the motor (e.g., the moving device 510 of FIG. 5), receive an input for selecting a mode from among the plurality of modes, and identify the third power (e.g., the power of the motor (e.g., the moving device 510 of FIG. 5)) based on the first mode.

According to various embodiments, there may be provided the electronic device (e.g., the electronic device 200 of FIGS. 2A to 2C), in which the plurality of modes are associated with the power priority of the flexible display (e.g., the flexible display 203 of FIGS. 2A to 2C) and the at least one component and the change degree of at least one of the second power (e.g., the component power) or the third power (e.g., the power of the motor (e.g., the moving device 510 of FIG. 5)).

According to various embodiments, there may be provided the electronic device (e.g., the electronic device 200 of FIGS. 2A to 2C), in which the at least one processor (e.g., the processor 550 of FIG. 5) is configured to reduce the second power (e.g., the component power) when the second power (e.g., the component power) for controlling the flexible display (e.g., the flexible display 203 of FIGS. 2A to 2C) and the at least one component is equal to or less than a difference between the first power of the battery 530 and the third power (e.g., the power of the motor (e.g., the moving device 510 of FIG. 5)) for controlling the motor (e.g., the moving device 510 of FIG. 5), based on the selected mode being the first mode, identify the third power (e.g., the power of the motor (e.g., the moving device 510 of FIG. 5)) based on a value of a fourth parameter associated with the third power (e.g., the power of the motor (e.g., the moving device 510 of FIG. 5)), based on the selected mode being a second mode and, when the second power (e.g., the component power) is equal to or less than the difference between the first power and the third power (e.g., the power of the motor (e.g., the moving device 510 of FIG. 5)), reduce the second power (e.g., the component power), and identify the second power (e.g., the component power) based on a value of a third parameter associated with the second power (e.g., the component power), based on the selected mode being a third mode and identify the third power (e.g., the power of the motor (e.g., the moving device 510 of FIG. 5)) based on the value of the fourth parameter associated with the third power (e.g., the power of the motor (e.g., the moving device 510 of FIG. 5)), and a sum of the third power (e.g., the power of the motor (e.g., the moving device 510 of FIG. 5)) and the second power (e.g., the component power) in the third mode may be equal to or less than a sum of the third power (e.g., the power of the motor (e.g., the moving device 510 of FIG. 5)) and the second power (e.g., the component power) in the first mode or the second mode.

According to various embodiments, there may be provided a method for operating an electronic device (e.g., the electronic device 200 of FIGS. 2A to 2C) comprising identifying an event for triggering a movement of a plate (e.g., the first plate 211a of FIGS. 2A to 2C) reciprocally coupled to a housing (e.g., the second structure 202 of FIGS. 2A to 2C) of the electronic device (e.g., the electronic device 200 of FIGS. 2A to 2C), a first portion of a flexible display (e.g., the flexible display 203 of FIGS. 2A to 2C) of the electronic device (e.g., the electronic device 200 of FIGS. 2A to 2C) disposed on the plate (e.g., the first plate 211a of FIGS. 2A to 2C), and a second portion extending from the first portion of the flexible display (e.g., the flexible display 203 of FIGS. 2A to 2C) exposed to an outside or retracted into an inside of the electronic device (e.g., the electronic device 200 of FIGS. 2A to 2C) as the plate (e.g., the first plate 211a of FIGS. 2A to 2C) reciprocates, identifying a first power of the battery 530 and a second power (e.g., the component power) for controlling the flexible display (e.g., the flexible display 203 of FIGS. 2A to 2C) and the at least one electronic component (e.g., the electronic component 540 of FIG. 5), based on the identification of the event, identifying a third power (e.g., the power of the motor (e.g., the moving device 510 of FIG. 5)) for controlling the motor (e.g., the moving device 510 of FIG. 5), based on the first power and the second power (e.g., the component power), and providing the motor (e.g., the moving device 510 of FIG. 5) with a signal corresponding to the third power (e.g., the power of the motor (e.g., the moving device 510 of FIG. 5)) to move the plate (e.g., the first plate 211a of FIGS. 2A to 2C).

According to various embodiments, there may be provided an electronic device (e.g., the electronic device 200 of FIGS. 2A to 2C) comprising a housing (e.g., the second structure 202 of FIGS. 2A to 2C), a plate (e.g., the first plate 211a of FIGS. 2A to 2C) coupled to the housing (e.g., the second structure 202 of FIGS. 2A to 2C) to reciprocate, a flexible display (e.g., the flexible display 203 of FIGS. 2A to 2C) having a first portion disposed on the plate (e.g., the first plate 211a of FIGS. 2A to 2C) and a second portion extending from the first portion and exposed to an outside or retracted into an inside of the housing (e.g., the second structure 202 of FIGS. 2A to 2C) as the plate (e.g., the first plate 211a of FIGS. 2A to 2C) reciprocates, a motor (e.g., the moving device 510 of FIG. 5) for moving the plate (e.g., the first plate 211a of FIGS. 2A to 2C), at least one electronic component (e.g., the electronic component 540 of FIG. 5), a memory, and at least one processor (e.g., the processor 550 of FIG. 5), in which at least one processor (e.g., the processor 550 of FIG. 5) is configured to display an execution screen including information for a plurality of modes associated with control of the motor (e.g., the moving device 510 of FIG. 5), identify an input for selecting a first mode from among the plurality of modes, the plurality of modes being associated with a magnitude of a power of the motor (e.g., the moving device 510 of FIG. 5), identify an event for triggering a movement of the plate (e.g., the first plate 211a) of FIGS. 2A to 2C), identify a power for controlling the motor (e.g., the moving device 510 of FIG. 5) having a magnitude corresponding to the first mode, and provide the motor (e.g., the moving device 510 of FIG. 5) with a signal corresponding to the identified power to move the plate (e.g., the first plate 211a of FIGS. 2A to 2C).

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising;
   a housing;
   a plate coupled to the housing to reciprocate;
   a flexible display including a first portion disposed on the plate and a second portion extending from the first portion and exposed to an outside or retracted into an inside of the housing as the plate reciprocates;
   a motor configured to move the plate;
   at least one electronic component;
   a battery; and
   at least one processor,
   wherein the at least one processor is configured to:
      identify an event for triggering a movement of the plate,
      identify a first power of the battery and a second power for controlling the flexible display and the at least one electronic component, based on the identification of the event,
      identify a third power for controlling the motor, based on the first power and the second power, and
      provide the motor with a signal corresponding to the third power to move the plate.

2. The electronic device of claim 1, further comprising:
   a detection circuit connected to the battery,
   wherein the at least one processor is further configured to:
      identify the first power of the battery, based on a value sensed using the detection circuit, the first power being a peak power providable from the battery.

3. The electronic device of claim 2, wherein the at least one processor is further configured to:
   identify the third power equal to or less than a difference between the first power and the second power.

4. The electronic device of claim 3, wherein the at least one processor is further configured to:
   identify a first value of a first parameter associated with a fourth power capable of controlling the motor, based on the first power and the second power,
   identify a second value of a preset second parameter associated with the third power for controlling the motor, identify a lower value of the first value and the second value, and
identify the third power corresponding to the identified lower value.

5. The electronic device of claim 4, wherein the at least one processor is further configured to:
   identify the first value of the first parameter, based on the difference between the first power and the second power, and a fifth power set to control the motor, and
   identify the second value of the second parameter, based on the fifth power.

6. The electronic device of claim 3,
   wherein the at least one processor is further configured to reduce a visual characteristic associated with display of content on the flexible display to maintain the second power while the plate moves, and
   wherein the visual characteristic includes at least one of a luminance, a brightness, or a scan rate.

7. The electronic device of claim 6, wherein the at least one processor is further configured to:
   as at least part of reducing the visual characteristic, identify a value of the visual characteristic to be changed based on the value of the visual characteristic before the movement of the plate and a parameter associated with the movement of the plate.

8. The electronic device of claim 1, further comprising:
   a detection circuit connected to the battery,
   wherein the at least one processor is further configured to:
      identify a value of a third parameter associated with the second power, based on a value identified using the detection circuit or a value identified using at least one sensor, the third parameter including at least one of a remaining power of the battery or a temperature of the electronic device, and
      identify the second power, based on the value of the third parameter.

9. The electronic device of claim 1, wherein the at least one processor is further configured to:
   compare a difference between the first power and the second power with the third power, and
   reduce the second power when the third power is larger than the difference based on a result of the comparison.

10. The electronic device of claim 9, wherein the at least one processor is further configured to, as at least part of reducing the second power:
    reduce a power for controlling one of the flexible display and the at least one electronic component, and
    reduce a power for controlling a remaining one of the flexible display and the at least one electronic component when the third power is larger than a difference between the first power and the reduced second power.

11. The electronic device of claim 4, wherein the at least one processor is further configured to:
    when the first value of the first parameter associated with the fourth power capable of controlling the motor is equal to or less than a minimum value associated with a minimum power for controlling the motor, reduce the second power until the first value becomes larger than the minimum value.

12. The electronic device of claim 5, wherein the at least one processor is further configured to:
    when the first value of the first parameter associated with the fourth power capable of controlling the motor is equal to or less than the second value of the preset second parameter associated with the fifth power set to control the motor, reduce the second power until the first value becomes larger than the second value.

13. The electronic device of claim 12, wherein the at least one processor is further configured to:
provide power before reducing the second power to the flexible display and the at least one electronic component when the movement of the plate is completed.

14. The electronic device of claim 4, further comprising:
wherein the at least one processor is further configured to:
identify a value of a fourth parameter associated with the third power, based on a value identified using the detection circuit or a value identified using at least one sensor, the fourth parameter including at least one of a remaining power of the battery or a temperature of the electronic device, and
identify the third power, based on the value of the fourth parameter.

15. The electronic device of claim 14,
wherein the at least one processor is further configured to identify the second value of the preset second parameter associated with the third power for controlling the motor, based on the value of the fourth parameter, and
wherein the second value may be proportional to the value of the fourth parameter.

16. The electronic device of claim 1, wherein the at least one processor is further configured to:
display an execution screen including information for a plurality of modes associated with control of the motor,
receive an input for selecting a mode from among the plurality of modes, and
identify the third power based on a first mode.

17. The electronic device of claim 16,
wherein the plurality of modes are associated with a power priority of the flexible display, and
wherein the at least one electronic component and a change degree of at least one of the second power or the third power.

18. The electronic device of claim 17, wherein the at least one processor is further configured to:
reduce the second power when the second power for controlling the flexible display and the at least one electronic component is equal to or less than a difference between the first power of the battery and the third power for controlling the motor, based on the selected mode being the first mode,
identify the third power based on a value of a fourth parameter associated with the third power, based on the selected mode being a second mode and, when the second power is equal to or less than the difference between the first power and the third power, reduce the second power, and
identify the second power based on a value of a third parameter associated with the second power, based on the selected mode being a third mode and identify the third power based on the value of the fourth parameter associated with the third power, and wherein a sum of the third power and the second power in the third mode is equal to or less than a sum of the third power and the second power in the first mode or the second mode.

19. A method for operating an electronic device, the method comprising:
identifying an event for triggering a movement of a plate reciprocally coupled to a housing of the electronic device, a first portion of a flexible display of the electronic device disposed on the plate, and a second portion extending from the first portion of the flexible display being exposed to an outside or retracted into an inside of the housing as the plate reciprocates;
identifying a first power of a battery and a second power for controlling the flexible display and at least one electronic component, based on the identification of the event;
identifying a third power for controlling a motor, based on the first power and the second power; and
providing the motor with a signal corresponding to the third power to move the plate.

20. An electronic device, comprising;
a housing;
a plate coupled to the housing to reciprocate;
a flexible display having a first portion disposed on the plate, wherein a second portion extending from the first portion and exposed to an outside or retracted into an inside of the housing as the plate reciprocates;
a motor for moving the plate;
at least one electronic component;
a memory; and
at least one processor, wherein the at least one processor is configured to:
display an execution screen including information for a plurality of modes associated with control of the motor,
identify an input for selecting a first mode from among the plurality of modes,
identify an event for triggering a movement of the plate,
based on the identification of the event, identify a first power for controlling the motor having a first magnitude corresponding to the first mode and a second power for controlling the flexible display and the at least one electronic component having a second magnitude corresponding to the first mode, wherein a sum of the first power and the second power is lower than a peak power of a battery, and
provide the motor with a signal corresponding to the identified first power to move the plate.

* * * * *